United States Patent [19]
Sugihara et al.

[11] Patent Number: 6,071,220
[45] Date of Patent: Jun. 6, 2000

[54] TOOL CHANGE DEVICE AND TOOL CHANGE METHOD

[75] Inventors: Tsutomu Sugihara; Hisao Sasaki; Kazuoki Sakai; Kenichiro Morita; Toshio Yasoshima, all of Toyama, Japan

[73] Assignee: Nippei Toyama Corporation, Tokyo, Japan

[21] Appl. No.: 09/179,838

[22] Filed: Oct. 28, 1998

Related U.S. Application Data

[63] Continuation-in-part of application No. 08/837,944, Apr. 28, 1997, Pat. No. 5,885,200.

[30] Foreign Application Priority Data

| Apr. 26, 1996 | [JP] | Japan | 8-108197 |
| May 20, 1996 | [JP] | Japan | 8-124882 |
| Apr. 1, 1997 | [JP] | Japan | 9-82512 |
| Dec. 2, 1997 | [JP] | Japan | 9-332067 |

[51] Int. Cl.⁷ .................................................. B23Q 3/157
[52] U.S. Cl. ............................. 483/41; 483/36; 483/48
[58] Field of Search ............................... 483/1, 38, 36, 483/41, 48, 58, 37, 64, 61; 414/225

[56] References Cited

U.S. PATENT DOCUMENTS

| 4,087,901 | 5/1978 | Lohneis et al. |
| 4,608,645 | 8/1986 | Niwa et al. |
| 4,616,322 | 10/1986 | Niwa et al. |
| 4,685,850 | 8/1987 | Ohta et al. |
| 4,701,994 | 10/1987 | Noh et al. ........................ 29/26 A |
| 4,715,108 | 12/1987 | Sugiyama et al. |
| 5,474,514 | 12/1995 | Rutschle ........................ 483/1 |

FOREIGN PATENT DOCUMENTS

| 0648574 A1 | 4/1995 | European Pat. Off. |
| 0 803 319 A1 | 10/1997 | European Pat. Off. |
| 2 391 809 | 1/1979 | France . |
| 2 211 123 | 10/1972 | Germany . |
| 38 19210 A1 | 12/1989 | Germany . |
| 56-163856 | 12/1981 | Japan . |
| 58-109255 | 6/1983 | Japan . |
| 58-137540 | 8/1983 | Japan . |
| 86151 | 5/1986 | Japan ........................ 483/1 |
| 9844 | 1/1987 | Japan ........................ 483/1 |
| 62-44336 | 2/1987 | Japan . |
| 5751 | 1/1989 | Japan ........................ 483/1 |
| 5-329733 | 12/1993 | Japan . |

*Primary Examiner*—William Briggs
*Attorney, Agent, or Firm*—Sughrue, Mion, Zinn, Macpeak & Seas, PLLC

[57] ABSTRACT

In the tool change device, a tool change arm 27 for changing a tool 25 with respect to a main spindle 24, a main tool magazine 29 including a plurality of hold grooves 30 arranged linearly for holding the tools 25, and a tool storage member 41 including at least one storage portion 46 for storing the tool 25 are arranged in the back-and-forth direction of the tool change device. In order that the tools 25 can be delivered between the tool change arm 27 and main tool magazine 29, between the main tool magazine 29 and tool storage member 41, and between the tool storage member 41 and tool change arm 27, a single tool loader L is disposed in such a manner that it can be moved in correspondence to the tool change arm 27, main tool magazine 29 and tool storage member 41.

39 Claims, 27 Drawing Sheets

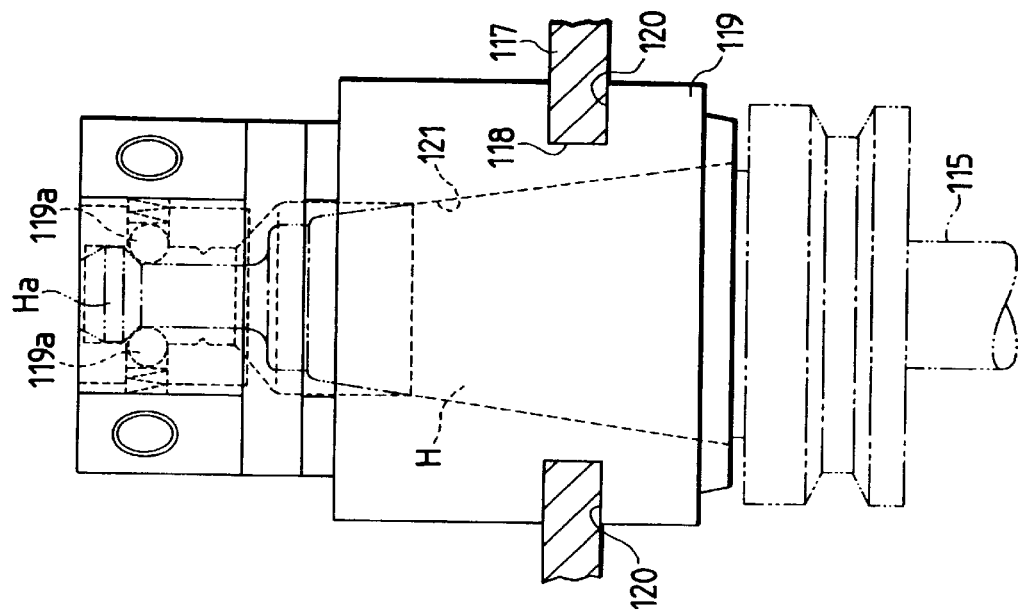
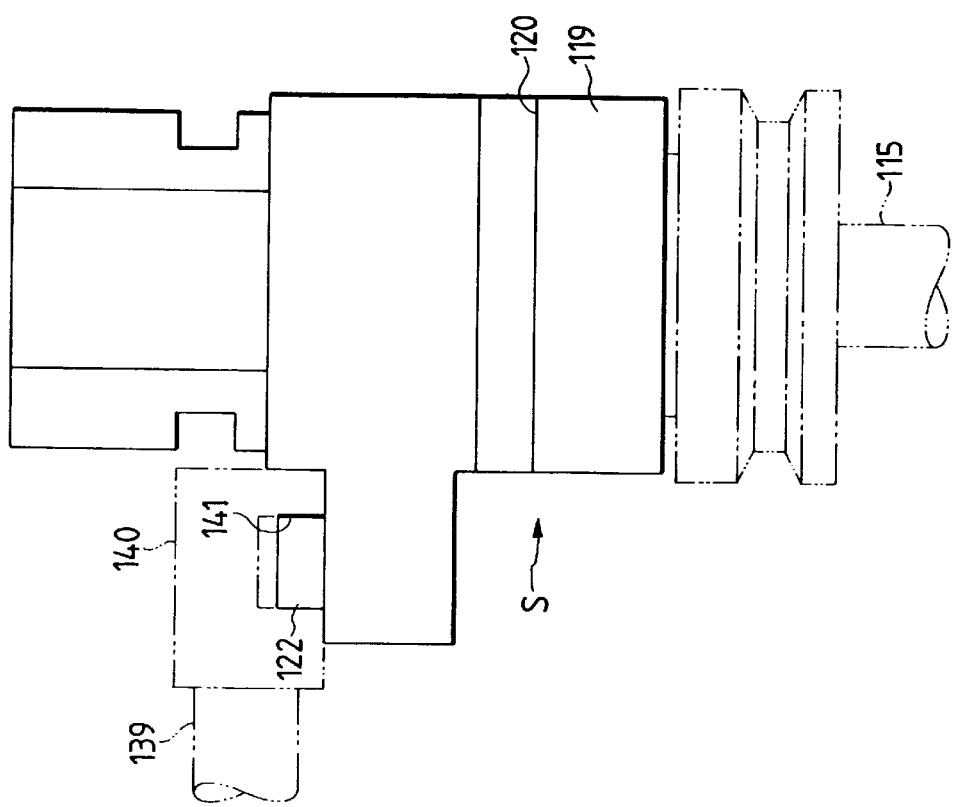

TOOL CHANGE DEVICE AND TOOL CHANGE METHOD

This is a Continuation-in-Part of application Ser. No. 08/837,944 filed Apr. 28, 1997, U.S. Pat. No. 5,885,200.

BACKGROUND OF THE INVENTION

The present invention relates to a tool change device and a tool change method which selects one of two or more tools respectively held in two or more hold portions formed on a tool magazine and replaces a tool mounted on a main spindle with the thus selected tool.

In a tool change device of this type, when a tool held in the hold portion of a tool magazine exceeds a predetermined number of times of use or is damaged, the tool must be replaced with a new one. In this case, conventionally, an operator directly removes the old tool from the hold portion of the tool magazine and then mounts a new one onto the same hold portion of the tool magazine by hand. However, the tool magazine is generally disposed adjacent to a working position at which a main spindle is disposed and also the tool magazine is so arranged as to perform its operation such as rotation or the like in synchronization with a tool change operation. For this reason, in the conventional tool change device, while the working operation is stopped temporarily, the replacement of the old tool with a new one is carried out with respect to the hold portion of the tool magazine. That is, at first, the old tool is manually removed from the hold portion of the tool magazine and, afterwards, a new one is also manually inserted into the same hold portion of the tool magazine. However, it takes time to execute such manual tool replacement operation and, at the same time, the operator must be always present on the spot during the tool replacement operation, which results in a poor operation efficiency. This in turn lowers the working efficiency of the working operation.

Further, in a tool change device of the above-mentioned type, there is provided a tool magazine of a rotation type which is used to hold a plurality of tools on standby. And, as the need arises, a tool mounted on a main spindle is replaced with one of the tools held on the tool magazine by a tool change arm.

The above-mentioned conventional tool change device, for example, when replacing a tool which is damaged during the working operation, such replacement is normally carried out by means of the main spindle or tool magazine. When the tool replacement is executed by means of the main spindle, the operation of a machine must be stopped and a cover must be removed for the operation, which results in the waste of much time. When two or more tools are replaced, since the tools are taken out from the tool magazine, the above-mentioned operation must be executed repeatedly. Also, when changing the tools by means of the tool magazine, the tool magazine is indexingly rotated to thereby index a vacant hold portion to a tool replacing position, where an operator inserts a new tool. Or, an old tool held in the tool magazine is indexed to a tool replacing position, where the old tool is replaced with a new tool. After then, the tool magazine is indexingly rotated to thereby index a new tool to a take-out position for tool change, and the new tool is then taken out to the tool change position, before a tool change operation by the tool change arm can be carried out. Therefore, according to the prior art, not only does it take time to execute the tool change operation but also, in any of the above conventional tool change devices, since the tool change operation is carried out by means of the tool magazine, the tools must be changed in a state in which the operation of the machine is stopped, for example, by cutting off the power of the machine. That is, the machine cannot be operated during the tool changing operation, which provides an obstacle to an improvement in the efficiency of the working operation.

Also, conventionally, there is a tool change device structured such that there are provided a main tool magazine and a subordinate tool magazine and tools are delivered and received between the two tool magazines. However, in this type of tool change device as well, the tool change with respect to the main spindle is carried out by means of the main tool magazine. That is, in this tool change device as well, there is left the above-mentioned problem that the efficiency of the working operation cannot be improved.

A tool magazine in a typical conventional tool change device is formed in a disklike shape and a plurality of hold grooves for holding detachable tools are formed around the outer periphery of the tool magazine in such a state that the hold grooves are opened radially. Since the disklike tool magazine in the conventional tool change device has the hold grooves around its outer periphery, however, a large unutilizable space is formed in the central portion of the tool magazine and the problem is that the tool change device tends to become large-sized. When a damaged tool is replaced during the machining operation, moreover, the tool has normally been replaced via the main spindle or the tool magazine. As it is necessary not only interrupting the operation of a machine but also removing a cover to do the work of replacing the tool on the main spindle, a great deal of time is to be wasted. In the case of replacing a plurality of tools, the above-mentioned work has to be repeated for the convenience of calling the tools from the tool magazine.

When a tool is replaced in such a tool magazine, furthermore, the tool magazine is indexingly rotated to index a vacant hold portion to a tool change position, where an operator inserts a new tool or an old tool held in the tool magazine is indexed to a tool change position, where the old tool is replaced with a new tool. Then the tool magazine is indexingly rotated again to index a new tool to a take-out position for tool change and the new tool is then taken out to the tool change position, whereby to carry out a tool change operation by means of a tool change arm. Accordingly, it takes much time to effect the tool change operation and in either case above, the tool change operation has to be performed while the operation of the machine is stopped since the work of changing tools is done via the tool magazine. In other words, the machine cannot be operated during the tool change operation, which results in impairing improvement in the efficiency of machining work.

In order to solve the foregoing problems, a tool change device having a linear type tool magazine as shown in FIG. 36 has been proposed by Japanese Patent Unexamined Publication No. Hei. 7-32238. This linear type tool change device comprises a main spindle 204 rotatably supported by a main spindle head 203 vertically movably supported by a column 202 disposed on a base 201 in such a manner as to be movable longitudinally and laterally, a tool magazine 209 linearly disposed with a plurality of hold portions 210 opened in one direction, a tool interchanging means 206 provided on one end side of the tool magazine 209, and a tool loader 212 which is moved between a tool change position P3 and a position P2 corresponding to each hold portion 210 of the tool magazine 209 via a ball screw 227 rotated by a driving motor 225 and used for receiving and delivering a tool from and to a tool change arm 207 fitted to the tool interchanging means 206 and the hold portion 210 of the tool magazine 209.

A new tool is contained in each hold portions 210 of the tool magazine 209 (only one tool is shown and the rest is omitted). When a tool 205 fitted to the spindle 204 is replaced, the tool is replaced with a desired new tool by the tool change arm 207 of the tool interchanging means 206 and then the old tool thus replaced is conveyed by the tool loader 212 to an desired one of the hold portions 210.

However, there develops a problem arising from a decrease in the rate of operation of the working machine because the operation of the working machine must be stopped until an operator completes the work of replacing the old tool with a new one when the old tool is replaced.

SUMMARY OF THE INVENTION

It is an object of the present invention to eliminate the above-mentioned problems found in the conventional tool change devices.

That is, it is an object of the present invention to provide a tool change device and a tool change method which, when a tool held in the hold portion of a tool magazine reaches its replacement time due to wear or the like, permits the old tool to be automatically replaced with a new one in a short time with respect to the tool magazine while continuing a working operation, and is thereby able to enhance the working efficiency of the working operation, and it is also an object of the present invention to provide a tool change device and a tool change method which not only can execute a normal tool change operation through a tool magazine but also can directly bring a tool from a tool change position to a tool change member not through the tool magazine or vice versa, thereby being able to execute the tool change in a short time.

The above object can be attained by a tool change device 3. according to the present invention comprising: a main spindle having a leading end on which a tool is mounted; a tool magazine including a plurality of hold portions capable of holding a plurality of tools; a tool interchanging member disposed on one side of the tool magazine for interchanging the tool mounted on the main spindle with a tool taken out from one of the hold portions of the tool magazine; a tool storage member disposed on the other side of the tool magazine for storing at least one tool to be substituted for one of the tools held in the tool magazine and the tool mounted on the main spindle; and a tool carrying member for carrying the tool stored on the tool storage member to the hold portions on the tool magazine and for carrying one of the tools held on the hold portions to the tool storage member.

In addition, the above object can be attained by a tool change method in a tool change device comprising:

a main spindle having a leading end on which a tool is mounted;

a tool magazine including a plurality of hold portions capable of holding a plurality of tools;

a tool interchanging member disposed on one side of the tool magazine for interchanging the tool mounted on the main spindle with a tool taken out from one of the hold portions of the tool magazine;

a tool storage member disposed on the other side of the tool magazine for storing at least one tool to be substituted for one of the tools held in the tool magazine and the tool mounted on the main spindle; and a tool carrying member for carrying the tool stored on the tool storage member to the hold portions on the tool magazine and for carrying one of the tools held on the hold portions to the tool storage member, wherein the hold portions are arranged on a straight line; and the tool mounted on the main spindle is interchanged with a tool taken out from one of the hold portions of the tool magazine and the tool storage member at a tool interchanging position (P3), in which the tool carrying member is movable among holding positions respectively corresponding with the holding portions, the tool interchanging position and tool storage position corresponding with the tool storage member so as to deliver and receive the tool among the holding portions of the tool magazine, the tool interchanging member and the tool storage member, the tool change method comprising the step of:

carrying a tool from the tool storage position to one of the holding position and the tool interchanging position directly without passing through the holding position.

Therefore, when a tool held in the hold portion of a tool magazine reaches its replacement time due to wear or the like, the tool change device and the tool change method according to the present invention permits the old tool to be automatically replaced with a new one in a short time with respect to the tool magazine while continuing a working operation, and is thereby able to enhance the working efficiency of the working operation.

The above-mentioned tool change device may be modified in such a manner that the hold portions are arranged on a straight line; and the tool mounted on the main spindle is interchanged with a tool taken out from one of the hold portions of the tool magazine and the tool storage member at a tool interchanging position (P3), in which the tool carrying member is movable among holding positions respectively corresponding with the holding portions, the tool interchanging position and a tool storage position corresponding with the tool storage member so as to deliver and receive the tool among the holding portions of the tool magazine, the tool interchanging member and the tool storage member.

Therefore, in the above-mentioned tool change device, the tool change position, the respective hold portions of the tool magazine, and the tool storage member can be arranged in order substantially on a straight line, the tool carrying mechanism can be moved quickly along these parts, and the tool can be changed in a short time between the tool replacing member and tool magazine, between the tool magazine and tool storage member, and between the tool storage member and tool replacing member. Due to this, the tool can be replaced with respect to the tool magazine even during the working operation.

Further, in the above-mentioned tool change device, the plurality of hold portions of the tool magazine may be arranged at an equal pitch. Thereby, the structure of the tool magazine and the feed control of the tool carrying mechanism are both simplified.

In the above-mentioned tool change device, the plurality of hold portions of the tool magazine may be in part or wholly arranged at unequal pitches. Thereby, the hold portions of the tool magazine can be formed at intervals which are matched to the sizes of the tools, which makes it possible to improve the storage efficiency of the tools.

In the above-mentioned tool change device, in correspondence to the respective hold portions of the tool magazine, there may be provided a plurality of sensors which are respectively used to detect the abnormal conditions of tools respectively held in the hold portions. Thereby, when tools respectively held in the hold portions of the tool magazine are unusable due to wear or the like, or when tools are not held accurately in their respective hold portions, that is, when any abnormal conditions occur in the tools, the abnormal conditions can be detected by their associated sensors.

In the above-mentioned tool change device, the tool storage member may be structured such that it can be moved between a position, where a tool is delivered and received between the tool carrying member and the tool storage member, and the tool replacing (inserting and discharging) position spaced apart from the present position. Thereby, even when the tool magazine is mounted at a high position in the upper portion of a working machine and the tool carrying member is set at a high position, the tool storage member can be moved from its delivery position down to a further lower position so that the replacing operation of the tools can be executed at a low position which facilitates the replacing operation.

In the above-mentioned tool change device, in correspondence to the tool replacing position, there may be provided a subordinate tool magazine including a plurality of hold portions respectively for holding tools therein, whereby, if the tool storage member is moved to any one of the positions that correspond to the respective hold portions of the subordinate tool magazine, then tools can be replaced between the tool storage member and the hold portions of the subordinate tool magazine. Thereby, all the tools corresponding to the respective hold portions of the tool magazine can be held in the subordinate magazine, so that the tools can be substituted from the subordinate magazine to the tool storage member.

In the above-mentioned tool change device, two or more stages of tool magazines may be disposed at given intervals in a direction extending at right angles to the arrangement direction of the hold portions thereof, and the tool carrying member can be moved to the positions of the respective hold portions in the respective stages of the tool magazines. Thereby, various kinds of tools are held in the respective hold portions of the respective stages of tool magazines. And, the tool carrying member can be moved to the positions that correspond to the respective stages of tool magazines.

In the above-mentioned tool change device, the tool storage member may include two or more storage portions each for storing a tool therein. Thereby, two or more kinds of new tools to be substituted can be previously stored in the tool storage member. Or, just after an old tool to be replaced is moved back to one storage portion of the tool storage member, a new tool can be taken out from the other storage portion.

In the above-mentioned tool change device, the tool magazine may be disposed in such a manner that it holds the tool in a direction different from the axial direction of the main spindle, and there may be further provided a posture change mechanism which, in a process that the tool carrying member moves the tool between one end of the tool magazine and the tool change position, rotates the tool grip portion of the tool carrying member to thereby change the posture of the tool. Thereby, the tool magazine can be disposed in the back and forth direction with respect to the tool change position, so that the whole of the working machine can be slimmed down.

In the above-mentioned tool change device, a pair of tool magazines and a pair of tool storage members may be disposed on the two sides of the axis of the tool at the tool interchanging position so that they are symmetrical to each other with respect to the tool axis, and said tool carrying member comprising a single tool loader is moved along the tool axis to thereby deliver and receive a tool selectively between the tool magazines and tool storage members disposed on the two sides of the tool axis. Thereby, the number of tools to be held can be doubled without extending the whole length of the tool magazine.

In the above-mentioned tool change device, the tool magazine and tool storage member may be disposed selectively on only one of the two sides. Thereby, when there are arranged and used two or more sets of working machines, the mounting sides of the tool magazines and tool storage members onto the working machines can be set in such a manner that they can meet lay-out and operation requirements.

In the above-mentioned tool change device, the posture change mechanisms may be provided in the tool loader, and the tool grip portion of the tool loader may be structured such that it can be rotated in correspondence to the tool magazine and tool storage member respectively disposed on both sides as well as to the tool change position. Thereby, the delivery of the tools can be easily carried out with respect to the tool magazines which are arranged on both sides, by use of a single tool loader. That is, there is eliminated the need to provide tool loaders which are used exclusively for the respective sides.

Further, in accordance with the present invention, there may be provided a tool change method in the above-mentioned tool change device, wherein the tool loader brings a tool, which is to be brought into the tool change position, from the tool magazine to the tool change position or from the tool storage member directly to the tool change position without passing through the tool magazine. Thereby, for example, when a tool being currently used must be replaced at once with a new tool in a working process due to damage or the like, the new tool is directly delivered from the tool storage member to the tool change position not through the tool magazine. Due to this, the replacement of the old tool with the new tool can be executed in a short time without the intervention of a tool magazine indexing operation or the like which has been necessary in the conventional tool change method.

Furthermore, in accordance with the present invention, there may be provided a tool change method in the above-mentioned tool change device, wherein a new tool to be substituted is previously stored in the tool storage member, and the new tool stored in the tool storage member is brought to the tool magazine or directly to the tool change position without passing through the tool magazine by use of the tool loader, before an old tool, which is stored within the tool magazine and is to be replaced, is discharged out to the tool storage member. Since a new tool is previously held on the tool storage member, when an old tool becomes unusable due to damage or the like, the old tool can be replaced at once with the new tool held on the tool storage member.

In accordance with the present invention, there may be provided a tool change method in the above-mentioned tool change device, before a new tool to be substituted is brought from the tool storage member to the tool magazine or directly to the tool change position by the tool loader, an old tool which is stored within the tool magazine and is to be replaced is discharged out to the tool storage member by the tool loader. Because an old tool held on the tool magazine is firstly discharged out to the tool storage member, an operator can store a correct new tool to be substituted into the tool storage member after confirmation of the discharge of the old tool.

In accordance with the present invention, there may be provided a tool change method in the above-mentioned tool change device, wherein an old tool once discharged out to the tool storage member can be brought again to the tool magazine or directly to the tool change position without passing through the tool magazine by the tool loader. Thereby, an old tool once discharged can be returned back to the working machine and used there for the time being so long as the use of the old tool is permitted. And, for example, even after an operation to replace an old tool with a new tool has been executed by an operator, the working operation can be continued.

In accordance with the present invention, there may be provided a tool change method in the above-mentioned tool change device, wherein the storage portions of the tool storage member are respectively used as exclusive storage portions for the new and old tools to be changed. Thereby, the tool loader is able to carry out the delivery of new and old tools at a given position with respect to the tool storage member.

In addition, in accordance with the present invention, there may be provided a tool change method in the above-mentioned tool change device, wherein the hold portion of the tool magazine that is nearest to the tool storage member is used as a provisional hold portion and, after a tool taken out from the tool storage member or tool magazine is once provisionally put into the provisional hold portion by the tool loader, the next operation is executed.

Therefore, after the tool loader takes out an old tool or a new tool from the tool magazine or from the tool storage member, the tool loader puts the old or new tool provisionally in a provisional hold portion set in the end portion of the tool magazine. Therefore, whether either old or new tool is taken out firstly, the replacement of the old and new tools can be achieved with a high efficiency by the tool loader.

Further, in the tool change device according to the present invention, the tool storage member may comprise a plurality of tool storage portions and the tool carrying member may comprise tool removing and mounting member for removing and mounting the tools between storage portions of said tool storage member and the hold portions of said tool magazine. Therefore, when a tool held in the hold portion of a tool magazine cannot be used any longer due to wear or the like, simply by an operator having previously set a new tool in a tool storage member at a proper time while allowing a working operation to continue, the old unusable tool on the tool magazine can be replaced with the new tool automatically in a short time by a tool removing and mounting member. That is, in a state that the new tool is stored in one of the storage portions of the tool storage member, the old unusable tool is replaced with the new tool between the storage portion of the tool storage member and the hold portion of the tool magazine by the tool removing and mounting member.

In the above-mentioned tool change device, the tool carrying member comprises a moving member for moving one of tool storage portions to a first position where a tool is delivered and received between the tool storage member and the tool removing and mounting member. Therefore, in the tool removing and mounting operation to be executed by the tool removing and mounting member, one of the storage portions that are respectively formed on the tool storage member is moved by moving member to and positioned at a tool removing and mounting position which corresponds to the hold portion of the tool magazine situated at a tool replacing position on the tool magazine. Due to this, the old and new tools replacement operation by the tool removing and mounting member can be carried out with high efficiency between the storage portion of the tool storage member and the hold portion of the tool magazine.

In the above-mentioned tool change device according to the present invention, the tool is moved by the tool removing and mounting member between the first position and a second position where one of the hold portions of the tool magazine is disposed.

Therefore, in the tool removing and mounting operation to be executed by the tool removing and mounting member, the tool removing and mounting member is moved between the storage portion of the tool storage member situated at the tool replacing position thereon and the hold portion of the tool magazine situated at the tool replacing position thereon. Thanks to this, even if the tool storage member is disposed at a position spaced from the tool magazine, the tool removing and mounting operation can be executed smoothly and in a short time.

In the above-mentioned tool change device according to the present invention, the tool storage member may be moved between a relay position containing the first position (P1) and a third position (P2) spaced apart from the first position where a tool is inserted into and discharged from the tool storage member. Therefore, when replacing an old tool with a new one in the tool storage portion of the tool storage member, the tool storage member is moved between a relay position including the above-mentioned tool removing and mounting position and a tool replacing position spaced apart from the relay position. Due to this, even when the tool magazine is disposed at a high position in the upper portion of a working machine and a tool removing and mounting position is thus set at a high position, the tool replacing position can be set at a low position and thus the operator can remove the old tool from the storage portion of the tool storage member and then mount the new tool into the tool storage member storage portion easily and safely.

Furthermore, an object of the present invention is to provide a tool change method and a tool change device which permit an operator to do the work of replacing a old tool safely without interrupting the operation of a working machine.

In order to solve the foregoing problems according to the present invention, the following means are employed. More specifically, according to the present invention, a tool change method in a tool change device comprising a main spindle, a tool magazine including a plurality of hold portions arranged on a straight line in such a state that the hold portions are opened in one direction, tool interchanger means provided on one side of the tool magazine, a tool storage member provided on the other side of the tool magazine, a tool loader which is moved to any one of a tool change position, a position corresponding to each hold portion of the tool magazine and a position corresponding to the tool storage member, whereby to receive and deliver a tool from and to a tool change arm installed in the tool interchanger, the hold portion of the tool magazine and the tool storage member, a tool-change predicting counter and a tool loader stopper, the tool change method comprising the step of preventing the tool loader from moving to the position corresponding to the tool storage member by actuating the tool loader stopper when a tool is replaced in the tool storage member.

A tool change device according to the present invention comprises a main spindle, a tool magazine including a plurality of hold portions arranged on a straight line in such a state that the hold portions are opened in one direction, tool interchanger provided on one side of the tool magazine, a tool storage member provided on the other side of the tool magazine, a tool loader which is moved to any one of a tool change position, and a position corresponding to each hold portion of the tool magazine and a position corresponding to the tool storage member, whereby to receive and deliver a tool from and to any one of a tool change arm installed in the tool interchanger means, the hold portion of the tool magazine and the tool storage member, wherein a tool loader stopper is provided for preventing the tool loader from moving to the position corresponding to the tool storage member when a tool is replaced in the tool storage member.

According to the present invention, the tool change device is such that the tool loader stopper is provided movably at a substantially right angle to the direction in which the tool loader is moved forward between the other end of the tool magazine and the tool storage member.

BRIEF DESCRIPTION OF THE DRAWINGS

FIG. 24 is an enlarged top plan view of a tool pot employed in the embodiment;

FIG. 25 is a side view of the above tool pot, showing how it is mounted in a tool magazine when viewed from the S direction shown in FIG. 24;

DETAILED DESCRIPTION OF PREFERRED EMBODIMENTS (First Embodiment)

Now, description will be given below in detail of a first embodiment of a tool change device according to the invention with reference to FIGS. 1 to 9.

Figure 1:
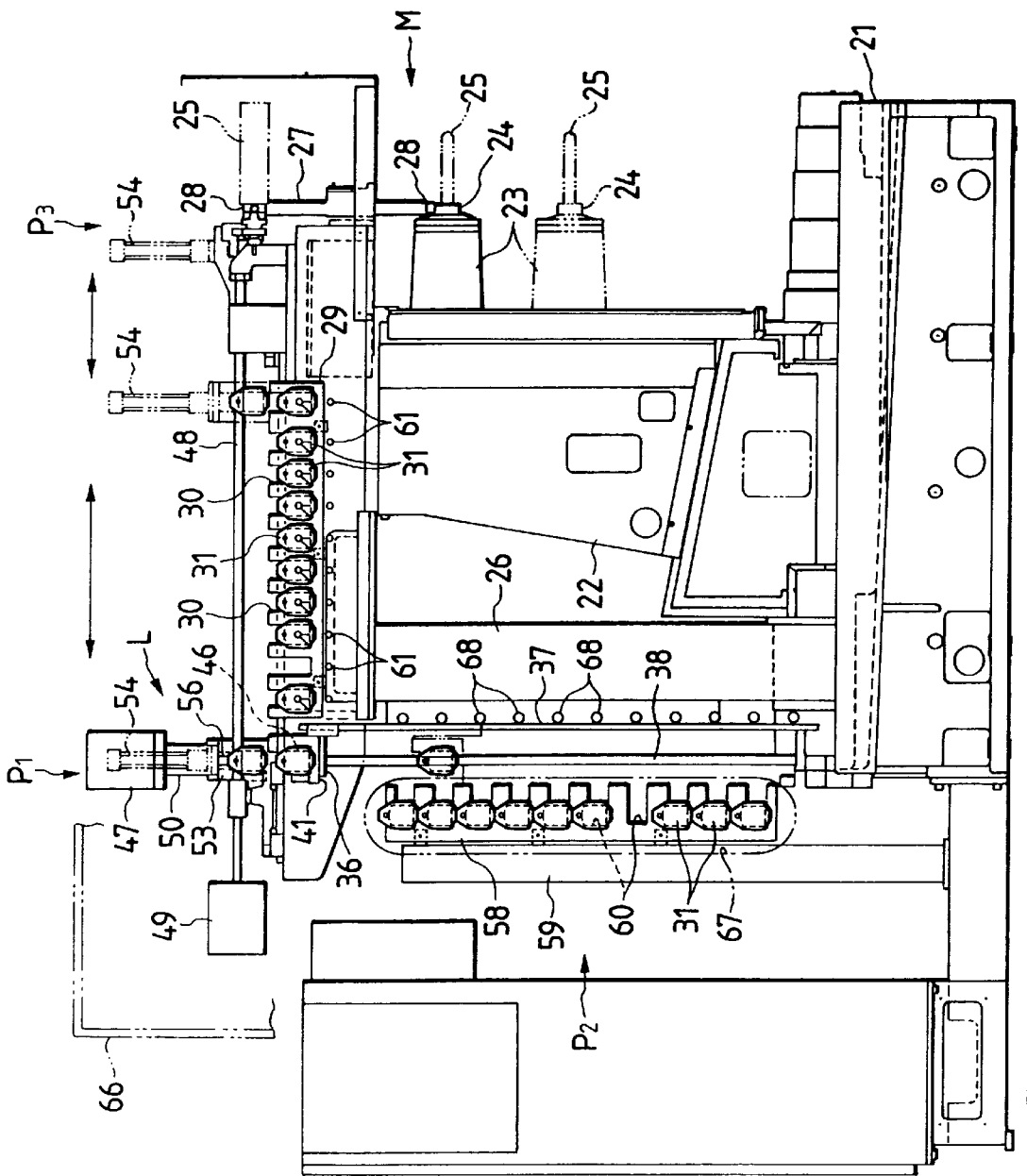
FIG. 1 is a front view of a first embodiment of a tool change device according to the invention.

As shown in FIG. 1, a working machine M comprises a base 21, a column 22 disposed on the base 21 in such a manner that it can be moved in the back and forth direction and in the right and left direction, and a main spindle head 23 supported by the column in such a manner that it can be moved in the vertical direction. A main spindle 24 is rotatably supported by the main spindle head 23, while a tool 25 such as a drill or the like can be removably mounted on the leading end of the main spindle 24. And, in a state that the main spindle head 23 is located at a downwardly set lower working position shown by a chained line in FIG. 1, while the main spindle 24 is being rotated, the column 22 is moved with respect to a work put on a table (not shown) and the tool 25 is driven to execute a given work on the work.

A frame 26 is erected on the base 21. A tool change arm 27 is supported on the side surface in such a manner that it is positioned upwardly of the main spindle 24 and also that it can be rotated around an axis parallel to the axis of the main spindle 24 and can be advanced and retreated in the axial direction, while the tool change arm 27 includes tool grip portions 28 respectively formed at the two end portions thereof. And, in a state that the main spindle head 23 is positioned at an upwardly set upper position shown by a solid line in FIG. 1, if the tool change arm 27 is rotated around the axis and is moved in the axial direction, then a tool 25 held on the main spindle 24 side and a tool 25 delivered from a tool magazine 29 (which is hereinafter referred to as a main tool magazine) to a tool change position P3 are respectively gripped by the tool grip portions 28 and are then removed and mounted at the same time, that is, the former tool is replaced with the latter.

The main tool magazine 29, which has a flat plate shape long from side to side, is fixed on the frame 26 in such a manner that it is positioned backwardly of the tool change arm 27, while the main tool magazine 29 also extends in the longitudinal direction of the main spindle 24. A plurality of hold grooves 30 serving as hold portions are formed and arranged at a given pitch on a horizontal line extending back and forth along the upper side edge of the main tool magazine 29, while the hold grooves 30 are opened in the same direction, that is, in the upward direction. Part of the hold grooves 30, for example, a hold groove 30 used to hold a large-diameter tool such as a milling cutter or the like is arranged with respect to its adjoining hold grooves 30 at a pitch larger than the above-mentioned given pitch.

Figure 5:
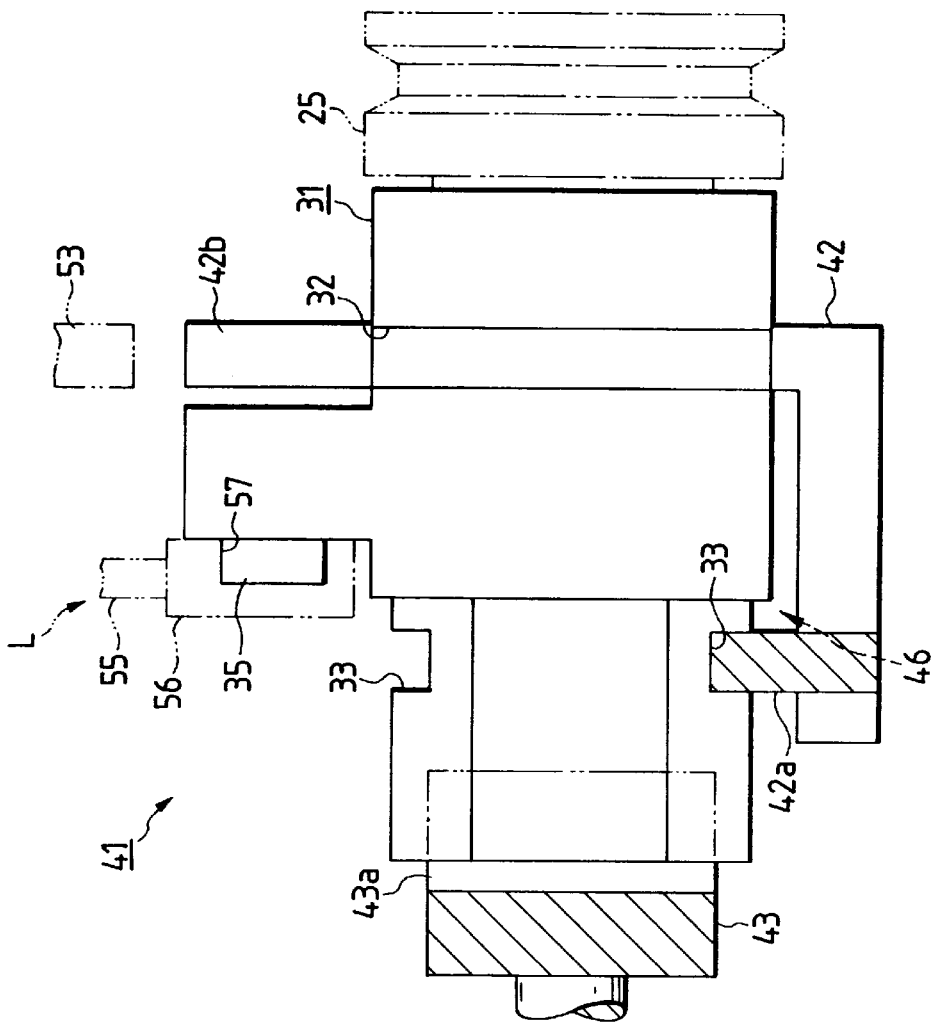
FIG. 5 is a plan view of a tool pot, showing a state thereof when it is stored in a main tool magazine.
Figure 6:
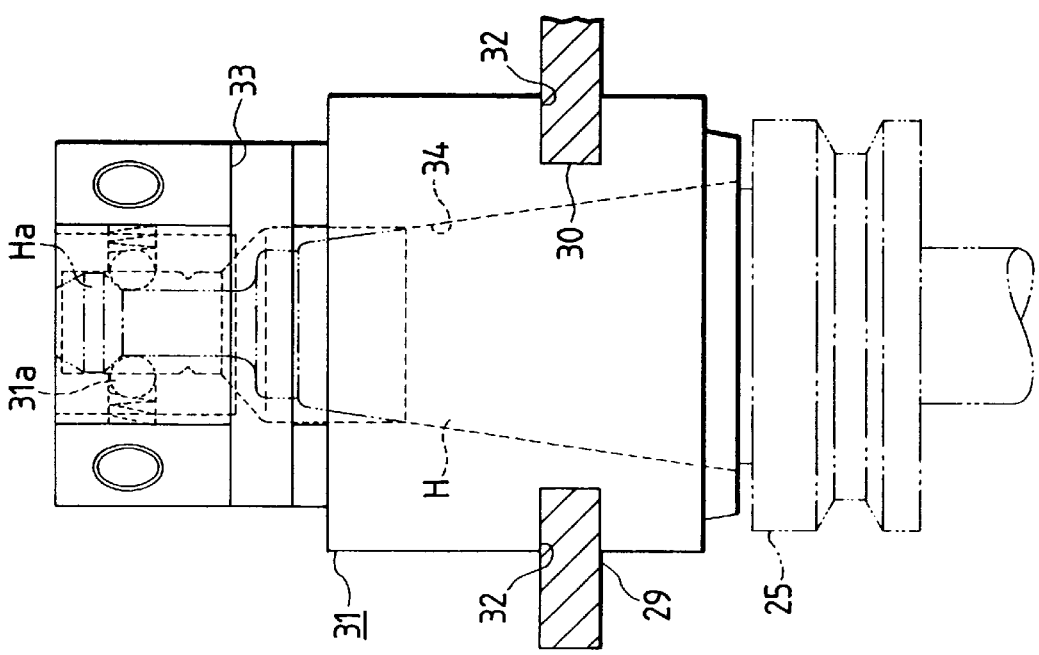
FIG. 6 is a side view of a tool pot, showing a state thereof when it is stored in a tool storage member.

As shown in FIGS. 5 to 8, a plurality of tool pots 31 are structured such that they can be removably held by the respective hold grooves 30 of the main tool magazine 29. Each of the tool pots 31 includes on the outer surface thereof a first engaging groove 32 engageable with the two side edges of the hold groove 30 and a second engaging groove 33 which is formed at a position spaced apart from the first engaging groove 32 and is 90° different in direction from the first engaging groove 32. A taper hole 34 is formed in the central portion of the tool pot 31, while a holder H for the tool 25 can be removably inserted or fitted into the taper hole 34. Also, in the end portion of the tool pot 31, there are installed four lock balls 31a which are respectively spring energized from four positions toward the central portion of the tool pot end portion. That is, when the tool 25 is inserted into the tool pot 31, as shown in FIG. 5, the lock balls 31a prevent the tool 25 against removal in the portion of a pull stud Ha formed in the leading end portion of the holder H. Further, in the tool pot 31, there is projectingly provided a pin 35 which can be engaged with and disengaged from a hook member 56 which is provided in a tool loader L to be discussed later.

Figure 4:
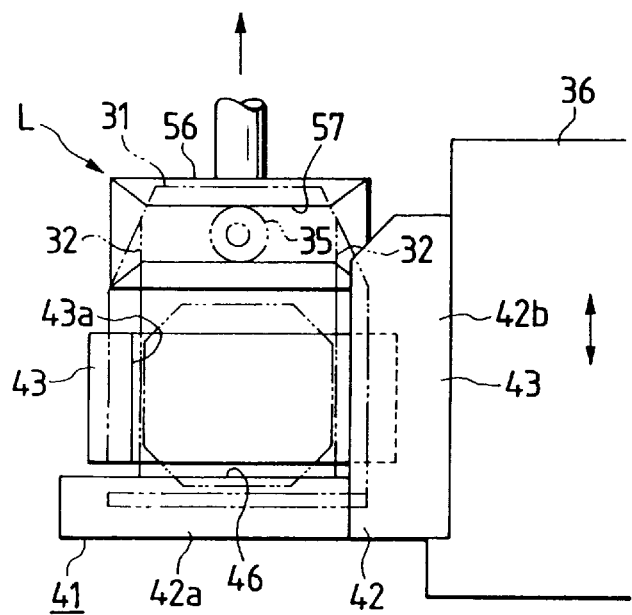
FIG. 4 is a partially front view of the first embodiment, in which a tool storage member is enlargedly shown.

As shown in FIGS. 1 and 4, a lift body 36 is guided through the main magazine 29 and a guide rail 37 to the opposite side of the tool change arm 27 and is supported in the rear portion of the frame 26, while the lift body 36 can be moved up and down by a lifting motor (not shown) through a ball screw 38. A tool storage member 41 is mounted on the lift body 36 and, as the lift body 36 is moved up and down, the tool storage member 41 can be made to face hold grooves 60 which are formed in a subordinate magazine 58 and are used as the hold portions of the subordinate magazine 58. And, as shown by a solid line in FIG. 1, when the lift body 36 is moved up to the upper-most position, the tool storage member 41 is disposed on a horizontal line substantially as high as the main tool magazine 29.

As shown in FIGS. 4, and 6 to 8, the tool storage member 41 is composed of a storage plate 42 including a lower rail 42a and a side rail 42b, and a shift member 43 which is disposed backwardly of the storage plate 42 and includes a vertically extending groove 43a engageable with the rear side surface of the tool pot 31. The shift member 43 is connected to a piston rod 39a provided in a shifting cylinder 39 which is fixed to the lift body 36. The piston rod 39a is normally held at a contraction position and, at the then time, the shift member 43, as shown in FIG. 4, is held at the same position as the storage plate 42. In this state, the groove 43a and the respective rails 42a and 42b of the storage plate 42 cooperate together in forming a storage portion 46 in which the tool pot 31 having the tool 25 fitted therewith can be engaged with and secured by the first engaging groove 32, the second engaging groove 33, and the rear portion of the tool pot 31. At the then time, the storage portion 46 is opened upwardly and thus, similarly to the hold grooves 30 of the main tool magazine 29, the tool pot 31 can be removed and mounted by the hook member 56 of the tool loader L with respect to the storage portion 46. Also, if the piston rod 39a is expanded by member of the shifting cylinder 39, then the tool pot 31 can be replaced with respect to the hold groove 60 formed in the subordinate tool magazine 58.

Figure 2:
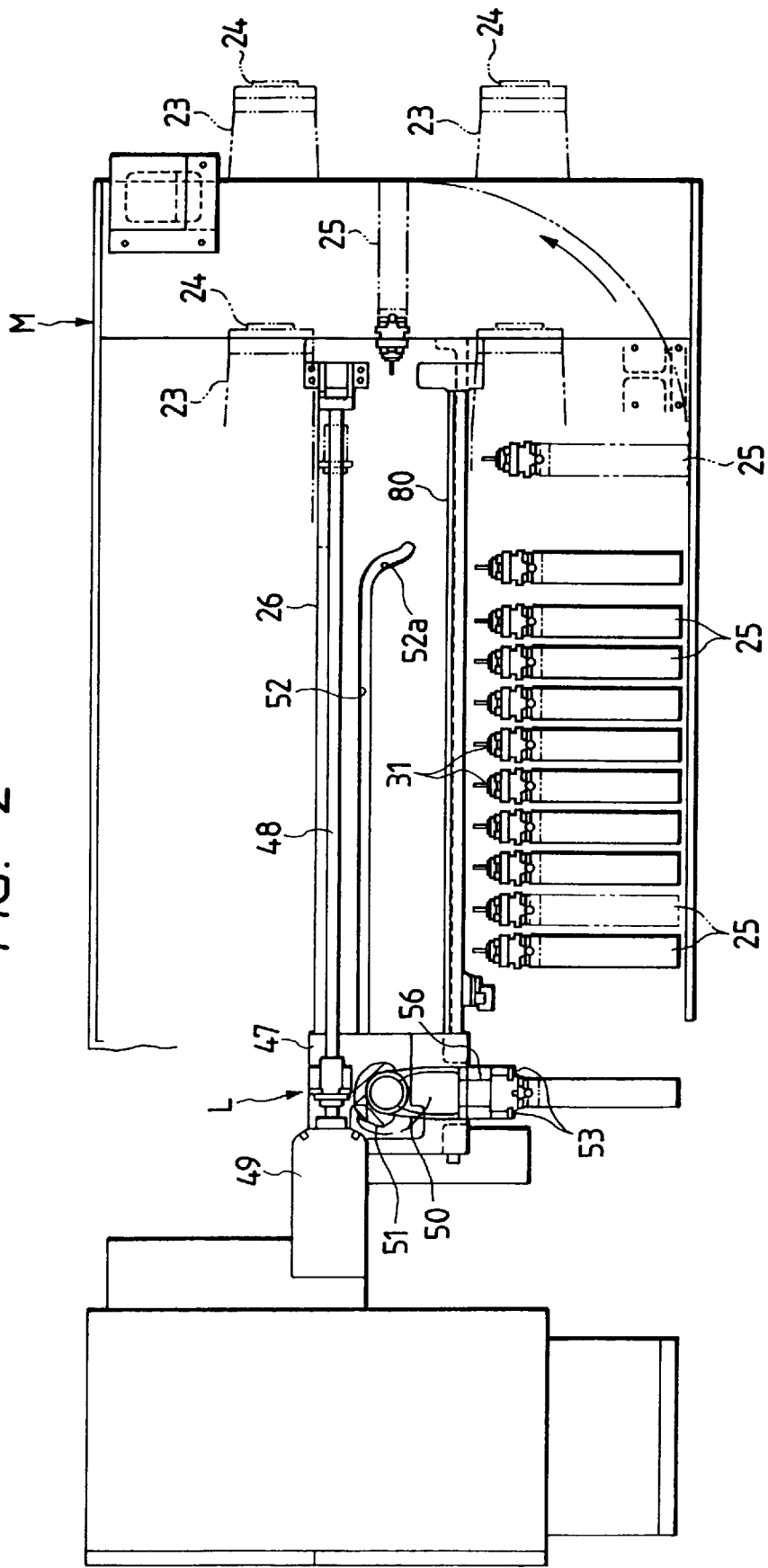
FIG. 2 is a plan view of the main portions of the first embodiment.
Figure 3:
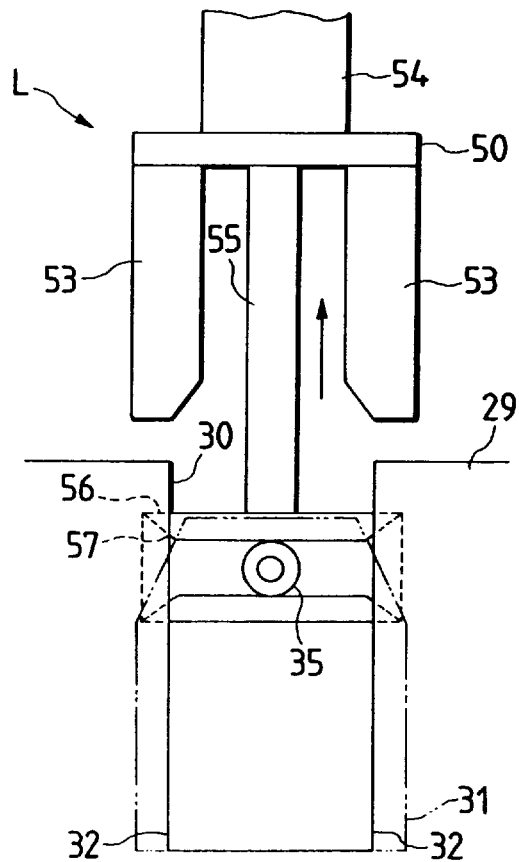
FIG. 3 is a partially front view of the first embodiment, in which a tool loader is enlargedly shown.

As shown in FIGS. 1 to 3, a moving body 47 forming the tool loader L is supported on the frame 26 through the ball screw 48 and guide rail 80 in such a manner that the moving body 47 can be moved linearly in the back-and-forth direction between a tool delivery position P1 with respect to the tool storage member 41 held at the upper-most position and a tool change position P3 corresponding to the tool change arm 27. The ball screw 48 is rotatably supported on the frame 26 and, if the ball screw 48 is rotated by a moving motor 49, then the moving body 47 can be moved in the back-and-forth direction.

A rotary body 50 forming the tool loader L is rotatably supported on the moving body 47, while an engaging pin 51 is projectingly provided in part of the rotary body 50. A cam groove 52 is formed on the frame 26 in such a manner that it extends along the ball screw 48, while the cam groove 52 includes a curved portion 52a formed in one end portion thereof corresponding to the tool change arm 27. And, when the engaging pin 51 on the rotary body 50 is engaged with the cam groove 52 and the moving body 47 is moved to the one end portion side thereof corresponding to the tool change position P3, due to the action of the curved portion 52a, there is generated in the rotary body 50 through the engaging pin 51 a rotational force which goes counterclockwise in FIG. 2.

As shown in FIGS. 1, 3, 4 and 6, a pair of grip arms 53, which cooperate together with the hook member 56 in forming the tool grip portion, are suspended from the rotary body 50 and are arranged such that they are spaced apart from each other in the moving direction of the moving body 47. And, when the moving body 47 is moved to a position which corresponds to the respective hold grooves 30 of the main tool magazine 29 or to the storage portion 46 of the tool storage member 41, the grip arms 53 are positioned from above in such a manner that they correspond to the first engaging groove 32 of the tool pot 31 held in each of the hold grooves 30 or in the storage portion 46.

A delivery cylinder 54 is disposed on the rotary body 50. The hook member 56 is fixed to a piston rod 55 for the delivery cylinder 54, while the hook member 56 includes an engaging groove 57 which is formed in the front surface thereof and extends in the back-and-forth direction. In a state that the hook member 56 is situated at a lower position by the cylinder 54, when the moving body 47 is moved to the position corresponding to the respective hold grooves 30 of the main tool magazine 29 or to the storage portion 46 of the tool storage member 41, the pin 35 on the tool pot 31 is inserted into and is engaged with the engaging groove 57 of the hook member 56. After then, if the hook member 56 is moved upward by the delivery cylinder 54, then the tool pot 31 is taken out from the hold groove 30 or storage portion 46 and is then inserted and gripped between the grip arms 53.

Also, after the tool loader L gripping the tool pot 31 is moved to the position corresponding to the hold groove 30 of the main tool magazine 29 or to the storage portion 46 of the tool storage member 41 due to the movement of the moving body 47, if the hook member 56 is moved downward by the delivery cylinder 54, then the tool pot 31 is inserted into and held by the hold groove 30 or storage portion 46. After then, if the tool loader L is moved apart from the position corresponding to the hold groove 30 or storage portion 46 due to the movement of the moving body 47, then the pin 35 of the tool pot 31 is disengaged from the engaging groove 57 of the hook member 56.

Further, when the tool loader L gripping the tool pot 31 by means of the hook member 56 is moved due to the movement of the moving body 47 to an advance position that corresponds to the tool change position P3, as described above, due to the engagement between the engaging pin 51 and the curved portion 52a of the cam groove 52, the rotary body 50 of the tool loader L is rotated counterclockwise in FIG. 2. As a result of this, the tool 25 is positioned at the tool change position P3 where the axis of the tool 25 is coincident with the axial direction of the main spindle 24. Next, by means of the advancing and retreating operation as well as the rotational operation of the tool change arm 27 shown in FIG. 1, the tools 25 are removed and mounted at the same time between the main spindle 24 and the tool pot 31 of the tool loader L. After then, if the tool loader L is returned to a back position due to the movement of the moving body 47, then, due to the action of the cam groove 52, the tool 25 on the tool loader L is rotated together with the rotary body 50 so that the axis of the tool 25 is turned sideways.

As shown in FIGS. 1, 6, 7 and 8, at a tool replacing position P2, the subordinate tool magazine 58, which is formed in a flat shape that is long lengthwise, is disposed on the base 21 through a bracket 59 in such a manner that it corresponds to the tool storage member 41 and extends in the vertical direction along the moving direction of the tool storage member 41. The two or more hold grooves 60 serving as the hold portions are formed and arranged along one side edge of the subordinate tool magazine 58 on a vertically extending straight line substantially at the same pitch as the hold grooves 30 of the main tool magazine 29, while the hold grooves 60 are respectively opened in the same direction, that is, in the forward direction. The tools 25 are respectively held in the respective hold grooves 60 of the subordinate tool magazine 58 by means of their engagement with the second engaging grooves 33 of the tool pots 31.

Figure 7:
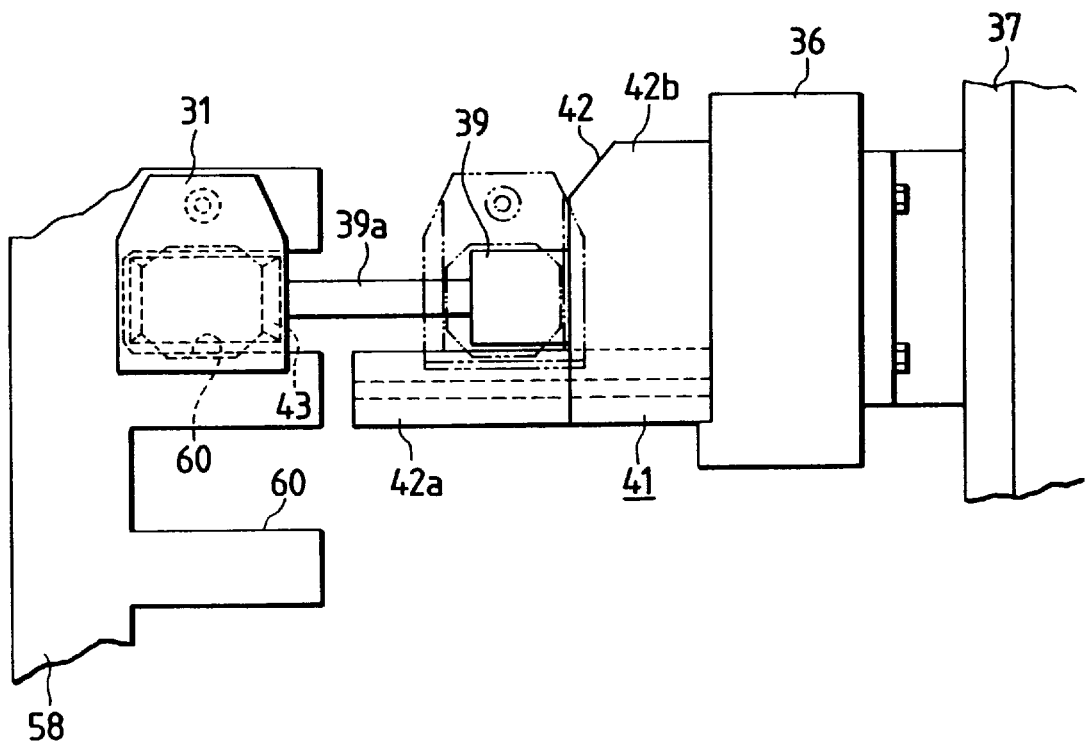
FIG. 7 is a front view of the first embodiment, showing a tool pot delivery operation between a subordinate tool magazine and a tool storage member.
Figure 8:
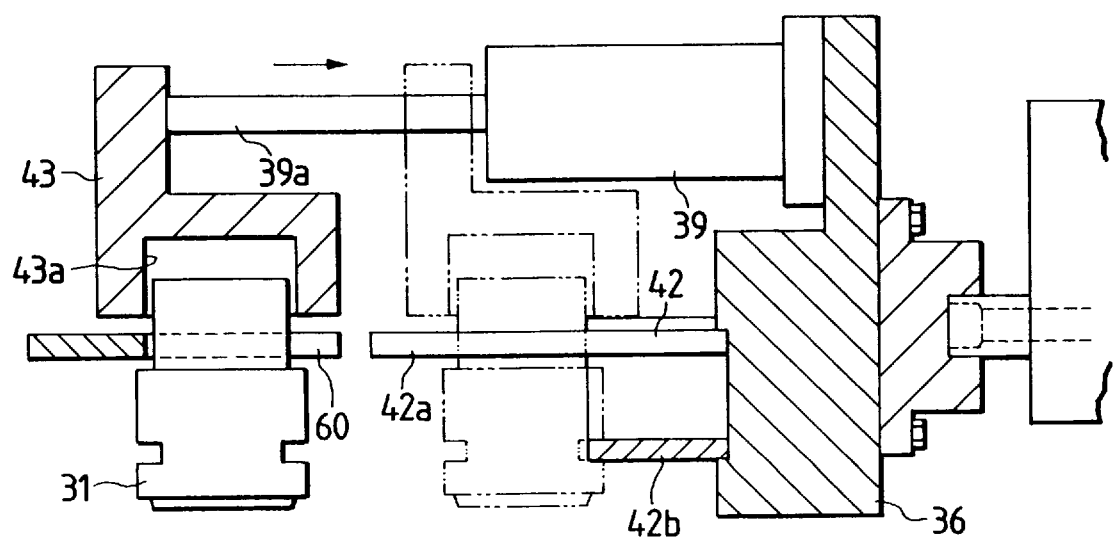
FIG. 8 is a back view of the first embodiment, showing a tool pot delivery operation between a subordinate tool magazine and a tool storage member.

To take out the tool 25 held in the hold groove 60 of the subordinate tool magazine 58, the piston rod 39a is expanded by the shifting cylinder 39 to thereby move the shift member 43 from the position corresponding to the storage portion 46 to the position corresponding to the hold groove 60 of the subordinate tool magazine 58 and, after then, the lift body 36 is moved down by the ball screw 38 to a position corresponding to a predetermined hold groove 60 of the subordinate tool magazine 58. At the then time, as shown in FIGS. 7 and 8, the shift member 43 is engaged in the shift direction with the rear portion of the tool pot 31 held in the predetermined hold groove 60. In this state, the piston rod 39a is contracted by the shift cylinder 39, while the shift member 43 is guided and moved forwardly from the hold groove 60 by the rail 42a of the tool storage member 41, and is then delivered to the storage portion 46 of the tool storage member 41.

Also, in a state that the lift body 36 is moved to and held at the upper-most position, when the tool 25 delivered from the hook member 56 of the tool loader L to the storage portion 46 of the tool storage member 41 is stored into the hold groove 60 of the subordinate tool magazine 58, the lift body 36 is moved down to the position that corresponds to a vacant hold groove 60. In this state, the shift member 43 in engagement with the tool pot 31 is guided and moved backwardly into the hold groove 60 by the shift cylinder 39, and the tool pot 31 having the tool 25 engaged therewith is delivered from the storage portion 46 of the tool storage member 41 to the hold groove 60 of the subordinate magazine 58. Further from this state, the tool storage member 41 is moved by means of the movement of the lift body 36 in correspondence to the hold groove 60 that holds a tool 25 to be taken out next, the shift member 43 is engaged with the tool pot 31 held in the present hold groove 60 and, at this position, if the shift member 43 gripping the tool pot 31 is moved to the storage portion 46, then the tool storage member 41 can receive the next tool 25 from the subordinate tool magazine 58.

Figure 9:
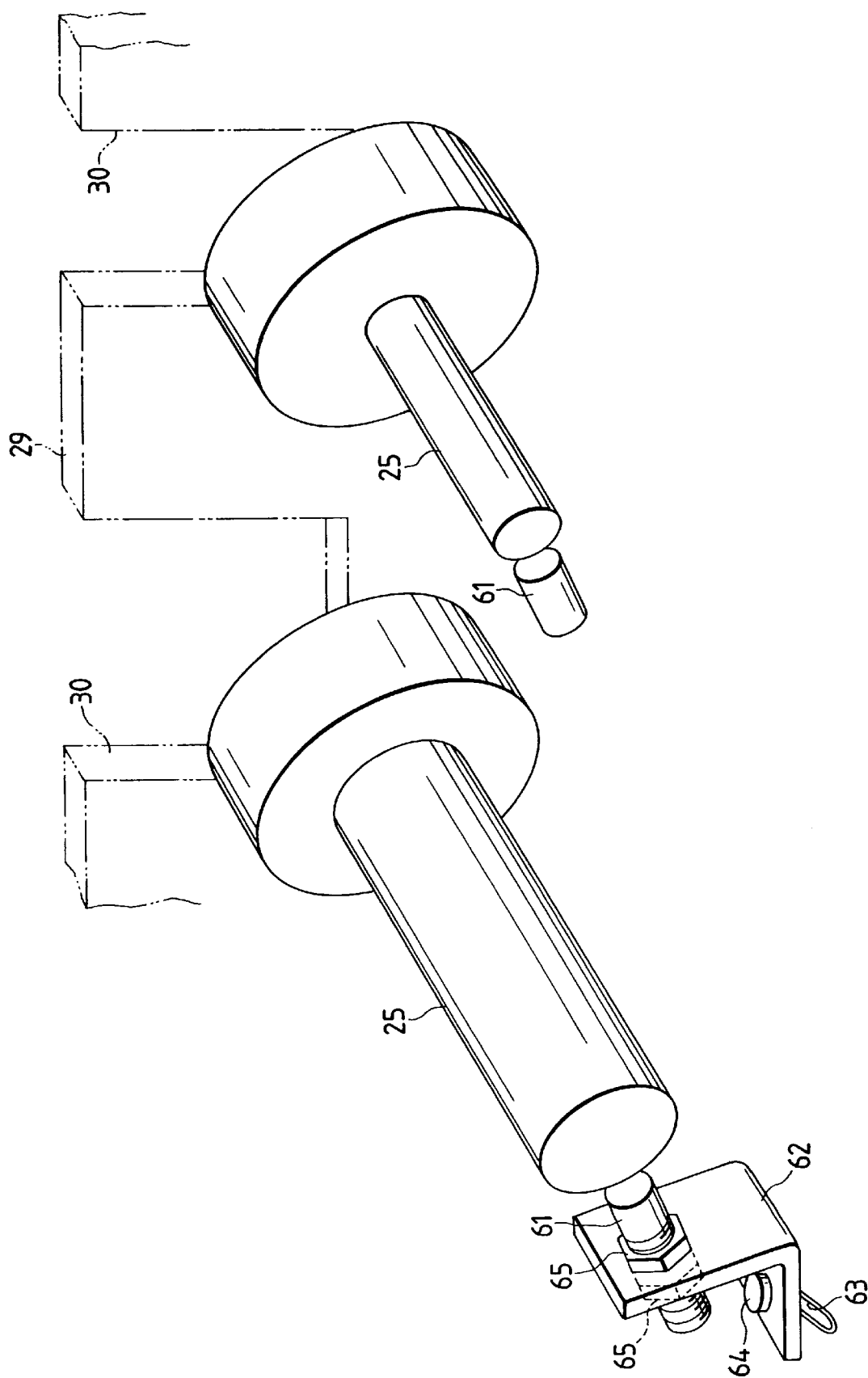
FIG. 9 is a partially perspective view of the first embodiment, showing how a tool detect sensor is structured.

As shown in FIGS. 1 and 9, a plurality of sensors 61 are arranged on the frame 26 at given intervals in such a manner that they correspond to the leading ends of the tools 25 respectively held in the hold grooves 30 of the main tool magazine 29. That is, a plurality of mounting plates 62 are mounted on the upper surface of the frame 26 by screws 65 through elongated holes 63 in such a manner that they can be adjusted in position in the axial direction of the tool 25. Also, the sensors, as they are inserted through their respective mounting plates 62, are respectively fixed by a pair of nuts 65 in such a manner that they can be adjusted in position in a direction at right angles to the axis of the tool 25.

Therefore, as shown in FIG. 9, even when the tools held in the respective hold grooves 30 of the main tool magazine 29 vary in length and thickness, the mounting positions of the mounting plates 62 and the mounting positions of the sensors 61 can be adjusted previously. Thanks to this, the leading end detect portions of the sensors 61 can be set accurately at the positions that are opposed to the leading end outer peripheries of their associated tools 25 at a given interval.

And, during the operation of the working machine M, when the tools 25 held in their associated hold grooves of the main tool magazine 29 are shorter in length due to breakage or the like, or when the tools 25 are not held in their associated hold grooves 30 accurately, that is, when abnormal conditions occur in the tools 25, the abnormal conditions of the tools 25 are detected by their corresponding sensors 61. Also, in accordance with detect signals from the sensors 61, there are issued change notices or warnings for the tools 25.

As shown in FIG. 1, a cover 66 is mounted on the base 21 in such a manner that it covers almost the whole of the tool change device. A replacing window 67 is formed in the front surface of the cover 66 in such a manner that it corresponds to the subordinate tool magazine 58, while new and old tools 25 can be delivered and removed with respect to the respective hold grooves 60 of the subordinate tool magazine 58 through the replacing window 67.

A plurality of display lamps 68, each of which is formed of a light emitting diode, are disposed on the front surface of the cover 66 in such a manner that they correspond to the respective hold grooves 60 of the subordinate tool magazine 58. For example, each of the display lamps 68 may be turned on in blue when a new tool is stored in the corresponding hold groove 60, may be turned on in red when an old tool after use 25 is stored in the hold groove 60, and may be turned on in yellow when the hold groove 60 is vacant.

Next, description will be given below of the various operations of the above structured tool change device with reference to FIGS. 1, 12 to 14.

Now, in the working machine incorporating the present tool replacement device, the tool loader L supporting the hook member 56 is moved linearly from the tool delivery position P1 to the two positions respectively corresponding to the main tool magazine 29 and tool change position P3 by the moving body 47.

Figure 12:
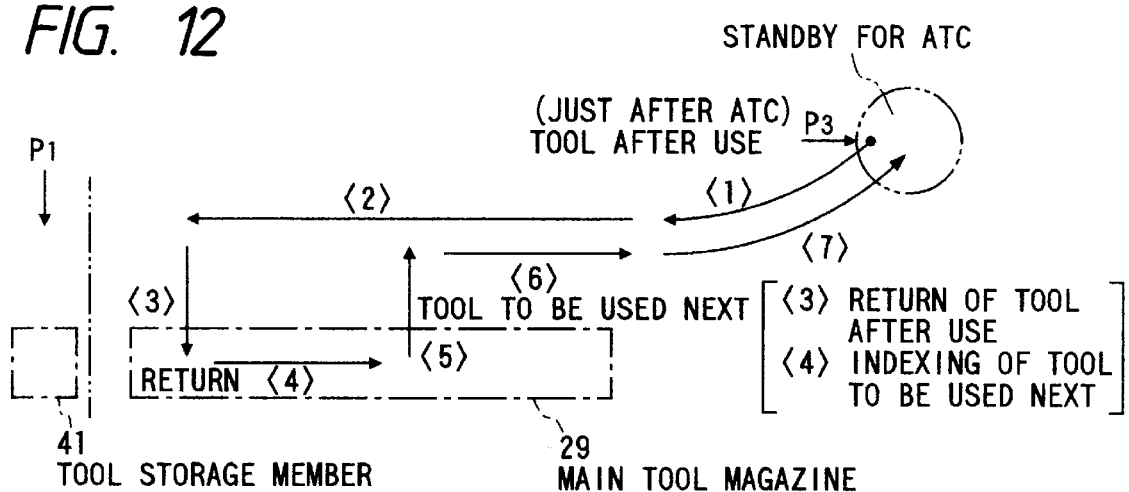
FIG. 12 is an explanatory view of an-automatic tool change operation to be executed in the first embodiment.

(1) Normal ATC (Automatic Tool Change) Operation —FIG. 12

In FIG. 12, by means of the ATC operation by the tool change arm 27, tools are changed between the tool pot 31 gripped by the tool loader L waiting at the tool change position P3 and the main spindle 24. When the tool loader L has received a tool after use 25, together with the linear movement of the moving body 47, the rotary body 50 of the tool loader L turns around from the tool change position P3 toward the main tool magazine 29 and is further moved linearly up to a position opposed to the vacant hold groove 30 of the main tool magazine 29. (<1>, <2>)

At this position, the tool loader L, in particular, the hook member 56 of the tool loader L is expanded to thereby store the tool pot 31 into the hold groove 30. (<3>) From this state, as the moving member 47 is moved, the hook member 56 slips through the pin 35 of the tool pot 31 held in the hold groove 30, so that the tool loader L is positioned at the position of the hold groove 30 that corresponds to the tool 25 to be used next. (<4>) And, at this position, the hook member 56 is contracted and the tool loader L takes out the tool pot 31 from the hold groove 30 while gripping the pin 35 of the tool pot 31. (<5>) After then, by means of the linear movement of the moving body 47, the tool loader L is moved again to the tool change position P3, where the tool loader L stands by while holding the tool 25 to be used next until the next ATC operation to the performed by the tool change arm 27. (<6 >, <7>)

Figure 13A:
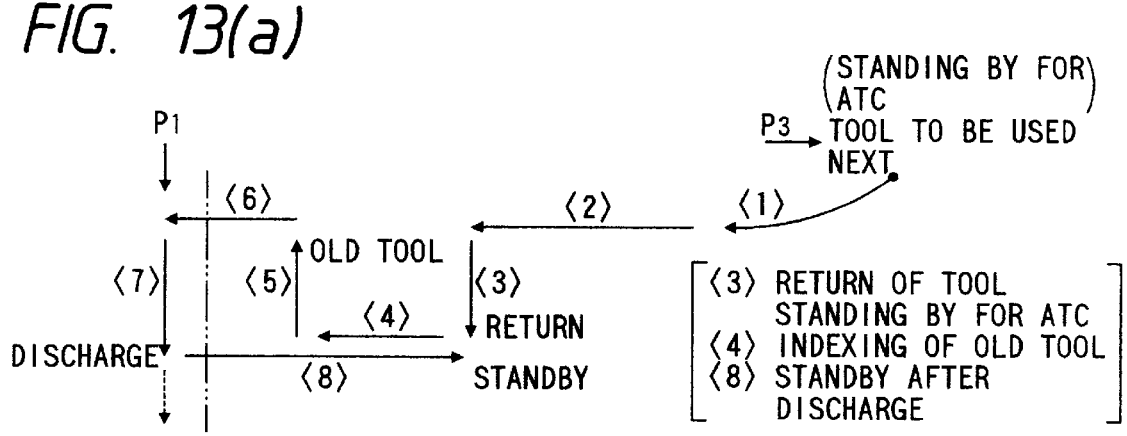
FIGS. 13(a)–(b) are explanatory views of a tool change operation in accordance with a manual instruction to be executed in the first embodiment.

(2) Tool replacing operation (Manual instruction)—FIGS. 13(a) and (b)

During the operation of the working machine, when any damaged one of the tools 25 stored in the main tool magazine 29 is detected, or when any one of the tools 25 exceeds a predetermined number of times of use or a predetermined time and thus it must be replaced with a new tool, there is issued a previous change notice or a change warning and, in accordance with such change notice or warning, for example, if a replacing instruction is given by an operator, then a tool replacing operation can be inserted.

In FIG. 13(a), the tool loader L, which holds the tool to be used next 25 and stands by at the tool change position P3, is called for the purpose of tool replacement. That is, at first, the tool loader L is moved back to the main tool magazine 29 and returns the tool pot 31 to the vacant hold groove 30. (<1>, <2>, <3>) From this position, the tool loader L is moved to the hold groove 30 corresponding to the old tool 25 to be replaced, takes out the tool pot 31 from the hold groove 30 in which it is held, and is moved to the tool delivery position P1. (<4>, <5>, <6>)

And, the tool loader L delivers the tool pot 31 to the vacant storage portion 46 of the tool storage member 41 which stands by at this position. (<7>) After then, along with the linear movement of the moving member 47, the tool loader L is moved to the hold groove 30 of the main tool magazine 29, where the engagement of the tool loader L with the pin 35 of the tool pot 31 held within the storage portion 46 is removed. And, the tool loader L stands by at this position. (<8>)

Figure 13B:
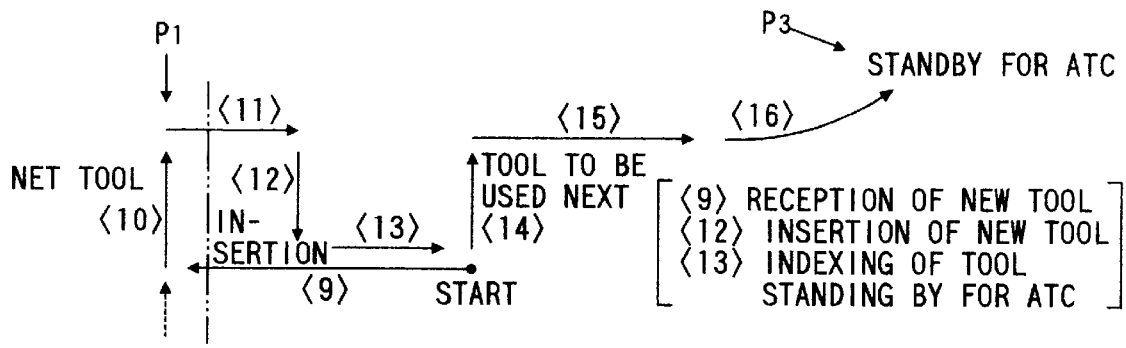

After then, the tool storage member 41, together with the lift body 36, is moved down to a position corresponding to the vacant hold groove 60 of the subordinate tool magazine 58 and, from this position, as shown in FIGS. 8 and 9, the tool pot 31 is moved from the storage portion 46 of the tool storage member 41 to the hold groove 60 of the subordinate tool magazine 58. Next, the tool storage member 41, together with the lift body 36, is moved to the corresponding hold groove 60 of the subordinate tool magazine 58 in which a new tool 25 is stored and, at this position, the new tool 25 together with the tool pot 31 is stored again into the storage portion 46 of the tool storage member 41. After then, the tool storage member 41 is moved upward together with the lift body 36 and is returned to the tool delivery position P1. In FIG. 13(b), if it is detected that the tool storage member 41 storing therein the new tool 25 is positioned at the tool delivery position P1, then, in order to receive the tool pot 31 of the tool storage member 41, the tool loader L is moved linearly again and is engaged with the pin 35 of the tool pot 31 of the tool storage member 41. (<9>)

And, by means of the contracting operation of the hook member 56, the tool loader L takes out the tool pot 31 from the tool storage member 41, is moved to a position corresponding to the vacant hold groove 30 of the main tool magazine 29 from which the old tool 25 has been taken out, and stores the tool pot 31 holding the new tool 25 into the hold storage 30 from this position. (<10>, <11>, <12>)

This completes the new and old tools 25 replacing operation. After then, the tool loader L is moved to the position of the tool to be used next 25 that has been once returned to the main tool magazine 29 by the above-mentioned call for the tool replacement, takes out the tool pot 31 holding the tool to be used next 25, is moved again to the tool change position P3, and waits there for the ATC operation. (<13>, <14>, <15>, <16>)

Figure 14A:
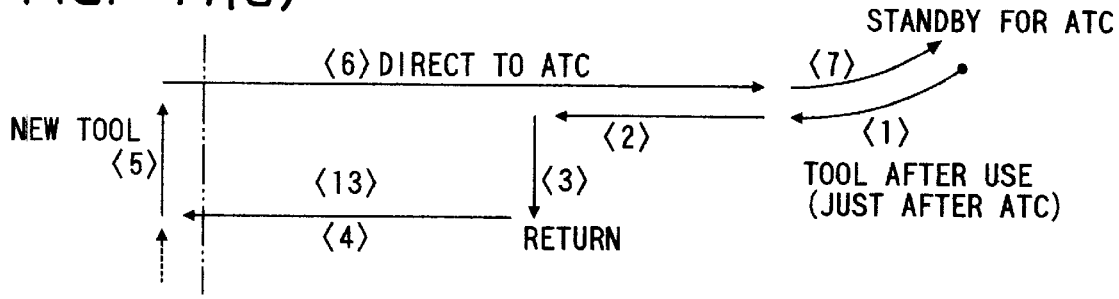
FIGS. 14(a)–(b) are explanatory views of an insertion priority tool change operation to be executed in the first embodiment.
Figure 14B:
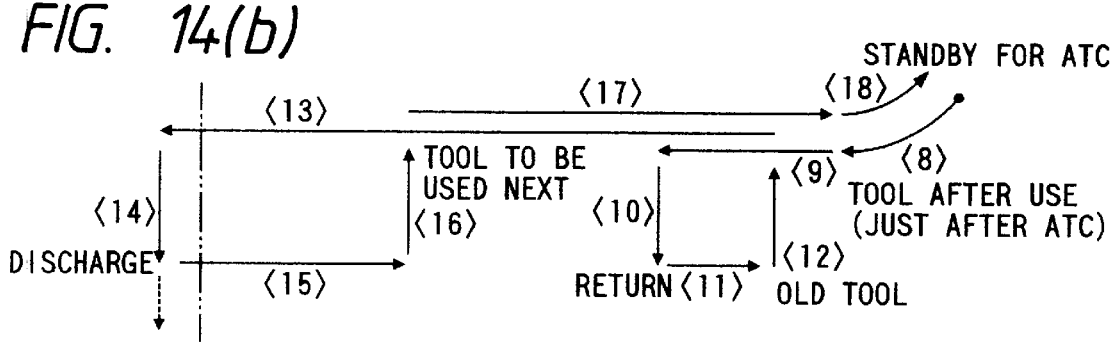

(3) Tool replacement operation (Automatic) I—FIGS. 14(a) and (b)

When it is detected by the sensor 61 that the tool to be used next 25, which is mounted in the main spindle 24 in the next ATC and is used to execute a working operation, is damaged within the main tool magazine 29, or when there is issued such a change notice to the effect that it exceeds a predetermined number of times of use or a predetermined time and thus must be replaced with a new tool, then a first change instruction is given so that such a new tool insertion priority change operation as shown in FIGS. 14(a) and (b) is executed automatically.

In accordance with a next tool call signal based on the ATC instruction, the tool storage member 41 is moved to the hold groove 60 of the subordinate tool magazine 58 in which a given new tool 25 to be substituted is stored, and receives the present new tool 25 there. After then, the tool storage member 41 is moved upward, is moved to the position that corresponds to the tool delivery position P1, and stands by at this position.

On the other hand, in FIG. 14(a), just after the ATC, the tool loader L, which has received the tool after use 25, is moved from the tool change position P3 back to the main tool magazine 29 and returns the tool pot 31 to the vacant hold groove 30. (<1>, <2>, <3>)

If it is detected that the tool storage member 41 waits at the tool delivery position P1 while holding the new tool 25, then the tool loader L is moved linearly from the above position to the tool delivery position P1 by the moving body 47 and is engaged with the pin 35 of the tool pot 31 held in the tool storage member 41 standing by at the tool delivery position P1. (<4>)

And, at the tool delivery position P1, due to the contracting operation of the hook member 56, the tool loader L takes out the tool pot 31 from the tool storage member 41. (<5>) Just after then, due to the linear movement of the moving body 47, the tool loader L delivers the tool pot 31 directly into the tool change position P3. (<6>, <7>) And, if an ATC operation is carried out at the tool change position P3 by the tool change arm 27, then, in FIG. 14(b), the tool loader L, which has received the tool after use 25, is moved back to the main tool magazine 29 and returns the tool pot 31 to the vacant hold groove 30. (<8>, <9>, <10>) Then, the tool loader L is moved from this position to the hold groove 30 in which the old tool 25 corresponding to the above new tool 25 is stored, takes out the old tool 25, and is moved to the tool delivery position P1. (<11>, <12>, <13>) Then, the tool loader L discharges the tool pot 31 to the vacant tool storage member 41 waiting at this position. (<14>)

After then, due to the linear movement of the moving body 47, the tool loader L is moved to the hold groove 30 of the main tool magazine 29 that stores therein the tool to be used next 25. (<15>) At this position, the tool loader L takes out the tool pot 31 holding the tool to be used next 25, is moved to the tool change position P3 and stands by there until the next ATC operation. (<16>, <17>, <18>)

On the other hand, the tool storage member 41 having received the old tool 25 is moved to the subordinate tool magazine 58, and returns the old tool 25 to the vacant hold groove 60 that corresponds to the old tool 25. At the then time, the corresponding display lamp 68 turn on in red, which indicates the old tool 25. An operator may take out the old tool 25 and repair it or replace it with a new tool 25 properly.

Here, when the tool 25 being currently used must be replaced with a new tool 25 from the subordinate tool magazine 58 because the currently used tool 25 is broken or the like, the new tool 25 can be delivered immediately from the tool storage member 41 at the tool delivery position P1 to the tool change position P3 by the operation of the tool loader similar to that shown in FIG. 14(a), so that the tool change can be achieved in a short time.

Figure 15A:
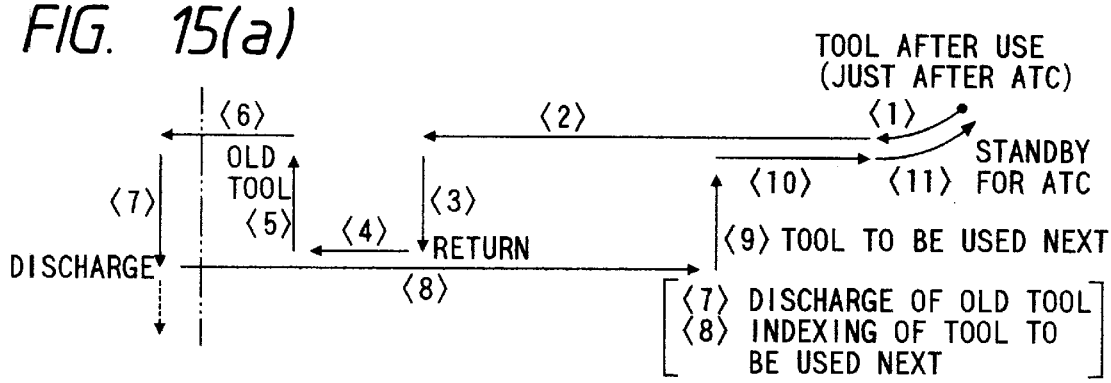
FIGS. 15(a)–(b) are explanatory views of a discharge priority tool change operation to be executed in the first embodiment.

(4) Tool replacing operation (Automatic) II—FIGS. 15(a) and (b)

When a tool abnormal condition signal is generated by the sensor 61 which is provided in the main tool magazine 29, or when a tool 25 exceeds a predetermined number of times of use or a predetermined time and thus there is issued a change notice that the old tool must be replaced with a new tool, and, in addition to this, when an operation to be executed by the tool 25 is not yet used in the next operation, a second change instruction is issued, so that a discharge priority change operation shown in FIGS. 15(a) and (b) is carried out.

In FIG. 15(a), just after the ATC, the tool loader L having received the tool after use 25 is moved back from the tool change position P3 to the main tool magazine 29, where the tool loader L returns the tool pot 31 to the vacant hold groove 30. (<1>, <2>, <3>) The tool loader L, along with the linear movement of the moving body 47, is moved from this position to the tool pot 31 storing therein the old tool 25 to be replaced, and is then engaged with the pin 35 of the present tool pot 31. (<4>)

And, due to the contracting operation of the hook member 56, the tool loader L takes out the old tool 25 from the hold groove 30 of the main tool magazine 29 and, due to the linear movement of the moving body 47, the tool loader L is then moved to the tool delivery position P1. (<5>, <6>) At this position, the tool loader L discharges the old tool 25 together with the tool pot 31 to the vacant tool storage member 41. (<7>) After then, the tool loader L is moved to the hold groove 30 that holds therein the tool to be used next 25 of the main tool magazine 29, takes out the tool pot 31 for the tool to be used next 25, and is then moved to the tool change position P3, where the tool loader L stands by until the next ATC operation. (<8>, <9>, <10>, <11>)

On receiving the old tool 25 from the tool loader L, the tool storage member 41 is moved by the lift body 36 to a position which corresponds to the vacant hold groove 60 of the subordinate tool magazine 58 and returns the old tool 25 to the vacant hold groove 60. In this operation, the corresponding display lamp 68 turns on in red, which indicates the old tool 25.

After then, the tool storage member 41 is moved to the hold groove 60 that holds therein a new tool 25 corresponding to the old tool 25 to be replaced, takes out the new tool 25 together with the tool pot 31 from the present hold groove 60, is moved back to the tool delivery position P1, and stands by at this position. After this, a normal ATC operation is carried out.

Figure 15B:
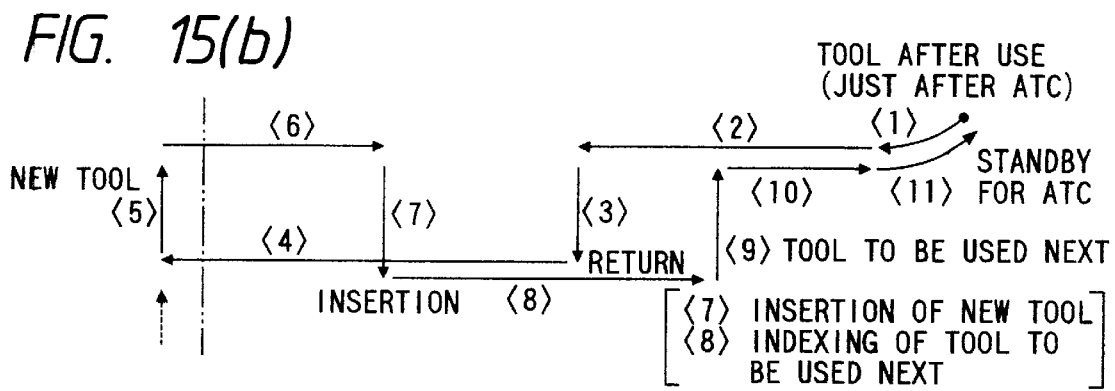

Next, in FIG. 15(b), if the next ATC operation is completed at the tool change position P3, then the tool loader L having received the tool after use 25 is moved from the tool change position P3 back to the main tool magazine 29 and returns the tool pot 31 to the vacant hold groove 30. (<1>, <2>, <3>) Here, if it is detected that the tool storage member 41 stands by at the tool delivery position P1 while it is holding the new tool 25, then the tool loader L is moved linearly by the moving body 47 to the tool delivery position P1 and is then engaged with the pin 35 of the tool pot 31 held in the tool storage member 41 standing by at the tool delivery position Pl. (<4>)

After then, by means of the contracting operation of the hook member 56, the tool loader L takes out the tool pot 31 from the tool storage member 41. (<5>)

Next, the tool loader L is moved to a position corresponding to the hold groove 30 that has been become vacant since the old tool 25 of the main tool magazine 29 was taken out therefrom and, at this position, stores the tool pot 31 for the new tool 25 into the vacant hold groove 30, thereby completing the operation to take in or insert the new tool 25. (<6>, <7>)

After then, the tool loader L is moved to the hold groove 30 that stores therein the tool to be used next 25, takes out the tool pot 31 for the tool to be used next 25, is moved to the tool change position P3, and stands by there until the next ATC operation. (<8>, <9>, <10>, <11>)

The above-mentioned operations are carried out repeatedly by the second change instruction based on the detect signal for the tool replacement, whereby the tool 25 within the main tool magazine 29 is always replaced automatically with a usable tool 25.

Now, description will be given below of the effects that can be expected when the above-mentioned first embodiment is enforced.

(a) In the tool change device according to the present embodiment, the tool loader L can be directly moved between the tool change position P3 and the tool storage member 41 not through the main tool magazine 29. Therefore, when a new tool is requested immediately in a working process, unlike the conventional tool change device, with no intervention of the indexing operation of the tool magazine, the new tool 25 can be delivered at once from the tool storage member 41 to the tool change position P3 and also the substitution of the new tool 25 for the old tool 25 can be executed in a short time, which makes it possible to improve the working efficiency of the machine to a great extent.

(b) Due to use of the linear main tool magazine 29, a mechanism for indexing the tool magazine can be omitted and the whole tool change device can be thereby made compact. That is, the present tool change device can be mounted easily into the small vacant space of the working machine M.

(c) Delivery of the tool 25 between the tool change arm 27, main tool magazine 29 and tool storage member 41 can be made by a single tool loader L. Due to this, the delivery structure for the tool 25 can be simplified and thus the manufacturing cost of the present tool change device can be reduced accordingly.

(d) If the hold grooves 30 of the main tool magazine 29 are arranged at an equal pitch, the structure of the tool magazine and the feed control of the tool loader L can be simplified. Also, if the hold grooves 30 are arranged at different pitches and thus the hold grooves 30 are formed at such intervals that are matched to the sizes of the tools 25, when holding a large-size tool 25, there is eliminated the inconvenience that the two adjoining hold grooves 30 respectively on the two sides of the large-size tool hold groove 30 cannot be used, so that the intervals between the tools 25 to be held can be reduced to a minimum. Due to this, the storage efficiency of the tools 25 is improved and thus a large number of tools 25 can be stored. Also, the moving stroke of the tool loader L for tool selection can be decreased, which in turn can further shorten the time necessary for the tool change.

(e) Since the tool storage member 41 is disposed on the opposite side to the tool change arm 27 through the main tool magazine 29, the tool change arm 27, main tool magazine 29 and tool storage member 41 are arranged substantially on a straight line in the back-and-forth direction of the tool change device. That is, these mechanisms can be arranged in order, so that the whole of the working machine M can be prevented from increasing in size. Also, due to the fact that a position where an operator replaces an old tool with a new tool is set in the rear portion of the device that is spaced apart from the working portion of the working machine M, the operator can execute the operation easily in such a manner that the operator is free from contamination by a coolant and the like.

(f) The tool 25 is removed and mounted by a single tool loader L between the tool change arm 27, main tool magazine 29 and tool storage member 41. Due to this, the delivery structure of the tool 25 is simplified and thus the manufacturing cost thereof can be reduced.

(g) The subordinate tool magazine 58 is disposed in such a manner that it corresponds to the tool storage member 41, and a plurality of hold grooves 60 are formed in the side edge of the subordinate tool magazine 58. Thanks to this structure, by previously holding new tools 25 in the respective hold grooves 60 of the subordinate tool magazine 58, when any one of the tools 25 being currently used cannot be used due to wear or the like, the unusable tool 25 can be replaced with one of the new tools 25 held on the subordinate tool magazine 58 easily and automatically. This eliminates the need for an operator to remove the old tool 25 and mount the new tool 25 each time the tool replacement is required, which results in the improved operation efficiency.

(h) A plurality of sensors 61 are disposed in such a manner that they respectively correspond to the hold grooves 30 of the main tool magazine 29. Thanks to this, when any abnormal condition occurs, for example, when any one of the tools 25 held in the hold grooves 30 cannot be used due to wear or the like, or when any one of the tools 25 is not held accurately in its corresponding hold groove 30, the abnormal condition of the tool 25 can be detected easily by the corresponding sensor 61, so that the thus detected tool 25 can be replaced with a new one immediately.

(i) The mounting positions of the respective sensors 61 can be previously adjusted and set according to the lengths and thicknesses of the tools 25 respectively held in the hold grooves 30 of the main tool magazine 29. Therefore, differently from the conventional structure in which a single sensor is disposed in such a manner that it can be moved according to the predetermined indexing positions of the disk-shaped tool magazine including a plurality of hold grooves formed in the outer periphery thereof, there is eliminated the need for provision of an adjusting mechanism which is used to adjust or move the position of the sensor according to the lengths and thicknesses of the tools. Due to this, the structure of the detect mechanism can be simplified, which makes it possible to reduce the manufacturing costs of the tool change device.

(j) A plurality of display lamps 68 are disposed in such a manner that they respectively correspond to the hold grooves 60 of the subordinate tool magazine 58, while the display lamps 68 are so arranged as to indicate the conditions of the tools 25 respectively held in the hold grooves 60. This makes it possible to recognize easily whether the tools 25 held in the hold grooves 60 are new or old, or whether the hold grooves 60 are vacant or not.

(Second Embodiment)

Next, description will be given below of a second embodiment of a tool change device according to the invention with reference to FIG. 10.

Now, in the tool change device according to the present embodiment, there is omitted the subordinate tool magazine 58 that is employed in the first embodiment. Also, a tool storage member 71 is disposed in the side portion of the frame 26 in such a manner that it can be moved up and down through a guide rail 72, while the tool storage member 71 includes on the upper surface thereof two storage grooves 73 serving as the storage portions thereof. And, the tool storage member 71 is normally moved to the tool delivery position P1 shown by a solid line in FIG. 10 and is thereby positioned substantially on the same line with the main tool magazine 29; and, as the need arises, by a manual operation, the tool storage member 71 can be moved along the guide rail 72 to and positioned at a tool replacing position P2 shown by a chained line in FIG. 10.

Figure 10:
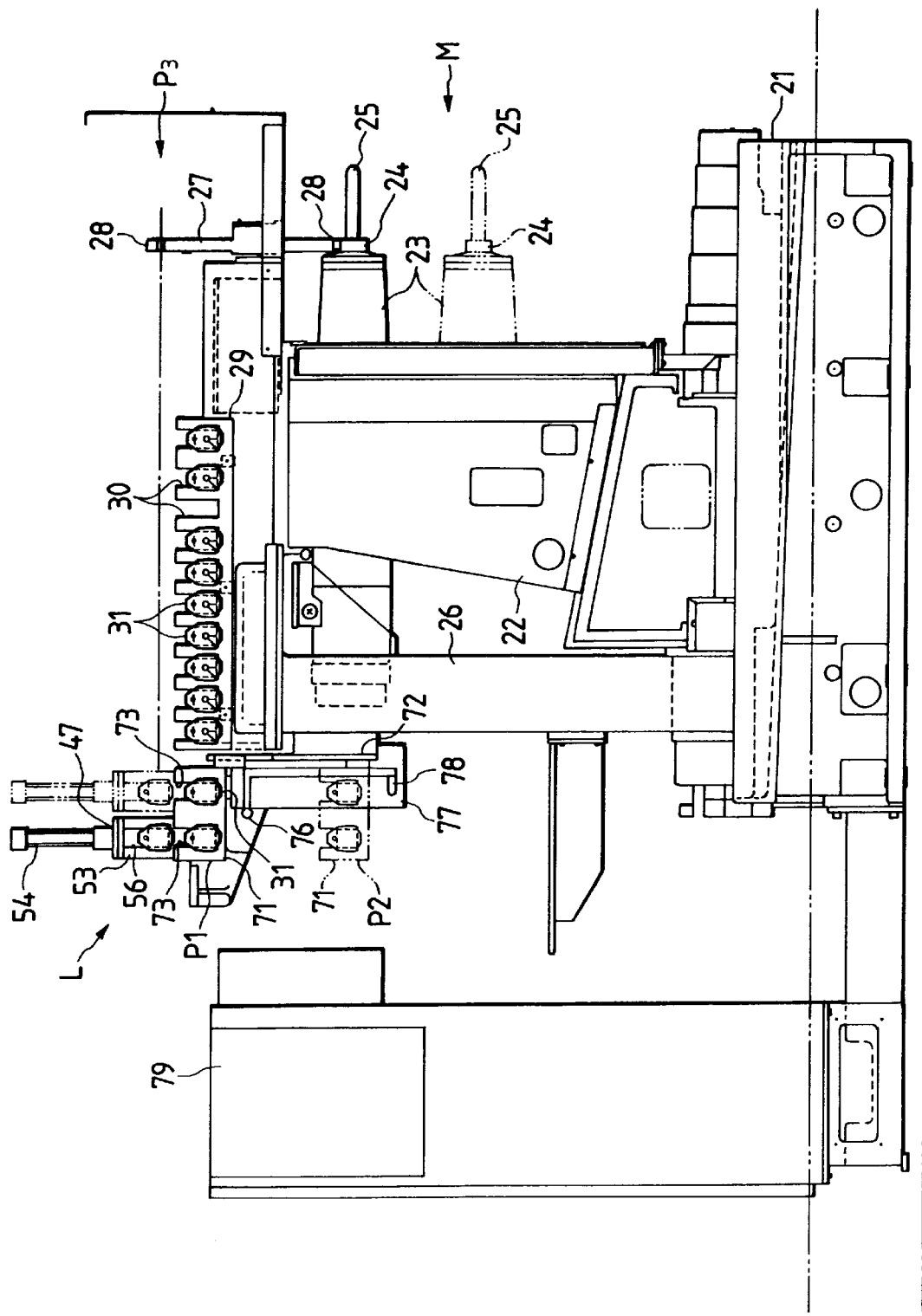
FIG. 10 is a front view of a second embodiment of a tool change device according to the invention.

That is, for example, as shown in FIG. 10, a handle 76 is mounted on the tool storage member 71 in such a manner that it can be freely oscillated in the right and left direction, while the handle 76 is operated when the tool storage member 26 is moved up and down as well as is locked in position. The intermediate portion of the handle 76 is engaged with a U-shaped cam groove 78 formed in a positioning cam plate 77 fixed to the vertically extending guide rail 72 which is fixed to the frame 26. And, when the handle 76 is fallen down and engaged with the two horizontally extending upper and lower groove portions of the cam groove 78, the tool storage member 71 can be position locked at the upper tool delivery position P1 and at the lower tool replacing position P2 respectively. By the way, although not shown, a wire wound around a pulley journaled by the frame 26 is connected to the tool storage member 71 and the weight of the tool storage member 26 including the tool 25 is canceled by a weight which is suspended from the leading end of the wire, so that the tool storage member 26 can be manually moved up and down with ease. And, the tool loader L, similarly to the previously described first embodiment, can be moved or reciprocated linearly between a position (here, two positions) corresponding to the storage groove 73 of the tool storage member 71 situated at the tool delivery position P1, a position corresponding to a plurality of hold grooves 30 of the main tool magazine 29, and the tool change position P3 corresponding to the tool change arm 27.

Next, description will be given below of the operation of the second embodiment. In the tool change device according to the second embodiment, the operator can move the tool storage member 71 from the upwardly situated tool delivery position P1 to the downwardly situated tool replacing position P2 and, in accordance with a previous change notice, can previously substitute two new tools 25 corresponding to the two tools 25 to be replaced into the storage grooves 73 of the tool storage member 71 at the same time. Thanks to this, even when the main tool magazine 29 is mounted at a high position in the upper portion of the working machine M and thus the tool delivery position P1 is set a high position, the tool replacing position P2 can be set at a low position which facilitates the replacing operation, so that the tools 25 can be replaced easily with respect to the storage grooves 73 of the tool storage member 71.

The operation of the tool loader L in the normal ATC operation and the tool replacing operation based on the manual instruction is similar to the description of the previously described first embodiment with reference to FIGS. 12, 13(a) and 13(b), and thus the description thereof is omitted here. However, in the movements <6> and <9> in FIGS. 13(a) and (b) of the tool loader L, the tool loader L is moved to one of the two storage grooves 73 of the tool storage member 26 that is vacant in the case of the <6> movement, whereas the tool loader L is moved to the storage groove 73 that stores therein the required new tools 25 in the case of the <9> movement.

On the other hand, when it is detected that the tool 25 stored in the main tool magazine 29 is broken or reaches a predetermined number of times of use or a predetermined time and thus the tool 25 must be replaced with the new tool 25, in accordance with the detect signal, a display device 79 issues the operator with a change notice including the change time of the new and old tools 25 and the like.

Figure 16A:
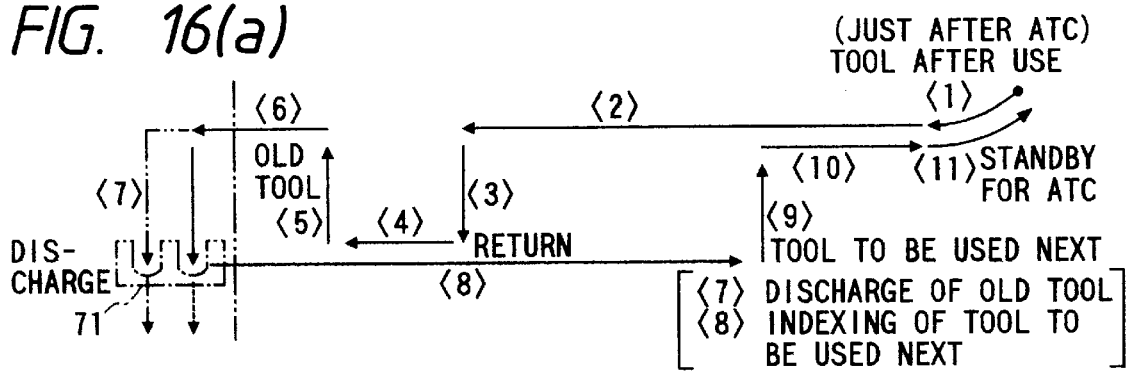
FIGS. 16(a)–(d) are explanatory views of a tool change operation to be executed in the second embodiment.

In response to this, there is executed a replacing operation for the tools 25 that have been noticed for change. In FIG. 16(a), just after the ATC, the tool loader L having received the tool after use 25 is moved from the tool change position P3 back to the main tool magazine 29, and returns the tool pot 31 to the vacant hold groove 30. (<1>, <2>, <3>) And, by means of the linear movement of the moving body 47, the tool loader L is moved from this position to the position of the tool pot 31 that stores therein the old tool 25 to be replaced, and is then engaged with the pin 35 of the tool pot 31. (<4>)

Then, due to the contracting operation of the hook member 56, the tool loader L takes out the old tool 25 from the hold groove 30 of the main tool magazine 29 and is then moved to the tool delivery position P1 along with the linear movement of the moving body 47. (<5>, <6>) The tool loader L discharges the old tool 25 together with the tool pot 31 to the vacant storage groove of the tool storage member 41 standing by at the tool delivery position P1. (<7>)

After then, the tool loader L is moved to the hold groove 30 holding therein the tool to be used next 25 of the main tool magazine 29, takes out the tool pot 31 therefrom, is then moved to the tool change position P3, and stands by there until the next ATC operation. (<8>, <9>, <10>, <11>)

During this operation, if the operator confirms that the old tool 25 is discharged to the tool storage member 41, then the operator, by operating the handle 76, moves the tool storage member 72 downwardly and positions it at the tool replacing position P2. At this position, the operator takes out the old tool 25 and inserts the new tool 25 corresponding to the old tool 25 and, by operating the handle 76 again, the operator moves the tool storage member 72 upwardly and makes it stand by at the tool delivery position P1. After this, the normal ATC operation is executed.

Figure 16B:
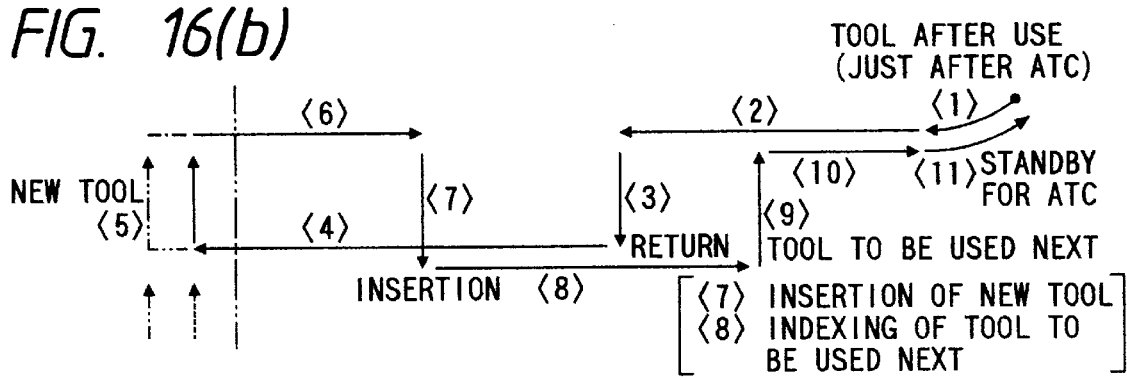

Next, when the new tool 25 is not yet used for the next working operation immediately, the new tool 25 is taken in or inserted by means of an operation shown in FIG. 16(b). In FIG. 16(b), if the next ATC operation is completed at the tool change position P3, then the tool loader L having received the tool after use 25 is moved from the tool change position P3 back to the main tool magazine 29, and returns the tool pot 31 to the vacant hold groove 30. (<1>, <2>, <3>) Here, if it is detected that one of the storage grooves 73 of the tool storage member 41 stands by at the tool delivery position P1 while storing the new tool 25 therein, then the tool loader L is moved linearly from the above position to the tool delivery position P1 by the moving body 47 and is engaged with the pin 35 of the tool pot 31 holding the new tool 25 that is stored in the detected storage groove 73 at the tool delivery position P1. (<4>)

Then, due to the contracting operation of the hook member 56, the tool loader L takes out the tool pot 31 from the tool storage member 41. (<5>)

Next, the tool loader L is moved to a position corresponding to the hold groove 30 of the main tool magazine 29 that has been vacant since the old tool 25 was taken out in the above-mentioned operation, and, at this position, the tool loader L allows the vacant hold groove 30 to store thereinto the tool pot 31 that corresponds to the new tool 25, thereby completing the new tool 25 taking-in or insertion operation. (<6>, <7>)

Figure 16C:
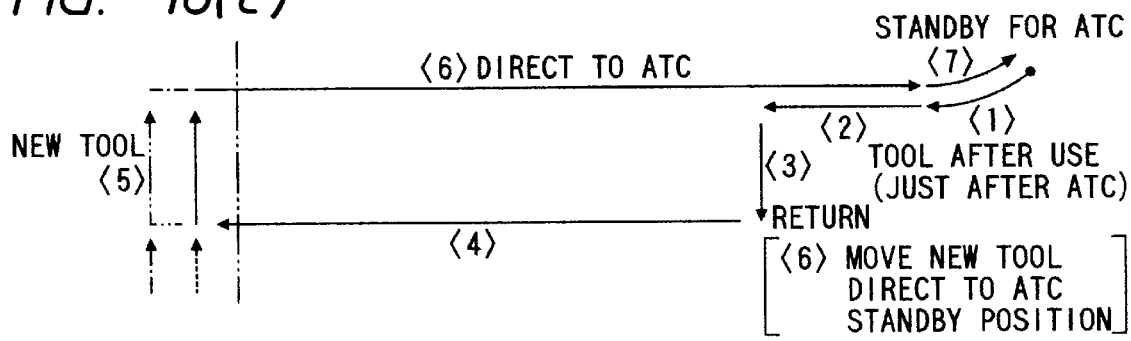

On the other hand, after the discharge of the old tool 25 described in connection with FIG. 16(a), when the new tool 25 substituted is used immediately, as shown in FIG. 16(c), just after the ATC, similarly to the movements <1>, <2>, <3>, <4>, <5> in FIG. 16(b), after the tool loader L returns the tool after use 25 to the main tool magazine 29, the tool loader L takes out the new tool 25 from the tool storage member 56. <1>, <2>, <3>, <4>, <5> However, just after then, the tool loader L delivers the new tool 25 directly to the tool change position P3 due to the linear movement thereof by the moving body 47. (<6>, <7>)

In response to this, by means of the next ATC operation, the new tool 25 is mounted onto the main spindle 24 so that a working operation by the new tool 25 can be carried out.

Figure 16D:
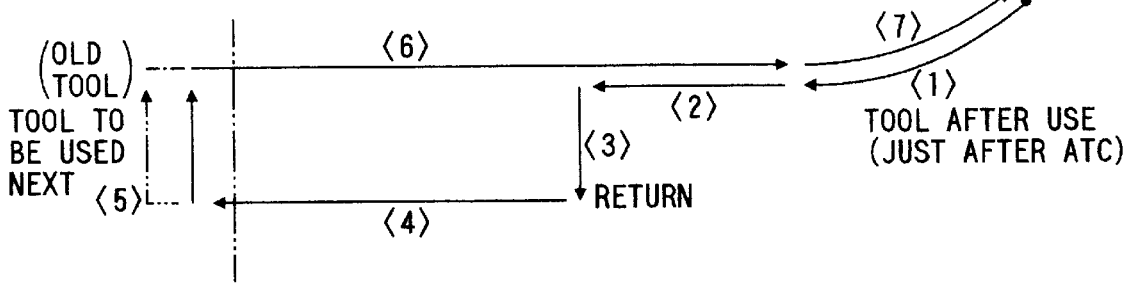

Also, in the tool change device according to the second embodiment, after completion of the operation of FIG. 16 (a), when, although, with the operator not present at the tool replacing position P2, the discharged old tool 25 has not been taken out from the tool storage member 56 but is still left at the tool delivery position P1, the next ATC operation is executed and the next working process using the new tool 25 corresponding to the discharged old tool 25 stands by, if the tool change device detects that the substitution of the new tool 25 is not executed yet, then the tool change device is automatically switched over to an operation shown in FIG. 16(d).

In particular, the old tool 25 discharged to the tool storage member 71 is taken out again therefrom and is delivered to the tool change position P3. That is, without stopping the working operation, the next working operation can be executed using the present old tool 25 as a makeshift for the time being.

In FIG. 16(d), just after the ATC, as soon as the tool loader L returns the tool after use 25 to the vacant hold groove 30 of the main tool magazine 29, the tool loader L is moved to the tool storage member 41 and takes out the old tool 25 that is left stored in the tool storage member 41 (<5>) and, after then, the tool loader L delivers the old tool 25 directly to the tool change position P3. (<6>, <7>)

As described above, even when the replacing operation of the new and old tools 25 by the operator is left unexecuted with respect to the tool storage member 71, so long as the use of the old tool 25 is permitted, the discharged old tool 25 can be returned to the working machine and can be used again. Therefore, the working operation of the working machine can be carried out continuously.

That is, the discharge priority tool replacing operation is executed in this manner, and the operator, after confirmation of the discharged old tool 25, replaces the old tool 25 with the new tool 25. This prevents the replacement of wrong tools 25.

And, in the present embodiment as well, the tool 25 stored in the tool storage member 71 can be delivered directly to the tool change position P3 not through the main tool magazine 29 and, therefore, when a new tool 25 is just necessary for working, the tool replacement can be carried out in a short time.

Also, in the tool change device according to the present embodiment, due to provision of the two storage grooves 73 in the tool storage member 71, a new tool 25 corresponding to the old tool 25 that has been noticed for replacement can be stored at the same time, which permits the operator to leave that position for a time corresponding to this, thereby improving the operation efficiency. By the way, the number of the storage grooves 73 may be one, or three or more.

When there are provided two or more storage grooves 73, not only, as in the above-mentioned embodiment, all the storage grooves 73 can be structured such that they can be used for replacement of the old and new tools 25, but also one storage groove 73 can be set exclusively for discharge of the old tool 25 while the other can be set exclusively for insertion of the new tool 25. In this case, the movement of the tool loader L can be controlled simply because the stopping positions of the tool loader L can be decided in correspondence to the discharge and insertion of the tools 25. At the same time, there is eliminated the possibility that the operator can forget the removal of the old tool 25 or insertion of the new tool 25. That is, the tool change operation can be executed with accuracy.

Further, there is also available a method in which the hold groove 30 that is formed in the end portion of the main tool magazine 29 and is nearest to the tool storage member 71 is set as a provisional hold groove 30A for holding a tool 25 provisionally.

For example, when the old tool 25 must be replaced with the new tool 25 within the main tool magazine 29 during the time that the tool loader L is standing by at the tool change position P3 while holding the next tool 25 for the next ATC operation, if the operator allows the tool storage member 71 to store therein the new tool 25 to be substituted, then the replacement of the old tool 25 with the new tool 25 within the main tool magazine 29 can be automatically carried out with high efficiency. The operation to be executed in this case will be described below with reference to FIG. 17(a).

Figure 17A:
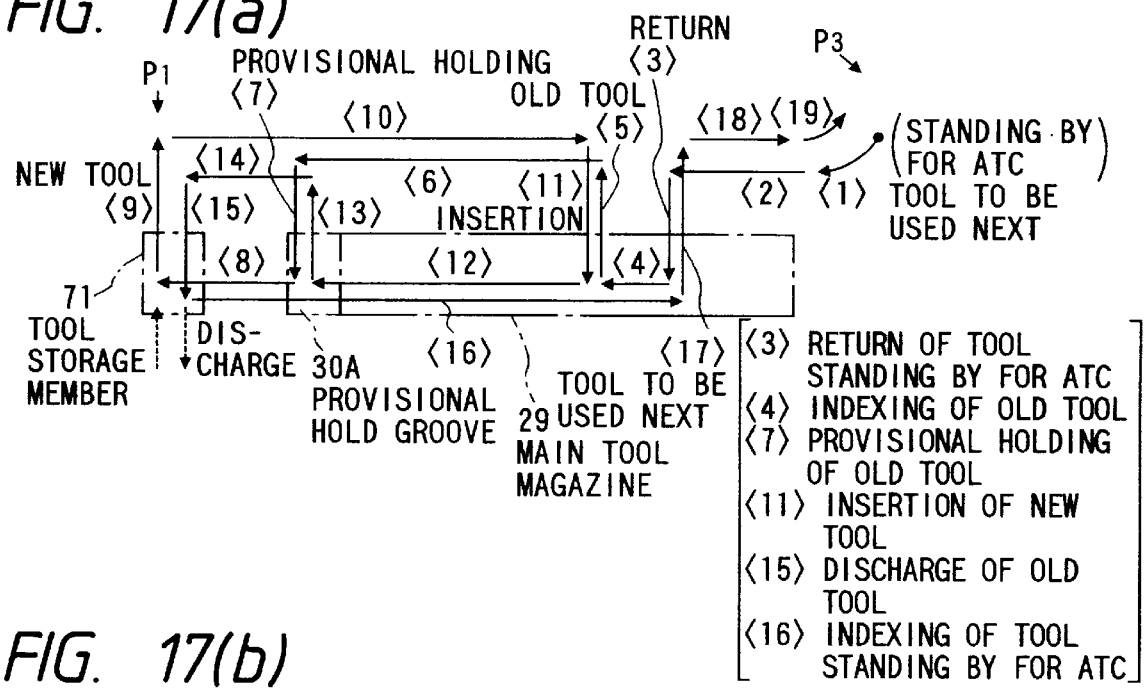
FIGS. 17(a)–(c) are explanatory views of another tool change operation to be executed in the second embodiment.

That is, in FIG. 17(a), the tool loader L standing by at the tool change position P3 while holding the tool to be used next 25 is called out for the tool replacement. In particular, at first, the tool loader L is moved back to the main tool magazine 29 and returns the tool pot 31 to the vacant hold groove 30. (<1>, <2>, <3>) Then, the tool loader L is moved from this position to the hold groove 30 corresponding to the old tool 25 to be replaced, takes out the tool pot 31 from the present hold groove 30, and is then moved to a position which is opposed to the provisional hold groove 30A. (<4>, <5>, <6>) And, at this position, the tool loader L puts the tool pot 31 into the provisional hold groove 30A provisionally. (<7>) After then, by means of the linear movement of the moving body 47, the tool loader L is moved to the storage groove 73 of the tool storage member 71, is removed from the engagement with the pin 35 of the tool pot 31 held in the provisional hold groove 30A, and is then engaged with the pin 35 of the tool pot 31 held in the storage groove 73 and holding the new tool 25. (<8>) Next, the tool loader L is moved upward, takes out the tool pot 31 from the storage groove 73, is then moved to the main tool magazine 29 side, and inserts the tool pot 31 into the hold groove 30 of the main tool magazine 29 that has been vacant since the tool pot 31 was taken out therefrom. (<9>,<10>,<11>) Just after this, the tool loader L is moved to the provisional hold groove 30A, takes out the tool pot 31 holding the old tool from the provisional hold groove 30A, is then moved to the tool delivery position P1, and discharges this tool pot 31 into the storage groove 73 of the tool storage member 71. (<12>,<13>,<14>,<15>) Then, the tool loader L is moved from this position to the position of the tool to be used next 25 that is once returned to the main tool magazine 29, takes out the tool pot 31 holding the tool to be used next 25, is moved again to the tool change position P3, and stands by there for the ATC operation. (<16>,<17>,<18>,<19>) According to this operation, when compared with the operation that was described in connection with FIG. 13, the tool loader L can execute the tool change operation with high efficiency since it has no waiting time on the way.

Figure 17B:
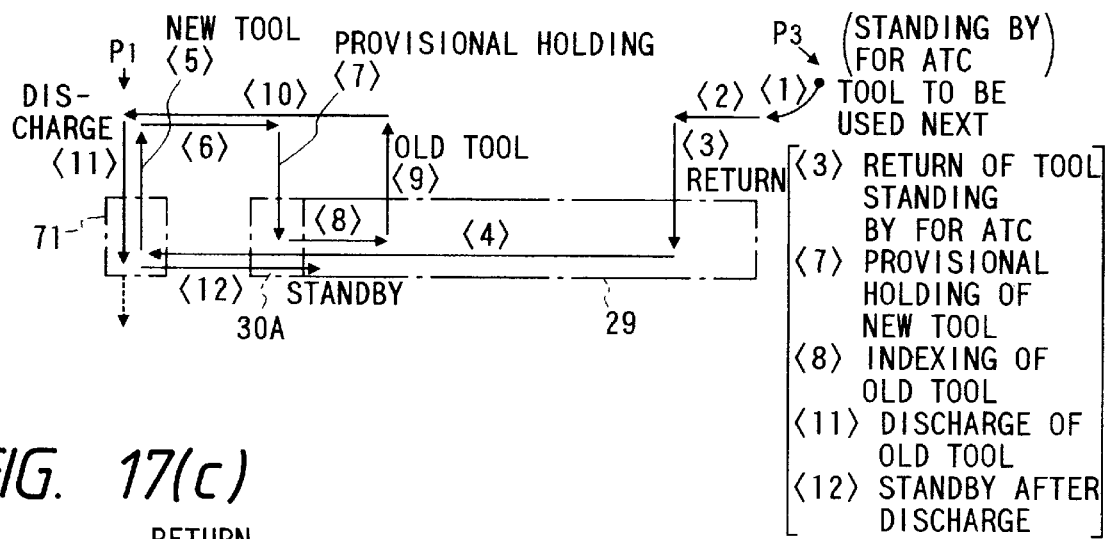

Further, an operation shown in FIGS. 17(b) and (c) is also possible. For example, when it is necessary to check or repair the tools 25 in the main tool magazine 29 during the time that the tool loader L is standing by at the tool change position P3 while holding the next tool 25 for the next ATC operation, in spite of the fact that a new tool 25 is prepared in the tool storage member 71, the tool loader L is able to automatically discharge and insert the tools 25 that are held within the main tool magazine 29.

In particular, in FIG. 17(b), the tool loader L standing by at the tool change position P3 while holding the tool to be used next 25 is called out for the tool check. At first, the tool loader L is moved back to the main tool magazine 29 and returns the tool pot 31 to the vacant hold groove 30. (<1>, <2>, <3>) Then, the tool loader L is moved from this position to the storage groove 73 of the tool storage member 71, takes out the tool pot 31 holding the new tool 25 from the storage groove 73, and puts the present tool pot 31 provisionally into the provisional hold groove 30A. (<4>, <5>, <6><7>) Next, the tool loader L is moved to the hold groove 30 corresponding to the old tool 25 to be checked, takes out the tool pot 31 from the present hold groove 30, is moved to the tool delivery position P1, and discharges the tool pot 31 to the storage groove 73 of the tool storage member 71. (<8>, <9>, <10>, <11>) After discharge, the tool loader L is moved apart from the tool pot 31 stored in the storage groove 73 and stands by within the main tool magazine 29. (<12>)

In this state, the operator checks or repairs the tools 25, for example, by moving the tool storage member 71 to the tool replacing position 22. Now, FIG. 17(c) shows an operation to be executed after the tool after check 25 is stored again into the tool storage member 71 and is then returned back to the tool delivery position P1.

Figure 17C:
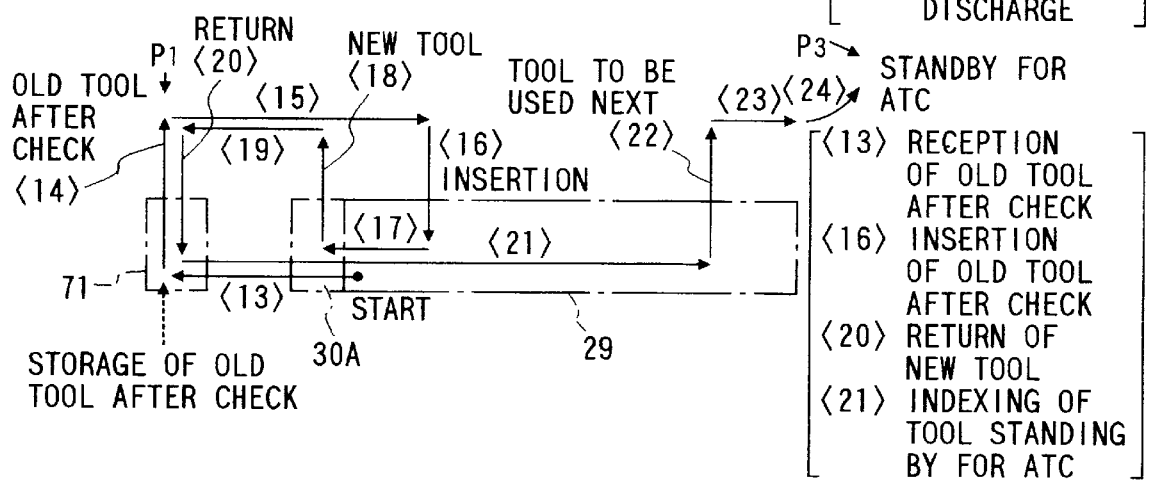

In FIG. 17(c), in accordance with a tool insertion instruction, the standing-by tool loader L is moved together with the linear movement of the moving body 47 to the storage groove 73 of the tool storage member 71, and is then engaged with the pin 35 of the tool pot 31 stored in the storage groove 73 and holding the tool after check 25. (<13>) Next, the tool loader L is moved upward, takes out the tool pot 31 from the storage groove 73, is then moved to the main tool magazine 29 side, and inserts the tool pot 31 into the hold groove 30 where the present tool pot 31 was originally held. (<14>, <15>, <16>) After then, the tool loader L is immediately moved to the provisional hold groove 30A, takes out the tool pot 31 holding the new tool 25 from the provisional hold groove 30A, and returns it to the storage groove 73 of the tool storage member 71. (<17>, <18>, <19>, <20>) The tool loader L is then moved from this position to the position of the tool to be used next 25 that is once returned to the main tool magazine 29, takes out the tool pot 31 holding the tool to be used next 25, is moved again to the tool change position P3, and stands by there for the ATC operation. (<21>, <22>, <23>, <24>)

(Third Embodiment)

Figure 11:
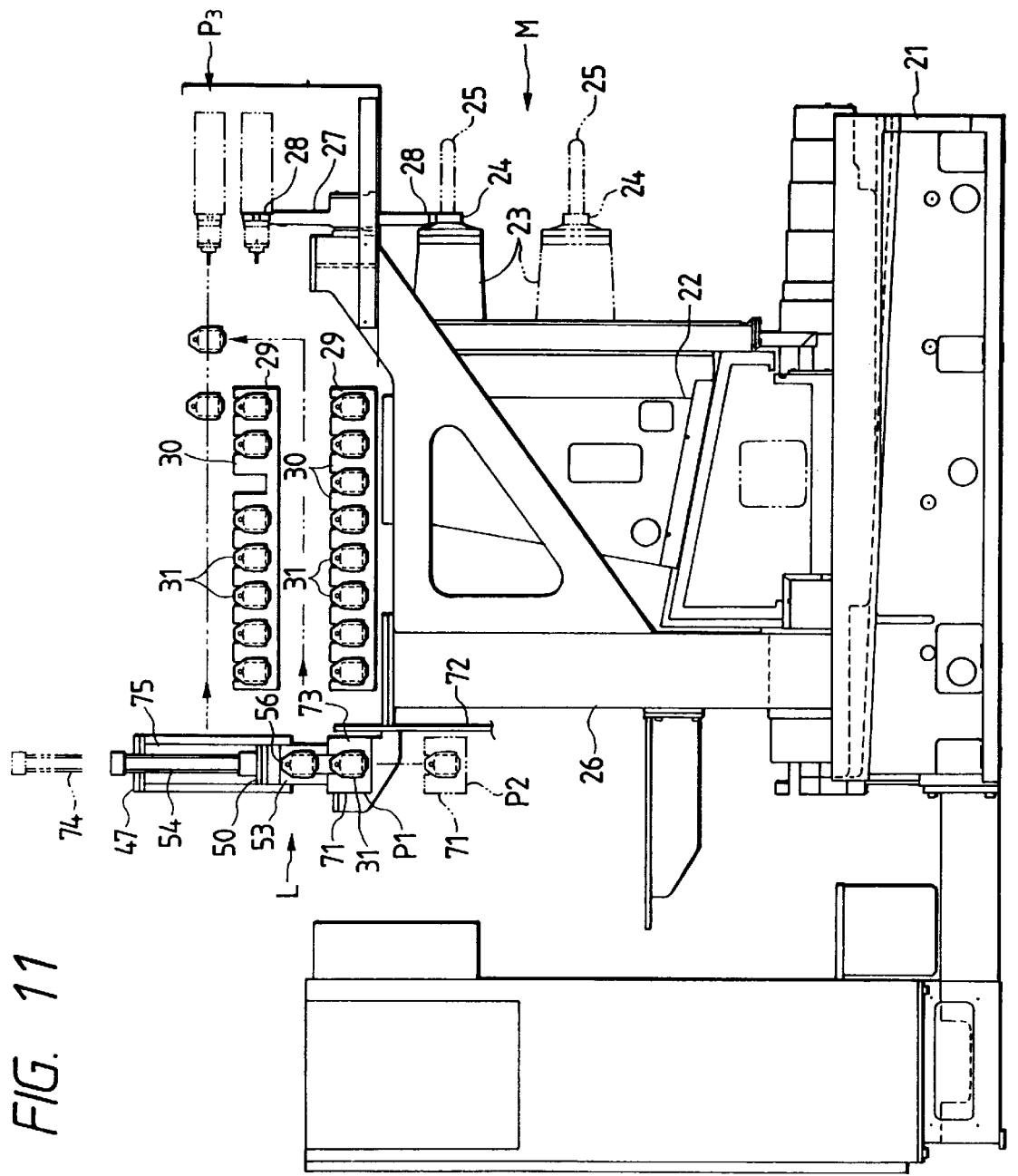
FIG. 11 is a front view of a third embodiment of a tool change device according to the invention.

Next, description will be given below of a third embodiment of a tool change device according to the invention with reference to FIG. 11.

Now, in the tool change device according to the third embodiment as well, similarly to the above-mentioned second embodiment, the subordinate tool magazine 58 is omitted. Also, there are disposed two stages of main tool magazines 29 which are spaced apart from each other in the vertical direction, while a plurality of hold grooves 30 are formed in the upper side edges of the two stages of the main tool magazines 29, for example, at a given pitch.

Further, the tool storage member 71 is supported on the side portion of the frame 26 in such a manner that it can be moved up and down through the guide rail 72, while the tool storage member 71 includes a storage groove 73 formed in the upper surface thereof. Similarly to the second embodiment, the tool storage member 71 is normally moved to the upwardly situated tool delivery position P1 and is positioned substantially on the same line with the low-stage main tool magazine 29 and, if the need arises, the tool storage member 71 can be manually moved to and positioned at the downwardly situated tool replacing position P2.

On the other hand, the moving body 47 of the tool loader L is linearly moved between the positions that respectively correspond to the tool storage member 71, main tool magazine 29 and the tool change position P3 for the tool change arm 27, while a vertical position switch cylinder 74 is provided on the moving body 47. A switch plate 75 is mounted on the piston rod of the switch cylinder 74, and a rotary body 50 is rotatably supported on the switch plate 75. And, similarly to the first embodiment, a pair of grip arms 53 and a delivery cylinder 54 are respectively disposed on the rotary body 50, while a hook member 56 is fixed to the piston rod of the delivery cylinder 54. Due to this structure, the tool loader L can be moved to the tool delivery position P1 corresponding to the tool storage member 71, positions respectively corresponding to the hold grooves 30 of the two upper and lower stages of the main tool magazines 29, and the tool change position P3, while the moving paths of the tool loader L can be selected properly according to cases.

Further, in the present embodiment, since the tool change position P3 is different in height from the grip portion 28 of the tool change arm 27, the tools are changed at a position which is displaced downwardly by a given amount from the tool change position P3.

Therefore, in the tool change device according to the present embodiment, various kinds of tools 25 can be easily held in the respective hold grooves 30 of the two upper and lower stages of main tool magazines 29 and thus, by changing these tools 25 in 64 order, various kinds of working operations can be carried out. When removing and mounting the tools 25 with respect to the hold grooves 30 of the two main tool magazines 29, in a state that the tool loader L is moved to and positioned at a height position corresponding to one of the two stages of main tool magazine 29, the tool loader L is moved linearly to a position corresponding to a specified one the hold grooves 30.

And, in this state, the hook member 56 is moved up and down by the delivery cylinder 54, so that the tools 25 can be removed and mounted with respect to the respective hold grooves 30. Due to this, even in a tool change device which is structured such that various kinds of tools 25 are to be held in the main tool magazine 29, the tools 25 can be smoothly removed and mounted between the tool change arm 27, main tool magazines 29 and tool storage member 41. Further, because the tools 25 stored in the tool storage member 41 can be delivered directly to the tool change position P3 not through the main tool magazines 29, when a working operation is executed by a new tool 25 not stored in the main tool magazines 29 or by a new tool 25 corresponding to an old tool 25 stored in the main tool magazines 29, the tools 25 can be replaced in a short time with respect to the main spindle 24.

(Fourth Embodiment)

Next, description will be given below of a fourth embodiment of a tool change device according to the invention with reference to FIGS. 18 to 20.

The fourth embodiment can be enforced by using any one of the structures of the first, second and third embodiments. Also, in the present embodiment, the corresponding parts thereof that are identical in structure with those of the first, second and third embodiments are given the same designations and thus the description thereof is omitted here.

Figure 18:
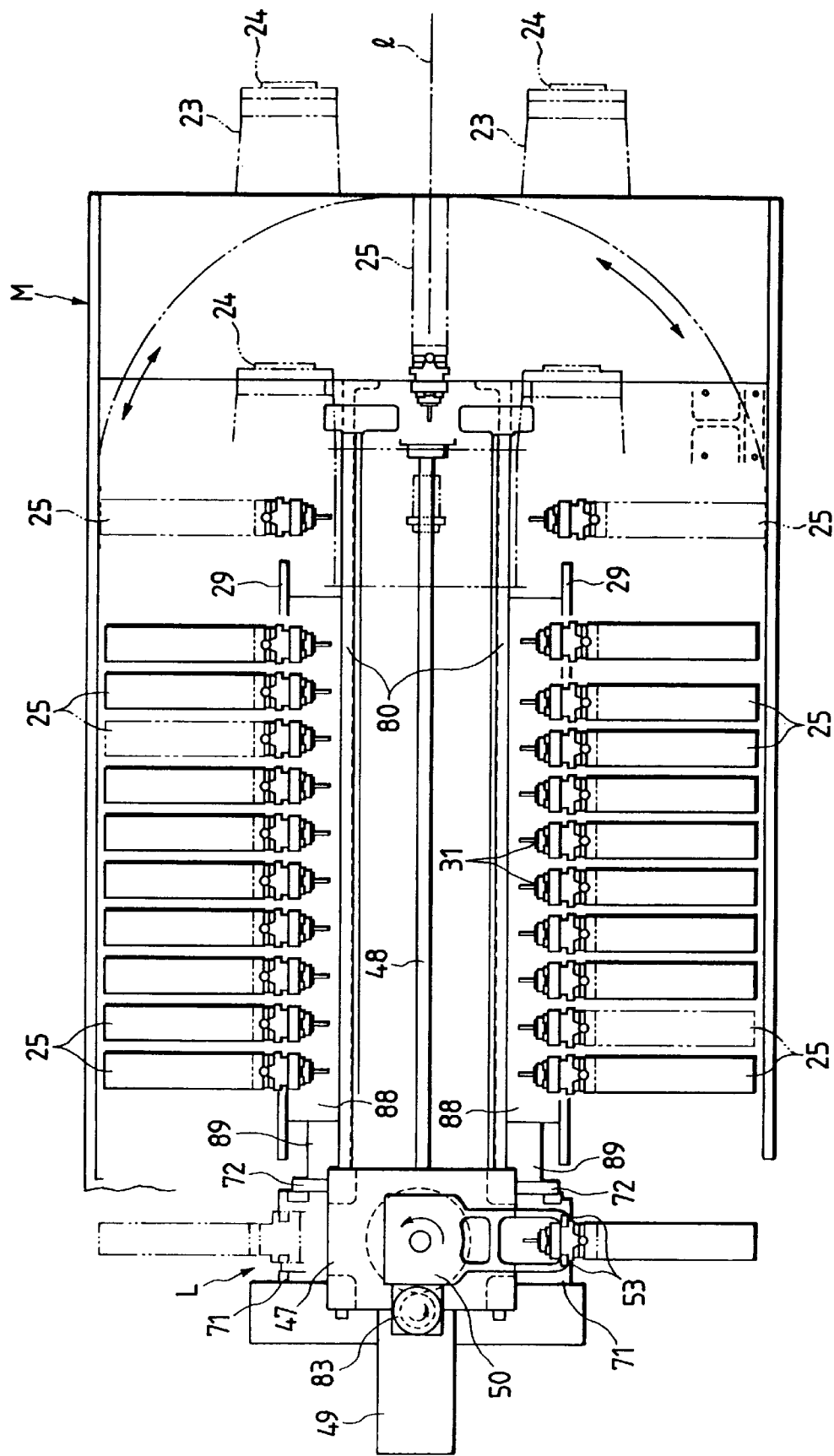
FIG. 18 is a plan view of a fourth embodiment of a tool change device according to the invention.

Now, FIG. 18 is a plan view of a working machine M incorporating therein a tool change device according to the invention, showing a state thereof which is viewed from above. A pair of main tool magazines 29 and a pair of tool storage members 71 (or 41) are respectively disposed in parallel to each other in such a manner that they are symmetrical with respect to the tool axis 1 at the tool change position P3, and a single tool loader L can be moved on the tool axis 1 and also can deliver the tools 25 selectively to the main tool magazines 29 and tool storage members 71 which are situated on the two sides of the tool loader L.

In the first to third embodiments, the tool posture change mechanism by means of the tool loader L, as shown in FIG. 2, is composed of the engaging pin 51 provided on the rotary body 50 and the cam groove 52 formed on the frame 26, that is, due to the action of the curved portion 52 of the cam groove 52, the posture of the tool 25 is changed between the end portion of the main tool magazine 29 and the tool change position P3 together with the movement of the tool loader L. Instead of this, in the present embodiment, there is provided on the tool loader L such a posture change mechanism as shown in FIGS. 19 and 20, in which the rotary body 50 of the tool loader L can be rotated in the range of 180 degrees so that it can correspond to the tool main magazines 29 and tool storage members 71 on both sides as well as to the tool change position P3.

Figure 19:
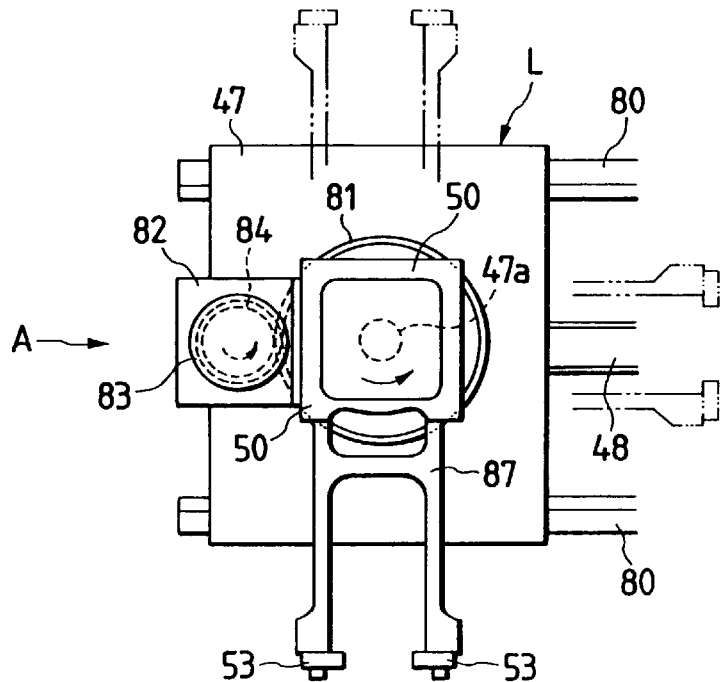
FIG. 19 is a plan view of a tool loader employed in the fourth embodiment.
Figure 20:
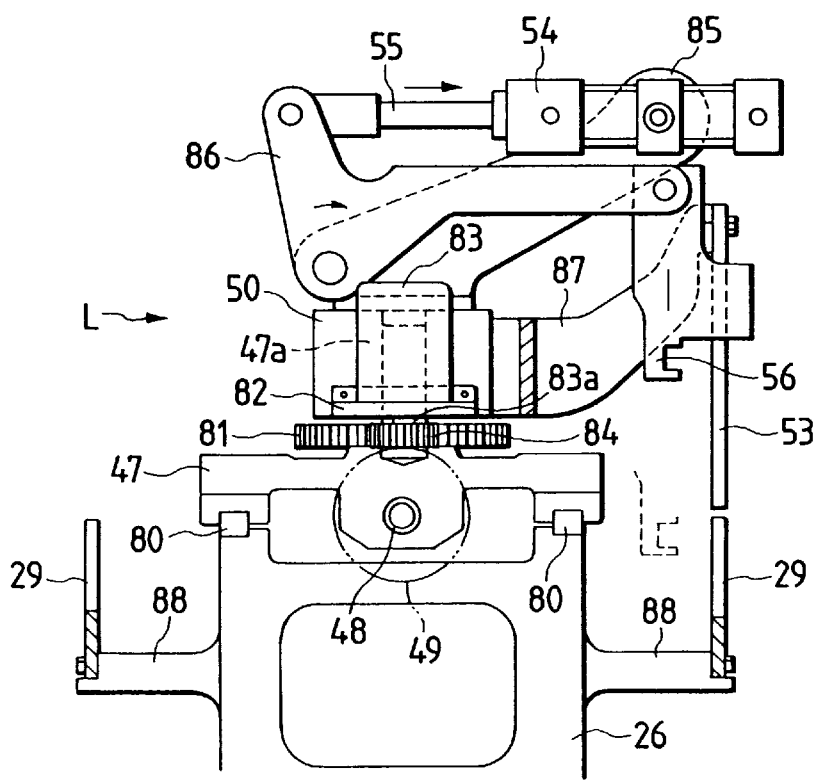
FIG. 20 is a partially broken side view, taken along the arrow A shown in FIG. 19.

In FIGS. 19 and 20, the moving body 47 of the tool loader L can be moved along a pair of guide rails 80 extending in parallel to the longitudinal direction of the main tool magazines 29 by a moving motor 49 through a ball screw 48. The rotary body 50 is disposed on the moving body 47 in such a manner that it can be rotated about the support shaft 47a of the moving body 47, while a fixed gear 81 is concentrically fixed to the support shaft 47a. In the rotary body 50, there is provided a tool grip portion which is composed of a pair of tool grip arms 53 and a hook member 56. Further, a motor mounting plate 82 is fixed to one side of the rotary body 50 by a bolt or the like, while a posture changing motor 83 is mounted on the plate 82. And, a small-diameter gear 84 meshable with the fixed gear 81 is mounted on the motor shafts 83a of the motor 83. If the motor 83 is driven, then the small-diameter gear 84 is rotated to thereby be able to turn around the periphery of the fixed gear 81 by means of the meshing engagement thereof with the fixed gear 81. As a result of this, the rotary body 50 is rotated about the support shaft 47a. That is, by controlling the motor 83, the posture of the tool 25 can be freely changed in forward and backward directions in the range of 180 degrees; in particular, the posture of the tool 25 is changed 90 degrees when it is moved from one main tool magazine 29 side to the tool change position P3, the posture of the tool 25 is changed further 90 degrees when it is moved from the tool change position P3 to the other main tool magazine 29, or the posture of the tool 25 is changed 180 degrees when it is moved from one main tool magazine 29 side to the other main tool magazine 29.

Also, according to the present embodiment, in FIG. 20, the delivery cylinder 54 employed in the first to third embodiments is supported in a horizontal condition by a support arm 85 fixed to the rotary body 50, the piston rod 55 of the delivery cylinder 54 is rotatably connected to an oscillating arm 86 which is supported on the base portion of the support arm 85, and the hook member 56 is rotatably connected to the other end of the oscillating arm 86, thereby forming a vertical movement drive mechanism for the hook member 56. Here, the pair of tool grip arms 53 are respectively fixed to the rotary body 50 through a mounting arm 87, while the hook member 56 can be moved up and down along the grip arms 53.

Further, as shown in FIGS. 18 and 20, on the two side surfaces of the frame 26, in particular, at positions symmetrical to each other with respect to the tool axis 1 at the tool change position P3, there are formed magazine mounting portions 88 and tool storage member support portions 89. That is, the main tool magazines 29 are removably mounted on the magazine mounting portions 88 by bolts or the like respectively, while a guide rail 72 (or 37) for guiding and supporting the tool storage member 71, a moving mechanism and the like are removably mounted on the tool storage member support portions 89 by bolts or the like. Due to this, as the need arises, the main tool magazines 29 and tool storage members 71 can be selectively disposed on the two sides or on one side, before they are used.

Therefore, if the main tool magazines 29 and the like are disposed on the two sides, then the number of tools to be held can be doubled without extending the whole length of the main tool magazines 29, thereby being able to cope with various kinds of working operations. Further, the tools 25 can be easily delivered to the main tool magazines 29 and tool storage members 71 on either sides by the single tool loader L, which eliminates the need for provision of two tool loaders which are used exclusively for either sides.

Figure 21:
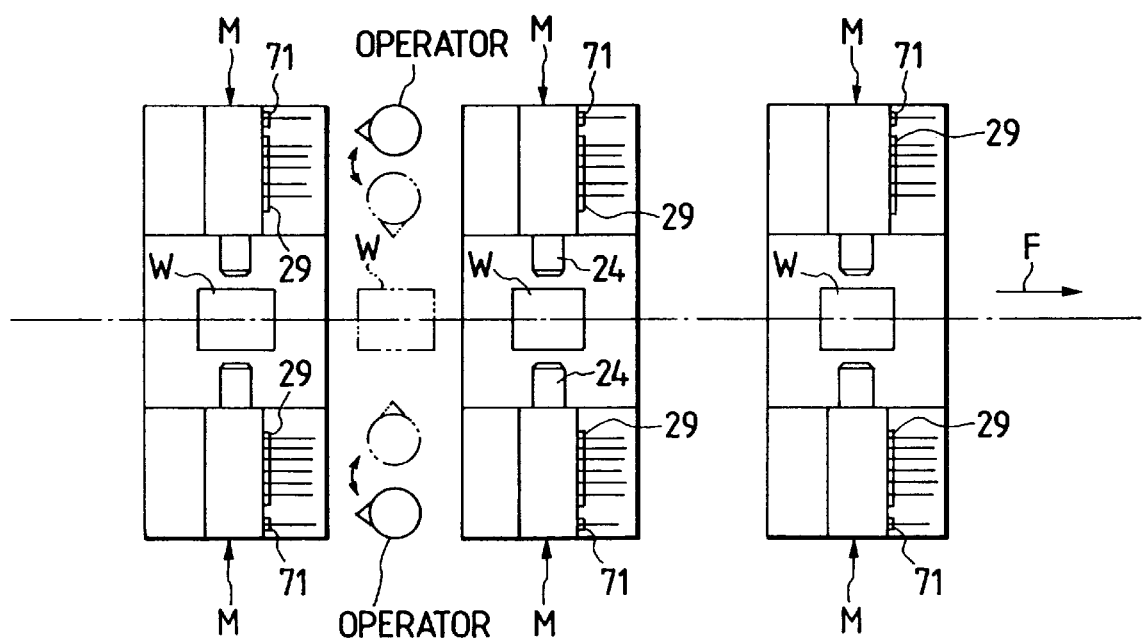
FIG. 21 is a plan view obtained when there are arranged a plurality of working machines each incorporating therein a tool change device according to the fourth embodiment of the invention.

In addition, for example, as shown in FIG. 21, when there are arranged a plurality of working machines M to thereby provide a working line, the mounting sides of the main tool magazines 29 and tool storage members 71 to the working machines M can be all unified on the downstream side with respect to the running direction F of works W, that is, they can be set on the side which is convenient for the motion of the operator when the operator checks the works, changes the tools, and so on. This allows the present embodiment to cope with various lay-out or operation requirements easily.

Now, the present invention can also be modified in the following manner when it is enforced:

(1) In the tool change device according to the first embodiment, as in the third embodiment, there are provided two or more stages of main tool magazines 29;

(2) In the tool change device according to the second embodiment, in the tool storage member 71, there are formed three or more storage grooves 73 which are used as the storage portions of the tool storage member 71;

(3) In the tool change device according to the third embodiment, there are provided three or more stages of main tool magazines 29;

(4) In the tool change device according to the first, second or third embodiment, the posture change mechanism composed of the engaging pin 51 and cam groove 52 is changed to the posture change mechanism according to the fourth embodiment which is composed of the motor 83 and gears 84, 81; and, (5) In the tool change device according to the first, second or third embodiment, the drive mechanism for the hook member 56 is changed to the link mechanism according to the fourth embodiment which is composed of the oscillating arm 86 and the like.

Now, description will be given below in detail of a fifth embodiment of a tool change device according to the invention with reference to the accompanying drawings.

Figure 22:
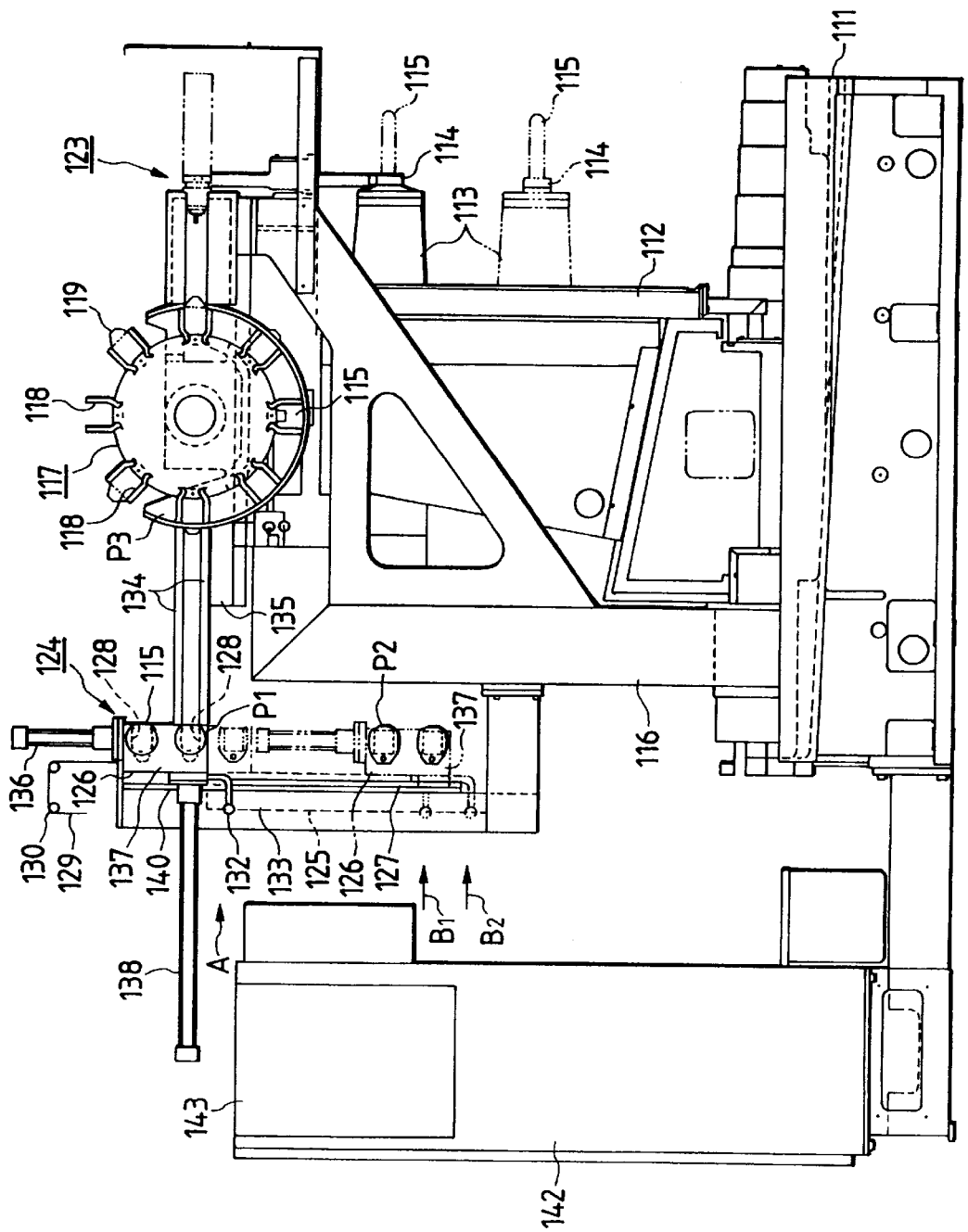
FIG. 22 is a front view of a fifth embodiment of a tool change device according to the invention.

As shown in FIG. 22, a machine tool or a working machine includes a base 111 and, on the base 111, there is disposed a column 112 in such a manner that it can be moved in the back-and-forth direction of the working machine as well as in the right-and-left direction thereof. And, the column 112 includes thereon a spindle head 113 which is supported in such a manner that it can be moved in the vertical direction. A main spindle 114 is rotatably supported by the spindle head 113, while a tool 115 such as a drill or the like can be removably mounted onto the leading end of the main spindle 114. In operation, in a state that the spindle head 113 is positioned at a lower working position shown by a chained line in FIG. 22, while the main spindle 114 is being rotated, the column 112 is moved to and away from a work placed on a table (not shown) and a given working operation is carried out on the work by the tool 115.

A frame 116 is provided or erected on the base 111. A disk-shaped tool magazine 117 is disposed backwardly and upwardly of the main spindle 114 and is rotatably supported on the upper surface of the frame 116. The tool magazine 117 includes on the outer periphery thereof a plurality of hold grooves 118 respectively serving as hold portions for holding the tool 115. The hold grooves 118 are formed at a given pitch and are respectively opened outwardly.

As shown in FIG. 22 and FIGS. 23 to 26, a tool pot 119 can be held removably in any one of the hold grooves 118 of the tool magazine 117 and includes on the two outer sides thereof engaging grooves 120 which can be engaged with the two side edges of the hold groove 118. The tool pot 119 further includes a taper hole 121 formed in the central portion thereof, while the holder H of the tool 115 can be removably inserted into the taper hole 121 of the tool pot 119. Also, on the end portion of the tool pot 119, there are installed four lock balls 119a which are spring biased from their respective installation positions toward the central portion of the tool pot 119. That is, when the tool 115 is inserted into the tool pot 119, the four lock balls 119a secures the tool 115 in such a manner that it is prevented against removal in a pull stud portion Ha thereof which is provided in the leading end portion of the holder H. Further, in the tool port 119, there is projectingly provided a pin 122 which can be engaged with and disengaged from a tool removing and mounting member 140 which will be discussed later.

As shown in FIG. 22, a tool change mechanism 123 is mounted on the frame 116 in such a manner that it is situated between the tool magazine 117 and main spindle 114. The tool change mechanism 123 according to the fifth embodiment is structured similarly to the first to fourth embodiments and thus the detailed description thereof is omitted here. One tool 115 is selected from a plurality of tools 115 respectively held in the hold grooves 118 of the tool magazine 117 and is then substituted for a tool 115 mounted on the main spindle 114 by the tool change mechanism 123.

A tool removing and mounting mechanism 124 is installed on the frame 116 through a bracket 125 in such a manner that it is disposed on the opposite side to the tool change mechanism 123 with the tool magazine 117 between them. When the tool 115 held in the hold groove 118 of the tool magazine 117 reaches a predetermined number of times of use or is damaged, the present tool 115 is replaced with a new tool 115 by the tool removing and mounting mechanism 124.

Figure 23:
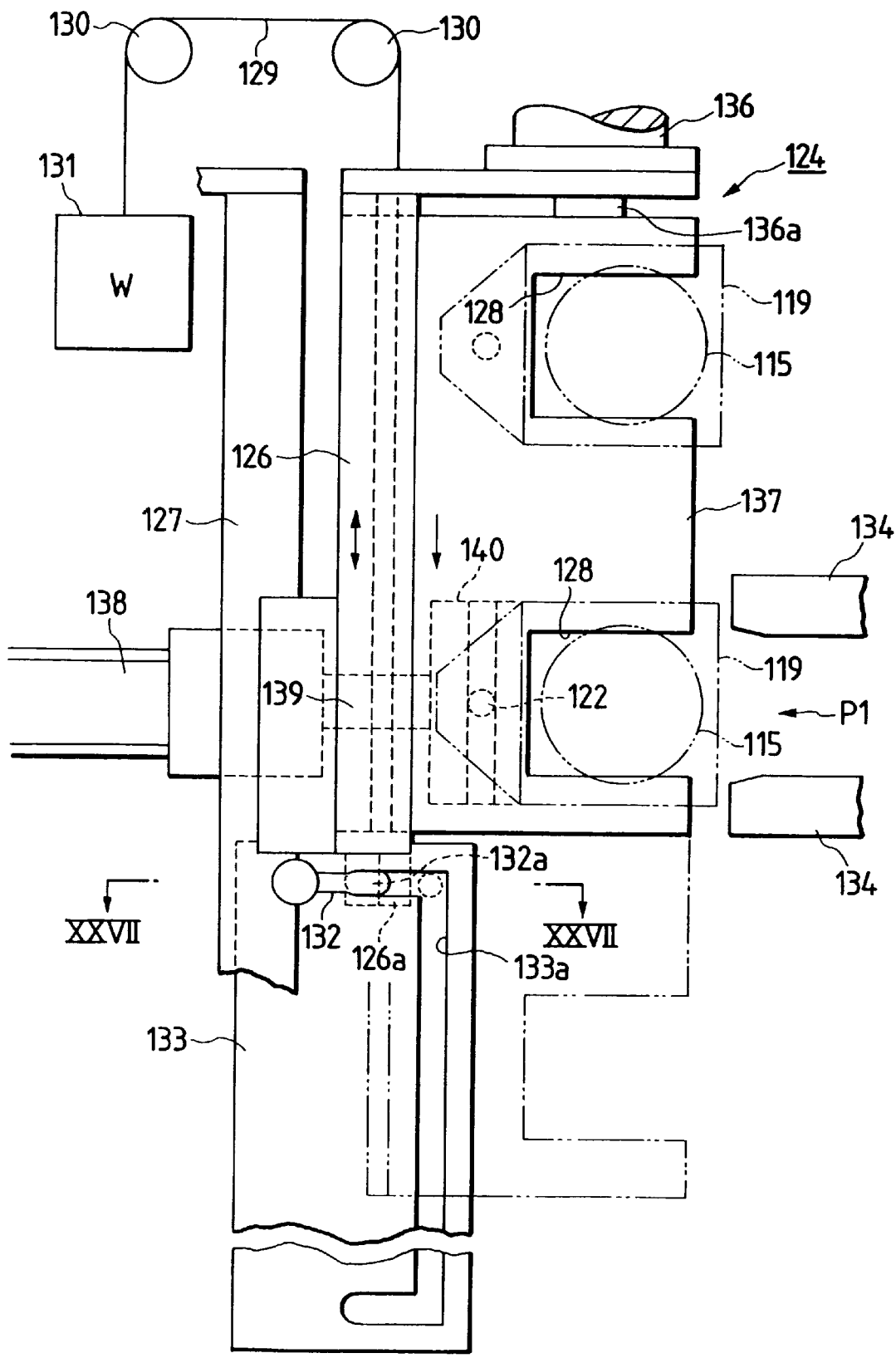
FIG. 23 is an enlarged front view of the main portions of the embodiment shown in FIG. 22.

Now, referring to the present tool removing and mounting mechanism 124, as shown in FIGS. 22 and 23, a tool storage member 126 including a moving cylinder 136 serving as moving means is supported by the bracket 125 in such a manner that it can be moved in the vertical direction through a guide rail 127. A storage body 137 is slidably mounted on the tool storage member 126, while the storage body 137 can be moved up and down in the vertical direction by the moving cylinder 136. The storage body 137 includes a pair of storage grooves 128 serving as a pair of storage portions. In particular, the storage grooves 128 are formed in such a manner that they are spaced by a given distance from each other in the vertical direction of the storage body 137 and are respectively opened toward the tool magazine 117 side. And, the tool pot 119 having the tool 115 fitted thereinto can be removably stored into and held by these storage grooves 128 by means of the engaging grooves 120 shown in FIGS. 24 to 26.

A wire 129 is so mounted as to extend around a pair of pulleys 130 provided on the bracket 125. The tool storage member 126 is connected to one end of the wire 129, while a weight 131 is so disposed as to hang down from the other end of the wire 129. And, the weight of the weight 131 cancels the weight of the tool storage member 126 including the tool 115, so that the tool storage member 126 can be easily moved up and down by hand.

Figure 27:
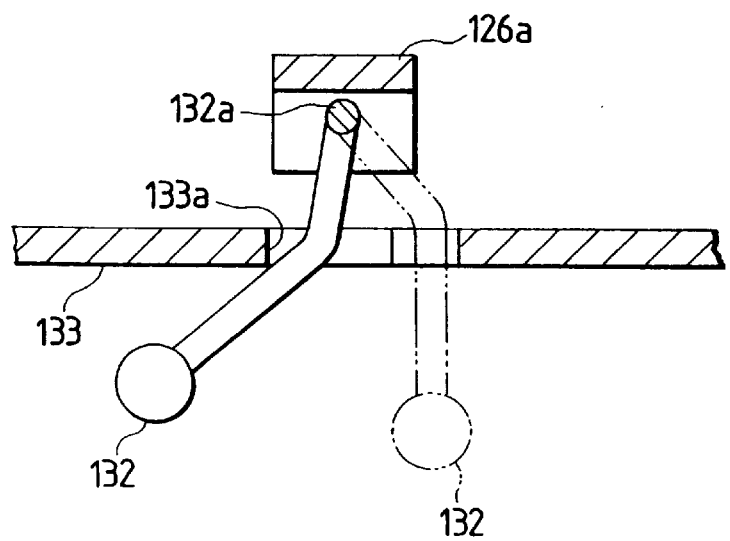
FIG. 27 is a section view of a handle, taken along the line XXVI—XXVI shown in FIG. 18.

A handle 132 is mounted on a bracket 126a fixed to the lower end of the tool storage member 126 in such a manner that the handle 132 can be freely oscillated about a shaft 132a, while the handle 132 is used when the tool storage member 126 is to be moved up and down as well as is to be locked in position. The intermediate portion of the handle 132 is in engagement with a cam groove 133a formed in a positioning cam plate 133 which is fixed to the bracket 125 including the guide rail 127. And, as shown by a solid line in FIG. 27, when the handle 132 is fallen down into engagement with the horizontally extending groove portion of the cam groove 133, the tool storage member 126 can be position locked at a relay position A including an upper tool removing and mounting position P1 as shown by a solid line in FIG. 22 and at two operation positions B1 and B2 including a lower tool replacing position P2 as shown by a chained line in FIG. 22, respectively.

Figure 26:
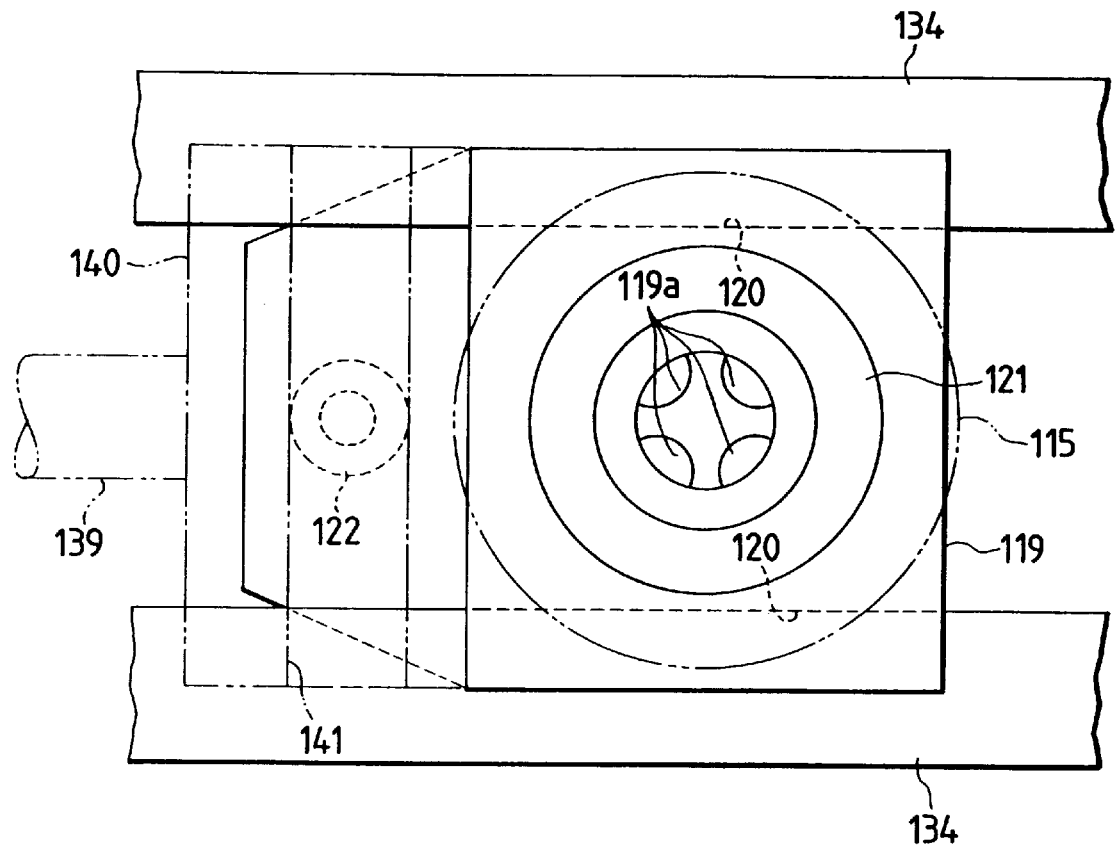
FIG. 26 is an enlarged front view of the tool pot and guide plates, showing how the tool pot is fitted with the guide plates.

As shown in FIGS. 22, 25 and 26, a pair of guide plates 134 are mounted on the frame 116 through a mounting plate 135 and, between the storage groove 128 of the storage body 137 situated at the tool removing and mounting position P1 and the hold groove 118 situated at a tool replacing position P3 on the left side of the tool magazine 117, are extended linearly in the horizontal direction while they are spaced apart from each other in the vertical direction. And, if these guide plates 134 are engaged with the engaging grooves 120 of the tool pot 119, then the tool 115 fitted into the tool pot 119 can be moved and guided linearly between the storage groove 128 of the storage body 137 situated at the tool removing and mounting position P1 and the hold groove 118 of the tool magazine 117.

The tool storage member 126, with the moving cylinder 136 carried thereon, is in engagement with the guide rail 127, while the storage body 137 is connected with a piston rod 136a (see FIG. 23) provided in the moving cylinder 136. And, in a state that the tool storage member 126 is situated at the upper relay position A, if the storage body 137 is moved upward or downward by an amount corresponding to the forming pitch of the storage groove 128 by the moving cylinder 136, one of the storage grooves 128 can be selectively positioned at the tool removing and mounting position P1 that corresponds to the guide plate 134.

As shown in FIGS. 22, 24 and 26, a removing and mounting cylinder 138 is disposed in the bracket 125, in particular, in the portion thereof that is extended from the guide plates 134. A tool removing and mounting member 140 forming tool removing and mounting means is mounted on a piston rod 139 for the removing and mounting cylinder 138 and further includes in the front surface thereof an engaging groove 141 which is opened upwardly and downwardly and also into which the pin 122 of the tool pot 119 can be engaged.

And, in a state where the tool removing and mounting member 140 is moved to the tool replacing position P3 on the tool magazine 117 side due to the extending operation of the removing and mounting cylinder 138, if the tool magazine 117 is indexingly rotated, the pin 122 on the tool pot 119 held by the hold groove 118 indexed to the tool replacing position P3 can be engaged with the engaging groove 141 of the tool removing and mounting member 140. In this state, if the tool removing and mounting member 141 is moved to the left in FIG. 22 due to the contracting operation of the removing and mounting cylinder 138, then the tool 115 in engagement with the engaging groove 141 through the pin 122, together with the tool pot 119, can be removed from the hold groove 118 of the tool magazine 117 and can be further moved along the guide plates 134 toward the tool removing and mounting position P1. Next, the tool 115 and tool pot 119 are stored into one storage groove 128 of the storage body 137.

After then, if the storage body 137 is moved by an amount corresponding to the forming pitch of the storage groove 128 by the moving cylinder 136, then the pin 122 of the tool pot 119 stored in one storage groove 128 of the storage body 137 can be removed from the engaging groove 141 of the tool removing and mounting member 140. At the same time, the pin 122 of a tool pot 119 stored in the other storage groove 128, for example, the pin 122 of a tool pot 119 holding a new tool 115 therein is engaged with the engaging groove 141 of the tool removing and mounting member 140. In this state, if the tool removing and mounting member 140 is moved to the right in FIG. 22 due to the extending operation of the removing and mounting cylinder 138, then the tool pot 119 in engagement with the engaging groove 141 through the pin 122 can be removed from the storage groove 128 of the storage body 137 and can be then moved along the guide plates 134 toward the tool replacing position P3. Next, the tool pot 119 is inserted into and held by a vacant hold groove 118 situated at the tool replacing position P3 of the tool magazine 117.

Next, description will be given below of the operation of the tool change device structured in the above-mentioned manner.

Now, in a working machine incorporating the present tool change device therein, the two or more tools 115 respectively held in the hold grooves 118 on the tool magazine 117 are selectively replaced and mounted onto the main spindle 114 by the tool replacement mechanism 123. And, a given working operation is carried out on a work (not shown) by use of the tools 115.

During the working operation of the working machine, when the tool 115 held in the hold groove 118 of the tool magazine 117 reaches a predetermined number of times of use or is damaged, the operator is given a tool replacement notice by a display device 143 provided on a control panel 142 so erected as to extend substantially in parallel to the frame 116 shown in FIG. 22. In response to this, the operator previously sets a new tool 115 for replacement in the tool storage member 126 while continuing the working operation. That is, the operator moves the tool storage member 126 of the tool removing and mounting mechanism 124 to a lower operation position B1 or B2 shown by a chained line in FIG. 22 and positions one storage groove 128 of the storage body 137 storing therein the tool pot 119, the tool of which is to be replaced with a new one, at the tool replacing position P2. And, the new tool 115 is stored into the present tool pot 119, or the new tool 115 together with the tool pot 119 is stored into the thus positioned storage groove 128. In this state, the tool storage member 126 is moved to and positioned at an upper relay position A shown by a solid line in FIG. 22 and, at the same time, as the need arises, the moving cylinder 136 is operated to thereby cause the vacant storage groove 128 of the storage body 137 to be positioned at a position corresponding to the tool removing and mounting position P1. At the then time, there is input a signal telling to the effect that preparation for an operation to replace the old tool with a new tool is just completed. Thus, when the old tool 115 is replaced with a new one in compliance with a replacement instruction, by means of the indexing rotation of the tool magazine 117, the replacement-noticed old tool 115, that is, the old tool 115, which reaches the predetermined number of times of use or is damaged, is positioned at the tool replacing position P3. At the then time, the tool removing and mounting member 140 is present at the tool replacing position P3 and thus it can be engaged with the tool pot 119 for the old tool 115.

After such engagement, the tool removing and mounting member 140 is moved toward the tool removing and mounting position P1 of the tool storage member 126 by the removing and mounting cylinder 138. The old tool 115 indexed to the tool replacing position P3 of the tool magazine 117, together with the tool pot 119, is moved along the guide plates 134 to the tool removing and mounting position P1, and is then stored into the other vacant storage groove 128 of the tool storage member 126. In this state, by operating the moving cylinder 136, the storage body 137 is moved upward or downward by an amount corresponding to the forming pitch of the storage groove 128, and the new tool 115 previously stored in one storage groove can be positioned at a position which corresponds to the tool removing and mounting position P1. In this state, the pin 122 of the tool pot 119 for the new tool 115 is engaged with the engaging groove 141 of the tool removing and mounting member 140.

Just after this engagement, the tool removing and mounting member 140 is moved toward the tool replacing position P3 of the tool magazine 117 by the removing and mounting cylinder 138. The new tool 115 stored in the storage groove 128 of the tool storage member 126, together with the tool pot 119, is moved along the guide plates 134 to the tool replacing position P3 and is then inserted into and held by the vacant hold groove 118 that is situated at the tool replacing position P3 of the tool magazine 117. This completes the replacement operation to replace the old tool 115 with the new tool 115.

After then, even during the working operation, at a proper time, by operating the handle 132, the operator can move the tool storage member 126 from the upper relay position A to the lower operation position B1 or B2. And, at the tool replacing position P2, the old tool 115 may be taken out from the storage groove 128 of the tool storage member 126.

Now, description will be given below of the effects that can be expected when the above-mentioned fifth embodiment is enforced:

(a) In the tool change device according to the present embodiment, the tool removing and mounting mechanism 124, which is used to remove and mount the tools 115 with respect to the hold grooves 118 respectively disposed on the tool magazine 117, is arranged at a position existing on the opposite side to the tool replacement mechanism 123 with the tool magazine 117 between them. Thanks to this structure, when any one of the tools 115 respectively held in the hold grooves 118 of the tool magazine 118 is replaced with a new one, simply by previously setting a new tool 115 in the tool storage member 126 at a proper time while continuing the working operation of the working machine, the old tool 115 can be easily replaced with the new one 115 automatically and in short time by the tool removing and mounting mechanism 124. That is, when compared with the conventional structure in which the tools 115 are manually removed and mounted while stopping the working operation, the working operation of the working machine can be greatly improved in the working efficiency thereof.

(b) Since the operation to remove and mount the old and new tools 115 is executed on the machine rear portion side that is spaced apart from the working position, an operator is free from smears due to a coolant and the like and thus the present embodiment is good for the operator's health.

(c) When the tools 115 are removed and mounted by the tool removing and mounting mechanism 124, the storage body 137 of the tool storage member 126 is moved by the moving cylinder 136, so that a given storage groove 128 can be positioned at the tool mounting and removing position P1 corresponding to the hold groove 118 that is formed on the tool magazine 117 and is situated at the tool replacing position P3. Due to this, the operation of the tool removing and mounting member 140 to replace the old tool 115 with a new one can be executed with high efficiency between the storage groove 128 of the tool storage member 126 and the hold groove 118 of the tool magazine 117.

(d) In the removing and mounting operation of the tools 115 by the tool removing and mounting mechanism 124, the tool removing and mounting member 140 can be moved linearly between the storage groove 128 of the tool storage member 126 situated at the tool removing and mounting position P1 and the hold groove 118 of the tool magazine 117 situated at the tool replacing position P2. Thanks to this, even when the tool storage member 126 is disposed at a position spaced apart from the tool magazine 117, the removing and mounting operation of the tools 115 can be carried out smoothly in a short time.

(e) When the old tool 115 is replaced with a new one with respect to the storage groove 128 of the tool storage member 126, the tool storage member 126 is moved between the relay position A including the tool removing and mounting position P1 and the tool replacing position P2 spaced apart from the relay position A. Due to this, even when the tool magazine 117 is mounted at a high position in the upper portion of the working machine and the tool removing and mounting position P1 is set at a high position, the tool replacing position P2 can be set at a low position which facilitates the tool replacing operation, so that the operator can remove the old tool 115 from the storage groove 128 of the tool storage member 126 and then mount the new one 115 thereinto easily and safely.

In addition to the above, the present invention can also be enforced by modifying it in the following manner:

(1) Three or more storage grooves 128 may be formed in the tool storage member 126 of the tool removing and mounting mechanism 124. With use of this structure, a plurality of tools 115 can be held in the tool storage member 126 at a time and these tools 115 can be replaced successively, which results in the improved operation efficiency.

(2) It is also possible to provide drive means such as a screw feed mechanism or the like which is used to move the tool storage member 126 upwardly and downwardly between the relay position A and the operation position B1 or B2. That is, the storage member 126 can be moved up and down automatically instead of the manual operation.

(3) When the tool removing and mounting position P1 provides a height ideal for the operation, the relay position A, as it is, can be used as an operation position for tool replacement. This can omit the lifting and falling mechanism such as the guide rail 127, wire 129, pulley 130, weight 131, handle 132, cam plate 133 and the like which are used to move up and down as well as guide the tool storage member 126.

(4) The tool magazine 117 may be formed in a rectangular flat plate which is long from side to side, and a plurality of hold grooves 118 serving as hold portions may be formed at a given pitch along the upper side edge of the tool magazine 117. This structure can also enjoy similar effects to the above-mentioned embodiment.

Due to the above-mentioned structure, the present invention provides the following effects.

That is, according to the invention, the tool change position, the respective hold portions of the tool magazine, and the tool storage member are arranged in order almost on a straight line, a single tool loader can be moved quickly along them, and the tools can be changed in a short time respectively between the tool change arm and tool magazine, between the tool magazine and tool storage member, and between the tool storage member and tool change arm. Due to this, even during the working operation of the working machine, the tool can be replaced with respect to the tool magazine. Also, the tool stored in the tool storage member can be directly delivered to the tool change arm not through the tool magazine, that is, the tools can be changed in a short time, which can contribute toward enhancing the operation efficiency.

Use of the linear tool magazine eliminates the need for provision of the tool magazine indexing mechanism to thereby be able to decrease the size of the whole tool change device, so that the tool change device can be easily mounted in the small vacant space of the working machine.

Further, according to the present invention, since the delivery of the tools between the tool change arm and tool magazine, between the tool magazine and tool storage member, and between the tool storage member and tool change arm can be carried out by a single tool loader, the tool delivery structure can be simplified and thus the manufacturing cost of the tool change device can be reduced accordingly.

According to the invention, because the hold portions of the tool magazine are arranged at an equal pitch, the structure of the tool magazine and the feed control of the tool loader can be simplified.

According to the invention, since the hold portions of the tool magazine can be formed at intervals which are matched to the sizes of the tools, the tool storage efficiency can be improved.

According to the invention, when an abnormal condition occurs in the tools respectively held in the hold portions of the tool magazine, for example, when the tools are unusable due to wear or the like, or when the tools are not accurately held in their respective hold portions, such abnormal condition can be easily detected by means of the simple sensor structure, so that the tools can be changed quickly.

According to the invention, even when the tool magazine is mounted at a high position in the upper portion of the working machine and the tool loader is set at a high position, the tool storage member can be moved from the delivery position down to a further lower position and thus the tool change can be achieved at a low position which facilitates the change operation.

According to the invention, since new tools corresponding to all of the hold portions of the tool magazine can be previously held in a subordinate tool magazine, the tools can be automatically substituted from the subordinate tool magazine to the tool storage member.

Also, while the new tools are present on the subordinate tool magazine, an operator need not execute the tool change operation. For this reason, the operator is allowed to be away from the tool change position during such time, which makes it possible to enhance the operation efficiency.

According to the invention, since two or more stages of tool magazines are provided at a given interval, various kinds of tools can be held in the hold portions of these tool magazines. And, the tool loader is able to change the tools easily between the tool change arm, the respective stages of tool magazines, and tool storage member.

According to the invention, two or more kinds of new tools to be substituted can be previously stored in the tool storage member. Or, immediately after the old tools to be replaced are returned to one storage portion, the new tools can be taken out from the other storage portion.

According to the invention, the tool magazine can be positioned in the back and forth direction with respect to the tool change position.

According to the invention, the number of tools to be held can be doubled without extending the whole length of the tool magazine.

According to the invention, when a plurality of working machines are arranged and used, the mounting sides of the tool magazines and tool storage members to the working machines can be so set as to be able to cope with various layout and operation requirements easily.

According to the invention, the tools can be easily delivered to the tool magazines on either sides by a single tool loader, which eliminates the need for provision of two tool loaders to be used exclusively for either sides.

According to the invention, when a tool being currently used must be replaced with a new tool immediately due to damage or the like in the working process, the new tool can be delivered directly to the tool change position from the tool storage member not through the tool magazine. Due to this, with no intervention of the tool magazine indexing operation or the like as in the conventional tool change device, the new and old tools can be changed in a short time. Also, the tools can be changed during the working operation, thereby being able to improve the working efficiency to a great extent.

According to the invention, by storing a new tool on the tool storage member previously, when an old tool becomes unusable due to wear or the like, the old tool can be quickly replaced with the new tool stored on the tool storage member.

Also, while the new tool is present on the tool storage member, an operator need not execute the tool change operation. For this reason, the operator is allowed to be away from the tool change position during such time, which makes it possible to enhance the operation efficiency.

According to the invention, an old tool within the tool magazine is firstly discharged to the tool storage member and, after confirmation of the discharge of the old tool, an operator can replace the old tool with a new tool corresponding to the old tool, which prevents the wrong tool replacement.

According to the invention, an old tool once discharged can be returned to the working machine and used there for the time being, so long as the use of the old tool is permitted. Also, for example, even when the new and old tool replacing operation by the operator is left unexecuted, the discharged old tool can be returned again to the working machine and can be used there. Thanks to this, the working operation of the working machine can be carried out continuously without interrupting it.

According to the invention, the tool loader is able to deliver and receive the new and old tools with respect to the tool storage member at a preset position.

According to the invention, after the tool loader takes out an old tool or a new tool from the tool magazine or from the tool storage member, the tool loader provisionally puts the thus taken-out tool into the provisional hold portion formed in the end portion of the tool magazine. Due to this, the old and new tools can be changed by a highly efficient operation, whether the old or new tool is taken out firstly.

According to the invention, an old tool held in the hold portion of a tool magazine can be easily replaced with a new one while continuing the working operation of a machine tool. This can improve the working efficiency of the working operation of the machine tool.

Also, according to the invention, the structure of a tool removing and mounting mechanism can be simplified and a tool can be smoothly mounted into and removed from the hold portion of the tool magazine.

Further, according to the invention, even when the tool magazine is mounted at a high position in the upper portion of the machine tool and thus the tool removing and mounting position is set at a high position, a tool replacing position can be set at a low position which facilitates the tool replacing operation, so that an operator can easily carry out a tool replacing operation with respect to the storage portion of the tool storage member in the tool removing and mounting mechanism.

(Sixth Embodiment)

Furthermore, hereinafter, a description will subsequently be given in detail of a sixth embodiment of the present invention with reference to the drawings. Incidentally, the drawings are for the purpose of illustration only and the present invention may be modified partially without departing from the spirit thereof.

Figure 28:
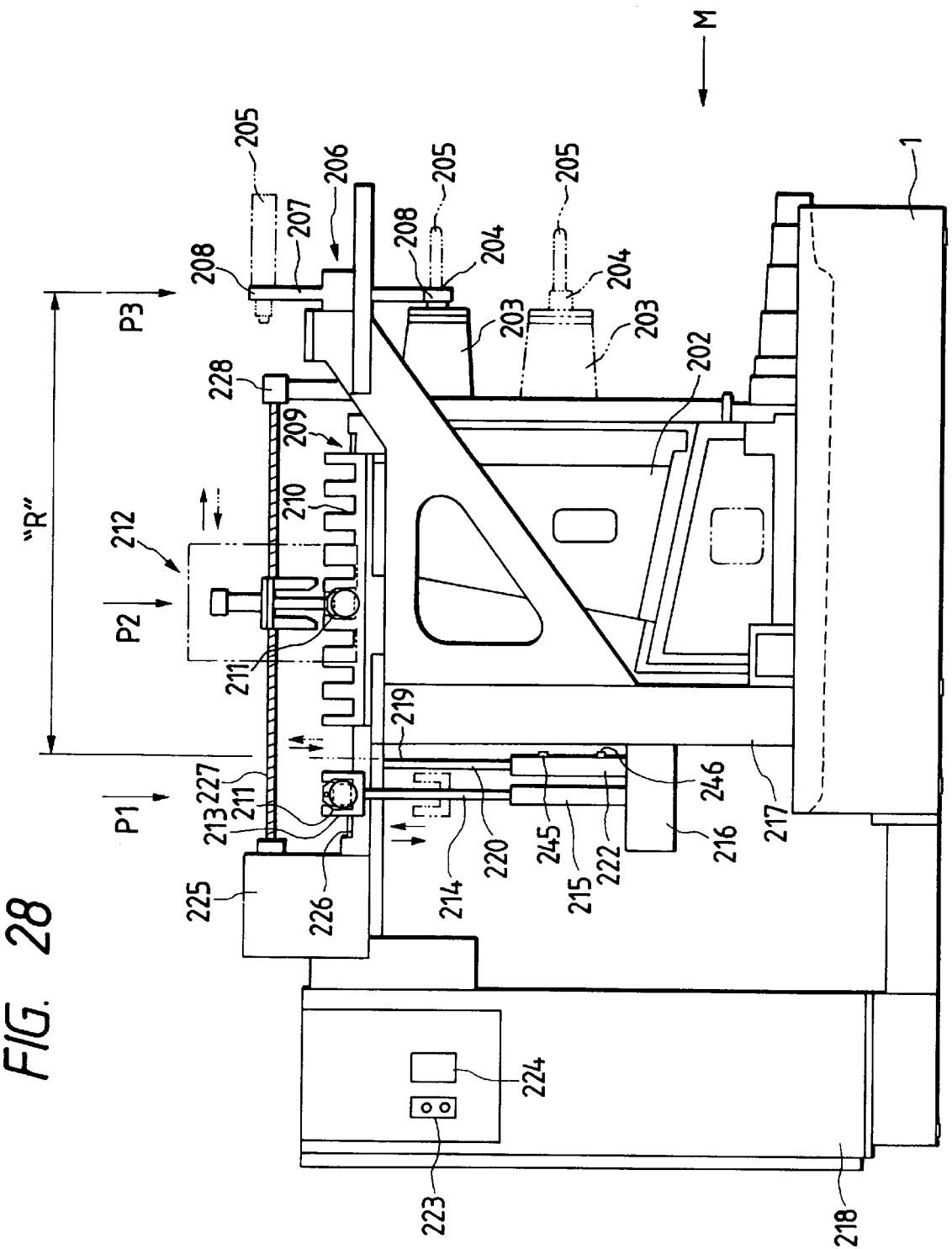
FIG. 28 is a front view of a tool change device embodying the present invention.

FIG. 28 is a front view of a tool change device embodying the present invention. In FIG. 28, a column 202 is disposed on the base 201 of a working machine M in such a manner that it can be moved in the horizontal direction and in the vertical direction and a main spindle head 203 is supported by the column 202 in such a manner that it can be moved in the vertical direction. A main spindle 204 is rotatably supported by the main spindle head 203 and a tool 205 such as a drill or the like is removably mounted on the leading end of the main spindle 204. The column 202 is moved with respect to a work put on a table (not shown) while the main spindle 204 is being rotated in such a state that the main spindle head 203 is situated in a lower working position shown by a chain line in FIG. 28, so that a work is subjected by the tool 205 to given working.

A frame 217 is erected on the base 201. The tool change arm 207 of the tool interchanging means 206 is supported on the side surface of the frame 217 so that it is positioned above the main spindle 204 and made pivotal around an axis parallel to the axis of the main spindle 204 and can also be moved back and forth in the axial direction, a tool grip portion 208 being formed at both ends of the tool change arm 207. Further, the tool change arm 207 is pivoted around its axis and moved in the axial direction in such a state that the main spindle head 203 is set in the upper position shown by a solid line in FIG. 28, and a tool 205 held on the side of the main spindle 204 and another tool 205 conveyed from the side of a tool magazine 209 to a tool change position P3 are gripped by the respective tool grip portions 208, whereby the former is simultaneously removed and replaced with the latter.

The tool magazine 209 in the form of a rectangular flat plate is fixed onto the frame 217 so that it is positioned in the rear (toward the left-hand side of FIG. 28) of the tool change arm 207 and extended in the axial direction of the main spindle 204. The plurality of hold portions 210 are formed and arranged at a given pitch on a horizontal straight line longitudinally extending along the upper side edge of the tool magazine 209 and besides opened upward in the same direction. Some of the plurality of hold portions 210, for example, those for use in holding large-diameter tools such as milling cutters are formed at a pitch greater than the above-mentioned given pitch with respect to their adjoining hold portions 210.

Figure 29:
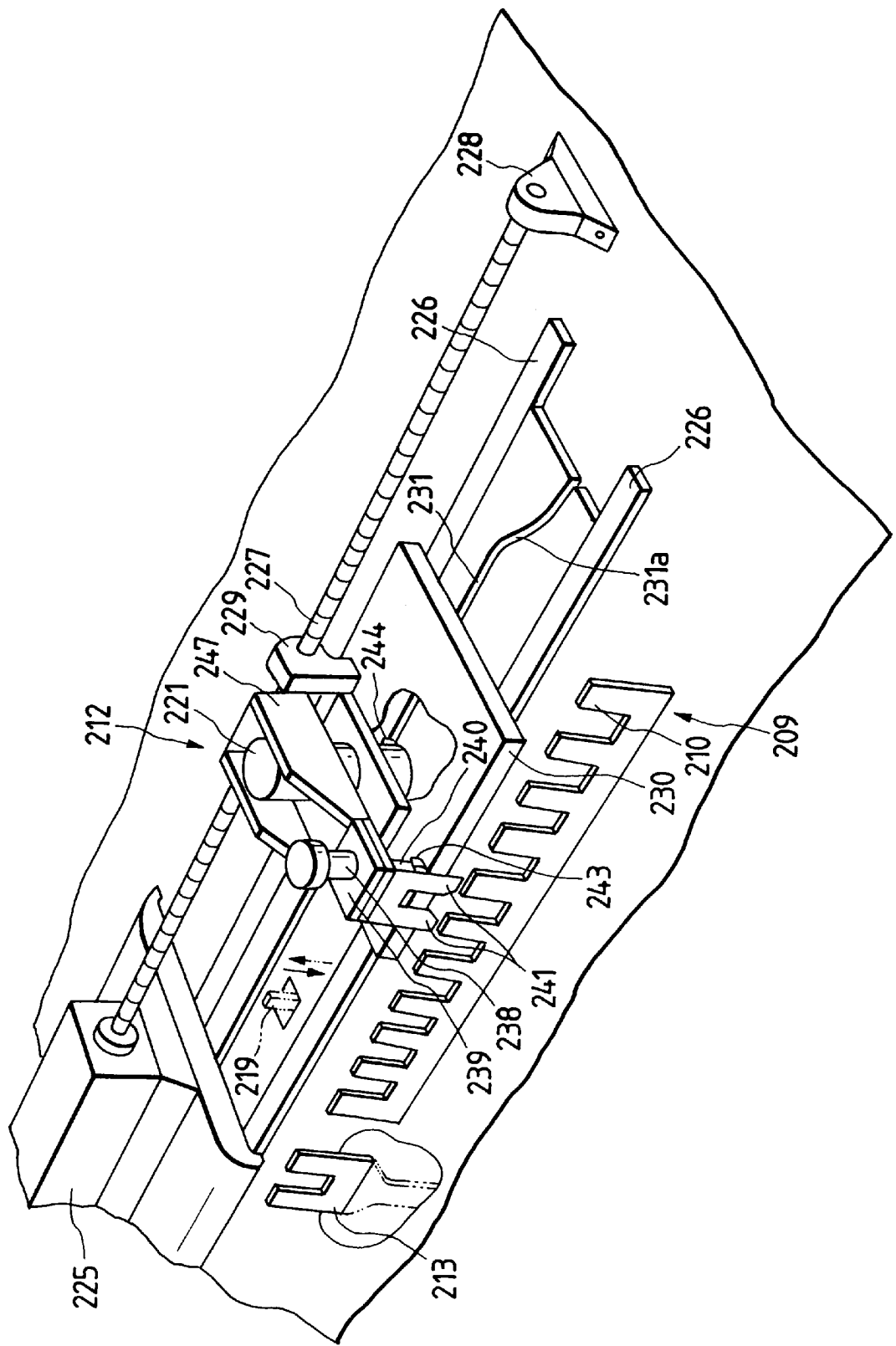
FIG. 29 is a perspective view showing the relation among a tool loader, a ball screw and a tool magazine in FIG. 28.

A tool loader 212 is provided with a nut 229, which will be described hereinafter, in the rear as shown in FIG. 29, the nut 229 engaging with a ball screw 227 rotated by a driving motor 225, and adapted to move in the axial direction of the ball screw 227 as a saddle 230 of FIG. 29 forming part of the tool loader 212 is made to slide on rails 226 by the rotation of the ball screw 227. Reference numeral 211 denotes a tool pot; 213, a tool storage portion; and 218, a control board.

A tool-change predicting counter 224 is used for informing that the tool 205 gripped by the main spindle 204 is running out of its life and displayed on a graphic panel when the accumulated rate-of-operation count of the tool 205, for example, is counted up to a set change count. When the tool-change predicting counter 224 counts up the count above, the tool loader 212 is made to convey the tool 205 involved to the tool storage portion 213 and an operator is informed of the count-up by a display lamp (not shown) or a warning sound. A cylinder 215 is installed on a stage 216 provided on the side surface of the frame 217 in order that by vertically moving a piston 214, the tool storage portion 213 may be moved from a position shown by a chain line up to a position shown by a solid line and from the position shown by the solid line up to the position shown by the chain line. Thus, the used tool 205 is replaced with a new tool 205 and then the tool storage portion 213 containing such a new tool 205 for replacement can be kept on standby at the same height as that of the tool magazine 209.

A tool loader stop plate 219 as an example of a tool loader stopper is integrally fitted to or fitted via a proper member to the piston 220 of a cylinder 222 installed on the stage 216.

Note that in a normal operation, the tool loader 212 is stopped or moved in accordance with a sequence control within a region which is the outside of the position P1 corresponding to the tool storage portion 213, that is, a region "R" which is the right-side of the tool loader stop plate 219 in FIG. 28. Accordingly, the tool loader 212 is not brought in contact with the tool loader stop plate 219 under the sequence control. On the other hand, in order to ensurely prevent the tool loader 212 from entering accidentally into the position P1 corresponding to the tool storage portion, the use of the tool loader stop plate 219 is effective. However, the tool loader stop plate 219 may be in any form on condition that it mechanically blocks the movement of the tool loader 212 for entering the position P1 from the region "R". For example, an actuator 319 shown in FIG. 28 which prevents the tool loader 212 from entering the position P1 through contacting with the tool loader 212 may be utilized instead of the tool loader stop plate 219.

In addition, the tool loader stop plate 219 is preferably made of metal.

A contactless switch 245 is fitted to the cylinder 222 and when the piston 220 is moved up by turning on a (upper side) push-button switch 223, which will be described hereinafter, used to detect the upper end of the piston 220, whereby to confirm the ascended end of the tool loader stop plate 219. A contactless switch 245 is also used to detect the lower end of the piston 220 when the piston 220 is moved down by turning on a (lower side) push-button switch 223, whereby to confirm the lowered end of the tool loader stop plate 219.

When the (upper side) push-bottom switch 223 is turned on, the tool loader 212 is moved to the outside of the position P1 corresponding to the tool storage member 213 and then the tool loader stop plate 219 is moved up to a position shown by a chain line of FIG. 28. Simultaneously, selectively conducted is one of following processes.

(1) the supply of power to the driving moter 225 is stopped in accordance with a sequence control in such a manner that the tool loader 212 is stopped within the region "R" and restrained from moving to the position P1; and (2) the movement of the tool loader 212 is subjected to a sequence control in which the tool loader 212 is only moved within the region "R" at the right-side of the tool loader stop plate 219 as shown in FIG. 28 in accordance with a desired operation thereof.

While the tool loader stop plate 219 stays in the lowered position, moreover, the tool loader 212 is allowed to move up to the position Pl corresponding to the tool storage portion 213 due to the rotation of the nut 229, which is kept engaging with the ball screw 227, of the tool loader 212 of FIG. 29 since the driving motor 225 is rotating and also capable of conveying the tool placed in the tool storage member 213 to the tool change position P3 when called for by the working machine M.

The push-button switches 223 operate to switch between instructions as to the commencement of tool replacement and stopper entry (ascending) and instructions as to the completion of tool replacement and stopper exit (descending) and transmit necessary instructions to the cylinder 222 and the tool loader 212. Further, precision in the ascension and descension of the tool loader stop plate 219 is controlled as occasion demands.

FIG. 29 is a perspective view showing the relation among the tool loader 212, the ball screw 227 and the tool magazine 209 in FIG. 28, though the illustration of tool pots and tools are omitted. In FIG. 29, the saddle 230 constituting the tool loader 212 is suspended by two rails 226, 226 and the saddle 230 fitted to the nut 229 is kept engaging with the ball screw 227 rotated by the driving motor 225. Consequently, the saddle 230 and ultimately the tool loader 212 are moved on and along the rails 226 as the ball screw 227 rotates. A rotary shaft 221 is provided in the central portion of the saddle 230 and a cam 244 engaging with a cam groove 231 is secured to the lower portion of the rotary shaft 221. When the saddle 230 is moved forward in the right direction in FIG. 29, the rotary shaft 221 regulated by the curved portion 231a of the cam groove 231 is pivoted counterclockwise and arms 247 secured to the rotary shaft 221 as well as a rotary body 239 secured to the arm 247 are also pivoted counterclockwise around the rotary shaft 221. A cylinder 238 is mounted on the rotary body 239 and a piston rod 240 is provided in the cylinder 238, the piston 240 being vertically slidable therein, and besides a hook member 243 is fitted to the lower portion of the piston rod 240. Further, a pair of grip arm 242 are fitted to the rotary body 239. Reference numeral 228 denotes a bearing portion. The tool loader stop plate 219 is in the ascended state as shown by a chain arrow and arranged so as to descent as shown by a solid arrow.

Figure 30:
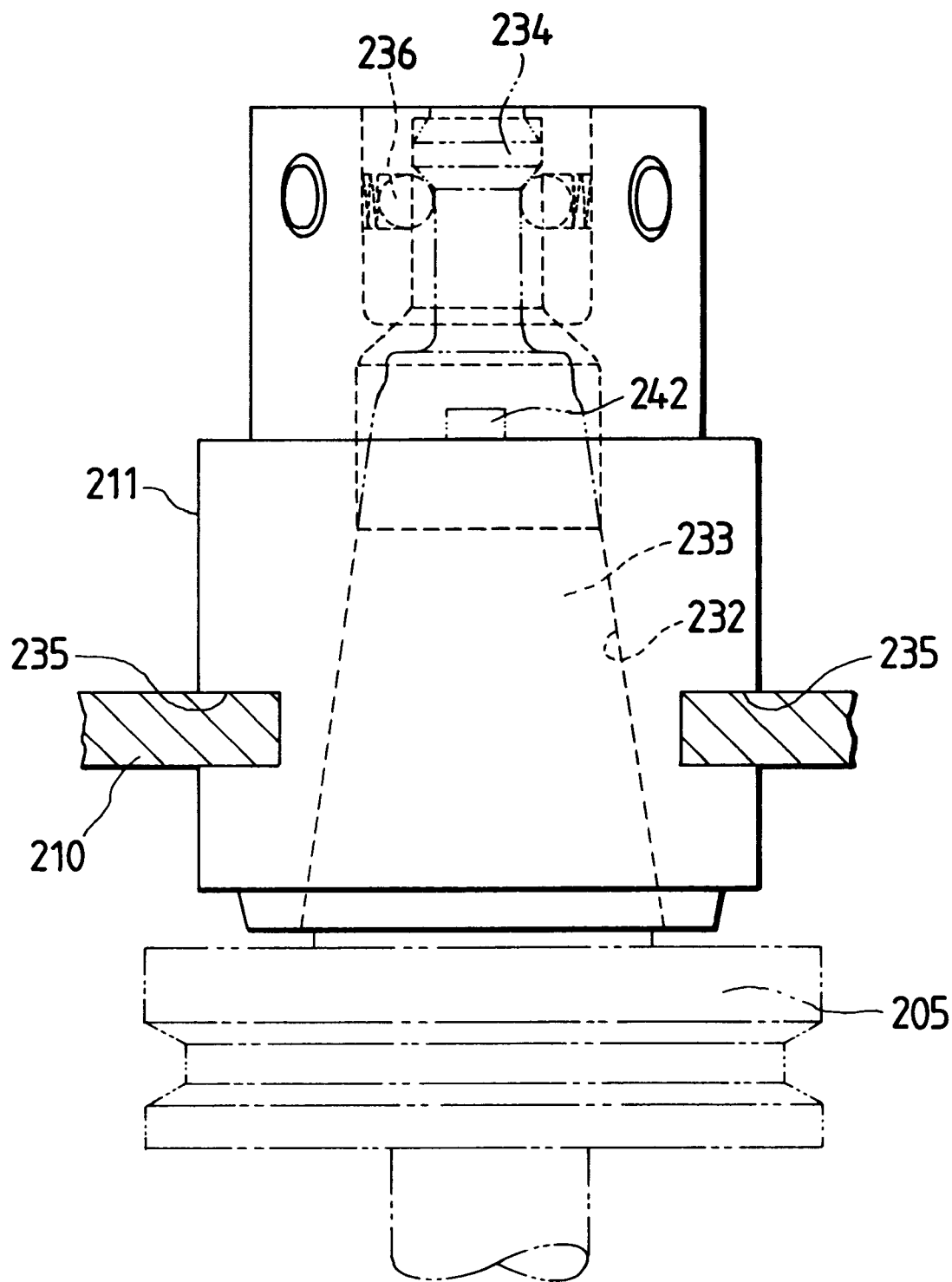
FIG. 30 is a plan view showing a tool pot contained in the tool magazine.

FIG. 30 is a plan view of the tool pot 211 while contained in the tool magazine 209 and as shown in FIG. 30 the tool pot 211 is removably held by each hold portion 210 of the tool magazine 209 and further first engaging grooves 235 engaging with both the respective side edges of the hold portion 210 are formed in the outer surface of the tool pot 211. A tapered hole 232 is formed in the center of the tool pot 211 and a holder 233 of a tool 205 is removably fitted in the tapered hole 232. Moreover, four lock balls 236 which are urged by springs toward the center from the four places are fitted to the end portion of the tool pot 211 and when the tool 205 is inserted into the tool pot 211, the tool 205 is retained by the lock balls 236 from slipping off in the pull-stud 234 portion of the front end of the holder 233. The tool pot 211 also has a pin 242 engaging with and disengaging from the hook member 243 of the tool loader 212 as will be discussed hereinafter.

Figure 31:
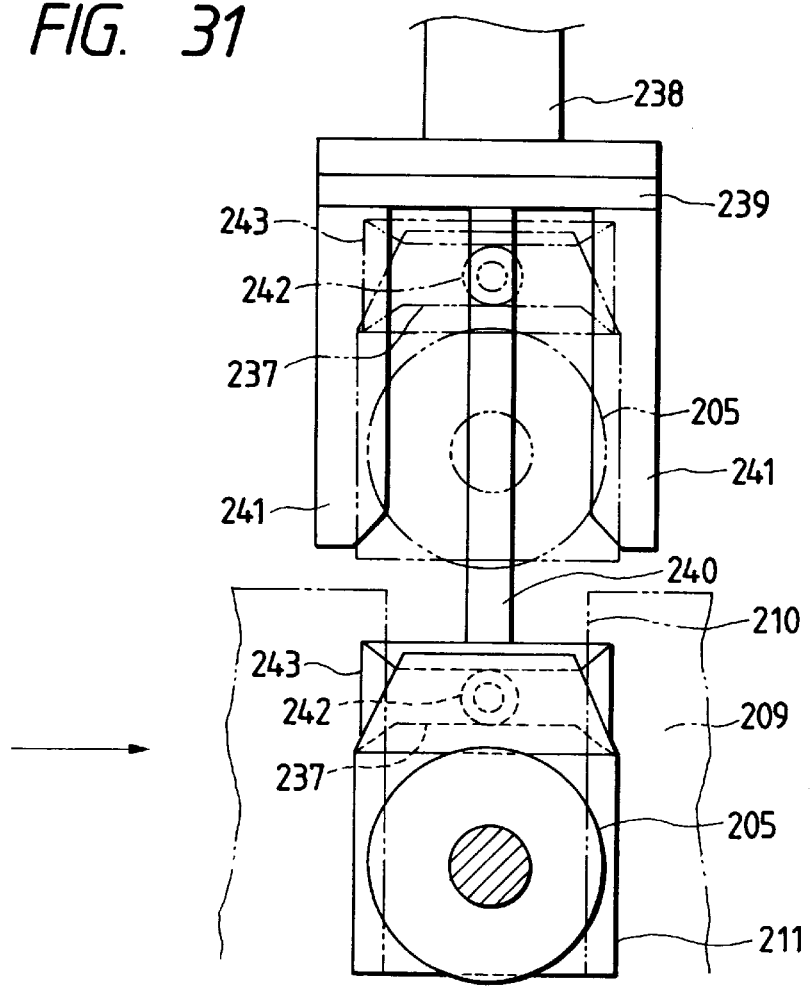
FIG. 31 is a partially enlarged front view showing the tool loader and part of the tool pot contained in the tool magazine.

FIG. 31 is a partially enlarged front view of the tool loader 212 of FIG. 28 and the tool pot 211 contained in the tool magazine 209, showing a state in which the engaging groove 237 of the hook member 243 of the tool loader 212 engages with the pin 242 of the tool pot 211 existing in the hold portion of the tool magazine 209. The pair of grip arms 241 together with the hook member 243 constituting the tool grip portion is suspended from the rotary body 239. When the saddle 230 is moved to a position corresponding to each hold portion 210 of the tool magazine 209, the grip arms 241 are correspondingly arranged from above with respect to the first engaging groove 235 of the tool pot 211 held in the hold portion 210.

Figure 32:
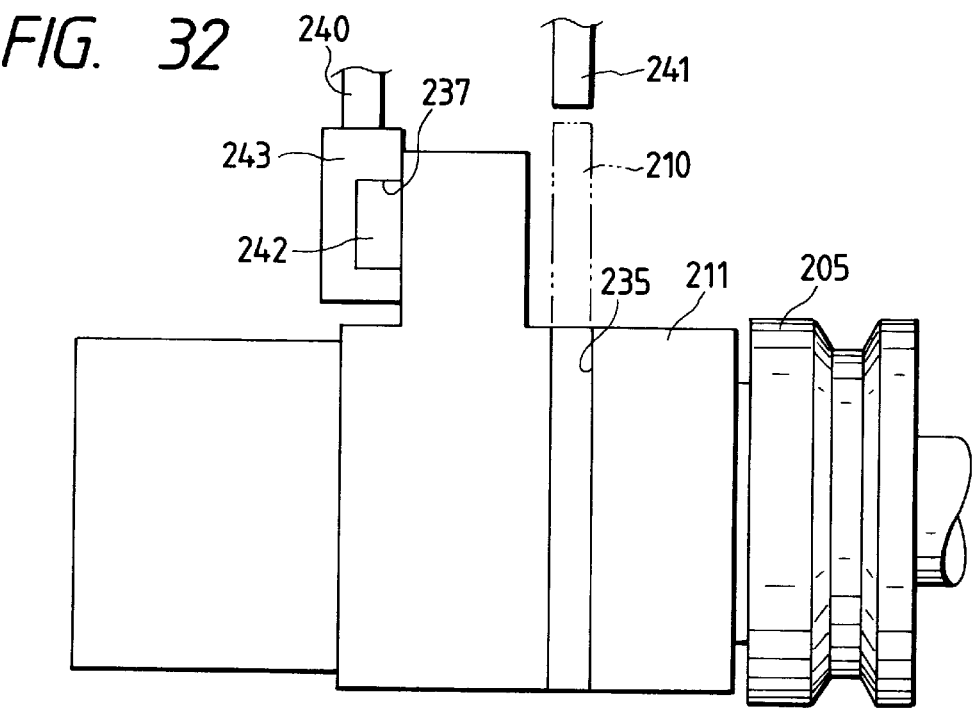
FIG. 32 is a side view showing the tool pot in engagement with the tool loader as viewed from the direction of an arrow in FIG. 31.

The delivery cylinder 238 is disposed on the rotary body 239. The hook member 243 is fixed to the leading end of the piston rod 240 of the delivery cylinder 238 and the engaging groove 237 horizontally extended is formed in the front portion thereof. When the saddle 230 is moved to the position corresponding to the hold portion 210 of the tool magazine 209 while the hook member 243 is situated in the lower position by the delivery cylinder 238, the pin 242 on the tool pot 211 enters the engaging groove 237 of the hook member 243 as shown in the side view of FIG. 32 from the direction of an arrow of FIG. 31. Then the hook member 243 is moved up by the delivery cylinder 238 as shown by a chain line, whereby the tool pot 211 is pulled out of the hold portion 210 and inserted in between the grip arms 241 before being gripped therein.

When the tool is inserted into the tool magazine 209, on the other hand, the tool loader 212 is moved to the position corresponding to the hold portion 210 of the tool magazine 209 together with the movement of the saddle 230 while gripping the tool pot 211 and then the hook member 243 is moved down by the delivery cylinder 238 as shown by a solid line, so that the tool pot 211 is fitted into the hold portion and held thereby. Further, the tool loader 212 is separated from the position corresponding to the hold portion 210 together with the movement of the saddle 230 and consequently the pin 242 of the tool pot 211 is separated from the engaging groove 237 of the hook member 243.

Figure 33:
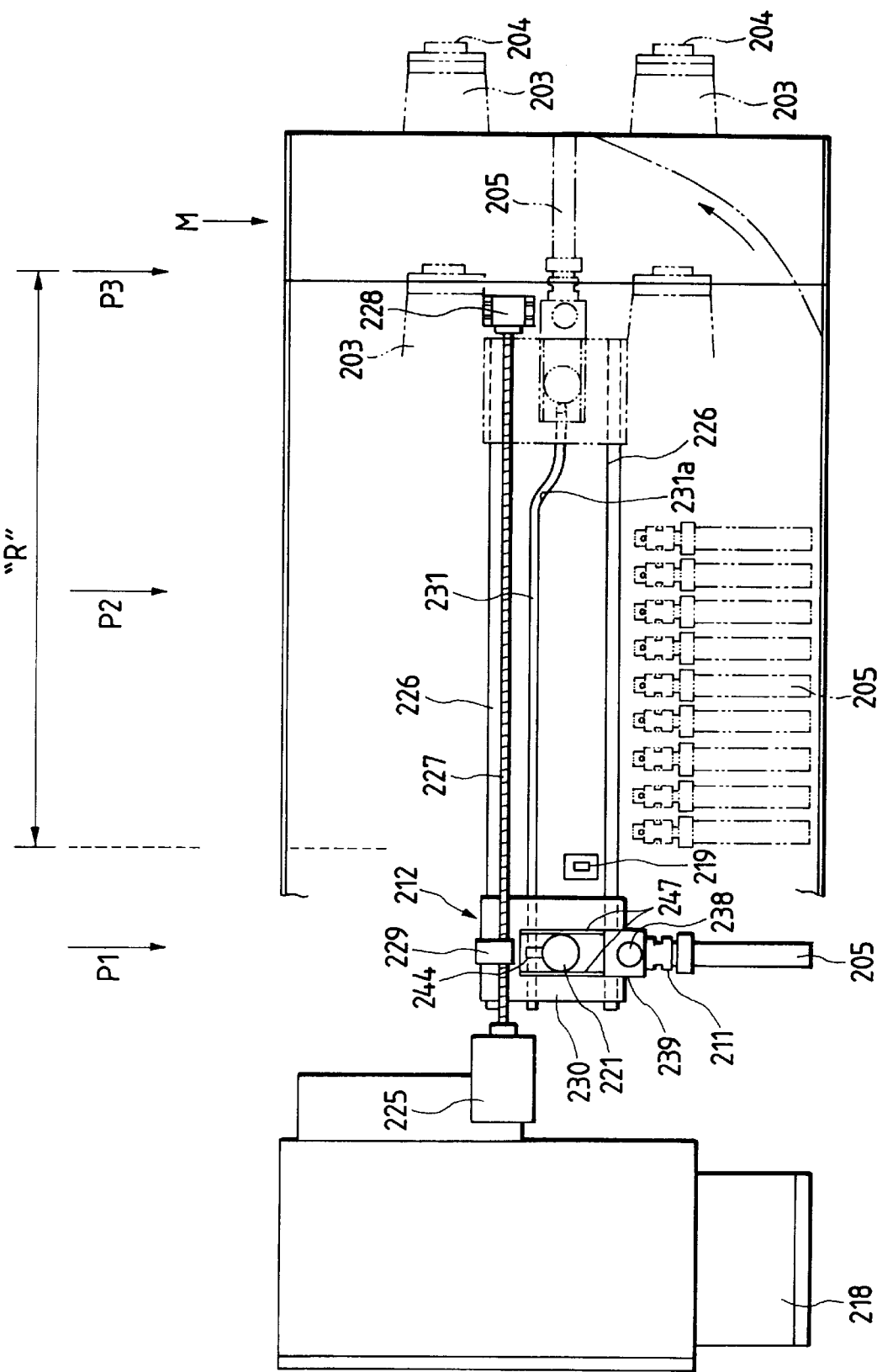
FIG. 33 is a plan view of the principal part of the tool change device.

FIG. 33 is a plan view of the principal part of the tool change device, wherein the saddle 230 constituting the tool loader 212 is set linearly movably in the longitudinal direction on the rails via the ball screw 227 rotated by the driving motor 225 between the position PE corresponding to the tool storage portion 213 and the tool change position P3 when the nut 229 constituting the tool loader 212 engages with the ball screw 227.

The rotary shaft 221 constituting the tool loader 212 is pivotally supported in the central portion of the saddle 230 and the cam 244 is secured to the lower portion thereof as shown in FIG. 29. The cam 244 is formed on the frame 217 in such a manner as to extend along the ball screw 227 and engages with the cam groove 231 where the curved portion 231a is formed in one end portion on the side corresponding to the tool change arm 207. The arm 247 is secured to the rotary shaft 221 and the rotary body 239 is secured to the leading end of the arm 247 and besides the delivery cylinder 238 is provided to the rotary body 239. When the saddle 230 is moved to one end portion side corresponding to the tool change position P3, the rotary shaft 221 is pivoted counterclockwise via the cam 244 because of the action of the curved portion 231a and the rotary body 239 thus secured to the arm 247 is supplied with the counterclockwise pivotal force of FIG. 33.

When the tool loader 212 is moved together with the movement of the saddle 230 to the advanced position corresponding to the tool change position P3 while gripping the tool pot 211 by means of the hook member 243, the rotary body 239 of the tool loader 212 is pivoted counterclockwise as the cam 244 is brought into engagement with the curved portion 231a of the cam groove 231. Thus, the tool 205 is positioned in the tool change position where the axial line of the tool 205 conforms to the axial direction of the main spindle 204.

Subsequently, due to the longitudinal and pivotal operations of the tool change arm 207 of FIG. 28, the tool 205 is removed and replaced with a new one simultaneously between the main spindle 204 and the tool pot 211 of the tool loader 212. When the tool loader 212 is reset to the rear position (in the left direction of the drawing) as the saddle 230 is moved, the tool 205 is pivoted together with the rotary body 239 so that the axial line of the tool 205 faces sideways because of the action of the cam groove 231.

Figure 34:
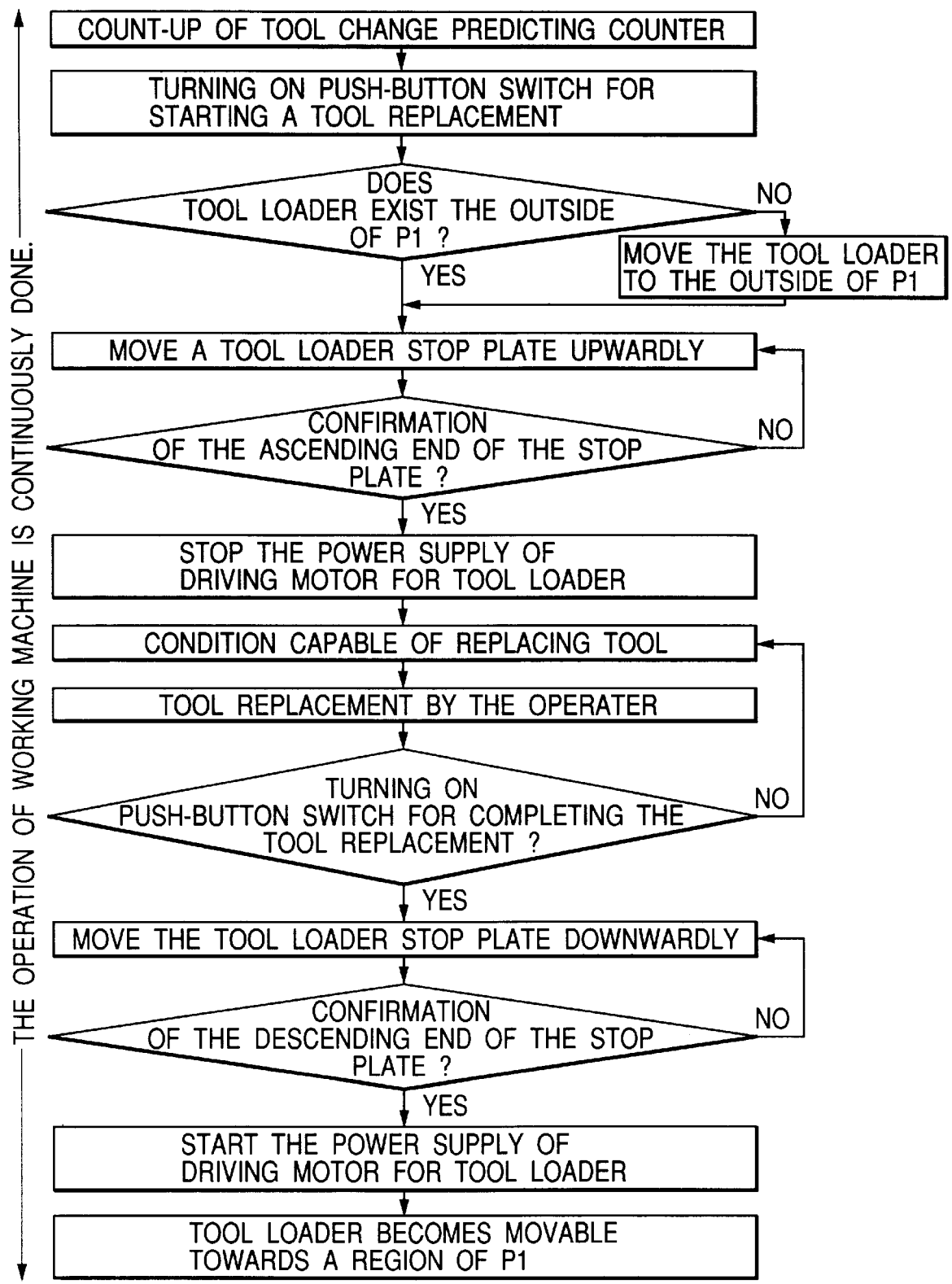
FIG. 34 is a block diagram showing a tool replacement procedure.

FIG. 34 is a block diagram showing a procedure for replacing a tool when the tool-change predicting counter counts up tool replacement during the operation of the working machine.

In FIG. 34, the tool loader 212 is moved to the position P1 corresponding to the tool storage portion 213 so as to put the damaged tool on the position P1 when the tool-change predicting counter 224 counts up the tool replacement during the continuous operation. When the operator turns on the (upper side) pushbutton switch 223 for starting tool replacement, the tool loader is moved to the outside of the position P1 and also a piston 220 within the cylinder 222 is moved upwardly in accordance with the sequence control. As a result of this, the tool loader stop plate 219 is moved upwardly together with the piston 220 until the lower end of the piston is detected by a contactless switch 245, to thereby confirm the upper end of the tool loader stop plate 219.

At that time, the tool loader 212 is moved by a sequence control within the region "R" shown in FIG. 28 and located at the right-side of the tool loader stop plate 219 so as to conduct a desired operation. However, it is not necessary to make the tool loader 212 movable. If desired, it is possible to stop the supply of power to the driving motor 225 so as to stop the movement of the tool loader 212.

Under these circumstances, the tool replacement is made possible.

When the operator turns on the (lower side) push-button switch 223 upon the completion of the tool replacement thereafter, the tool loader stop plate 219 is moved down and the upper end of the piston 220 is detected by the contactless switch 246 with the effect of confirming the descended end of the tool loader stop plate 219. Then the tool loader 212 is released from the restriction in which the tool loader 212 is prevented from entering in the position P1.

In the case where the supply of the power has been stopped, the supply of power to the driving motor 225 is started in accordance with the push button switch 223 and the tool loader 212 becomes movable. During a series of these steps, the working machine can be also kept operating continuously.

The operation of the tool change device thus arranged according to the present invention will subsequently be described.

In FIG. 28, the column 202 is moved with respect to the work on a table (not shown) while the main spindle 204 is being rotated in such a state that the main spindle head 203 is positioned on the lower side as shown by the chain line and the work is subjected by the tool 205 to the given working. When the fact that the tool 205 on the main spindle 204 is running out of its life is counted up by the tool-change predicting counter 224, tool replacement is carried out through the steps shown in FIG. 33 in the tool change position P3 in the tool change device shown in FIG. 28 and the tool 205 is conveyed by the tool loader 212 to the tool storage portion 213.

When the operator comes to the tool storage portion 213 in order to replace the tool after the tool-change predicting counter 224 thus operates, the operator pushes the push-button switch 223 for instructing the start of tool replacement. As a result, the tool loader 212 is moved to the outside of the position P1, and the tool loader stop plate 219 is moved up into a space as a boundary between the position P1 and the region "R". Then, one of the following processes is selectively conducted:

(1) the supply of power to the driving motor 225 is stopped in accordance with a sequence control in such a manner that the tool loader 212 is stopped within the region "R" and restrained from moving into the position P1; and (2) the movement of the tool loader 212 is subjected to a sequence control in which the tool loader 212 is only moved within the region "R" at the right-side of the tool loader stop plate 219 as shown in FIG. 28 in accordance with a desired operation thereof.

At this time, the working machine is in the continuously operating condition.

When the operation of replacing the tool is completed, the operator pushes the push-button switch 223 for instructing completion of tool replacement, the tool loader stop plate 219 is moved down so as to allow the tool loader 212 to enter into the position P1. In addition to this, in the case where the supply 207 of the power of the driving motor 225 has been stopped, the supply of power to the driving motor 225 is resumed.

In a case where the tool-change predicting counter 224 has thus counted up while the tool involved is placed in the tool storage portion 213, the tool loader 212 moves to fetch the tool in the tool storage portion 213 provided that the tool loader stop plate 219 stays in the descended position when the tool is called for by the working machine for working purposes and then supplies the tool interchanging means 206 with the tool, whereby to let the working operation continue.

Further, note that the above-mentioned apparatus and method is applicable to supply a new tool into the tool storage portion 213 instead of the replacement through the same.

Although the tool loader 212 is prevented from moving to the position P1 corresponding to the tool storage portion 213 by turning on the (upper side) push-button switch 223 to as to move up the tool loader stop plate 219 to the position shown by the chain line shown in FIG. 28 and to stop the supply of power to the driving motor 225 according to the sixth embodiment of the invention, the method of controlling the tool loader stop plate 219 and the tool loader 212 may be modified in various manners.

Figure 35:
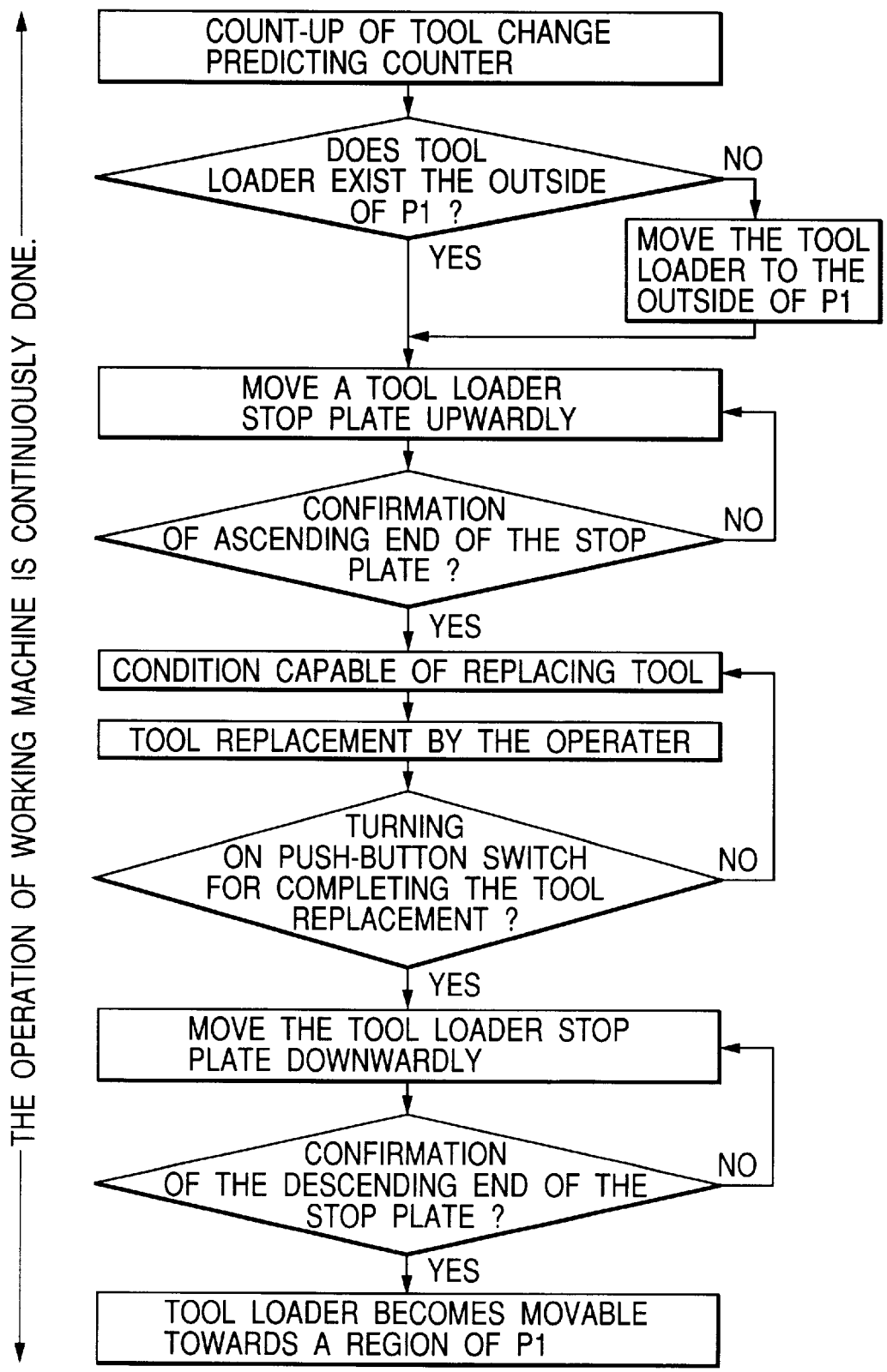
FIG. 35 is a block diagram showing a procedure for tool replacement.
Figure 36:
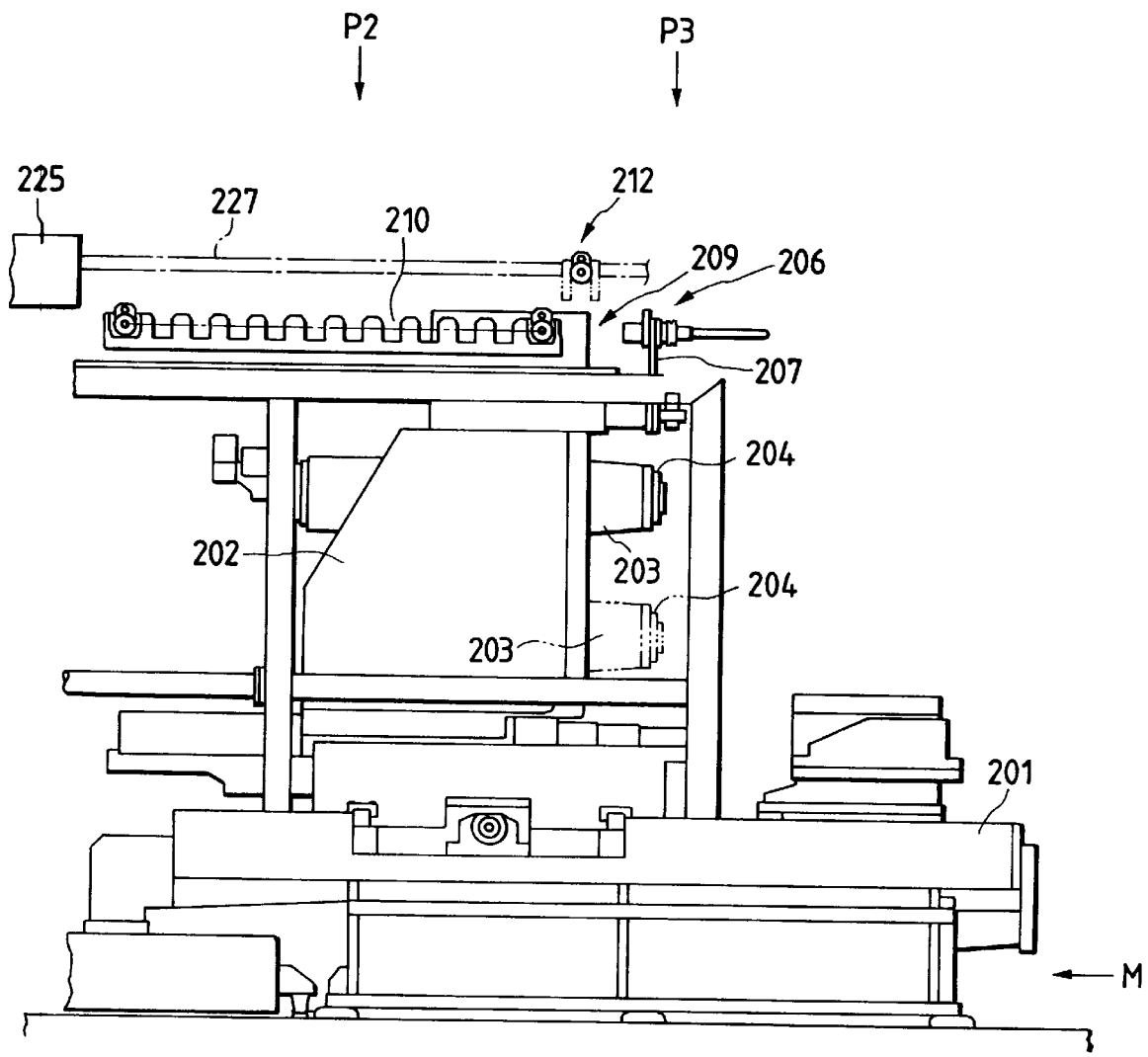
FIG. 36 is a front view of a conventional tool change device.

For example, FIG. 35 is a block diagram illustrating an example of a modified procedure for replacing or adding a tool in the tool storage portion 213. As shown in FIG. 35, the operator turns on the (upper side) bush-button switch 223 for instructing the start of replacement work when an old tool is conveyed to the tool storage portion 213 in order to do the tool replacement work during the time a continuous operation is performed, and in turn a sequence controlling device (not shown) provided within the control board 218 confirms that the tool loader 212 is located at the outside of the position Pl corresponding to the tool storage portion 213.

In a case where the tool loader 212 exists in the position P1, the driving motor 225 is operated to move the tool loader 212 to any position other than the position P1, that is to any position within the region "R" shown in FIG. 28.

After it is confirmed that the tool loader 212 exists in the desired position, the piston 220 of the cylinder 222 is moved up and in turn the tool loader stop plate 219 is caused to move up so as enter a moving area of the tool loader 212, that is, the linear moving area formed between the position P3 corresponding to the tool storage portion 213 and the tool change position P1 as shown by the chain line of FIG. 28. The ascension of the tool loader stop plate 219 is stopped when the lower end of the piston 220 is detected by the contactless switch 245.

Since the tool loader stop plate 219 stays within the linear moving area of the tool loader 212, the tool loader 212 never enters an area to the left of the tool loader stop plate 219 as shown in FIG. 28, that is, an area corresponding to the tool storage portion 213. Therefore, the tool change work in the area corresponding to the tool storage portion 213 can be done with greater safety. Note that, at this time, the tool loader 212 is only allowed to move in accordance with the sequence control within the region "R" at the rightside of the tool loader stop plate 219.

When the operator turns on the (lower side) push-button switch 223 for instructing the completion of tool replacement work thereafter, the tool loader stop plate 219 is moved down and the lower end of the piston 220 is detected by the contactless switch 246, whereby to confirm the descended end of the tool loader stop plate 219, and the moving area of the tool loader 212 is released from being regulated. Incidentally, the continuous operation of the working machine during a series of these steps is possible.

In the above-mentioned modified example, moreover, the working machine can be kept operating even during the tool change operation in the position P1 corresponding to the tool storage portion 213, so that the driving motor 225 may operate to rotate the ball screw 227 and in turn the tool loader 212 may be moved in accordance with the sequence control within the region "R" at the right-side of the tool loader stop plate 219 so as to conduct an instructed operation. (For example, the tool loader 212 may convey the tool in accordance with a predetermined instruction of the working machine.)

Note that, in the present invention, even if the tool loader 212 which is only movable within the region "R" in accordance with the sequence control was accidentally caused to enter the position P1, such movement can be blocked by the tool loader stop plate 219. Accordingly, the operator enjoys a double safety counter-measurement in which the operator can be electrically and mechanically protected by both of the sequence control and the tool loader stop plate 219.

In other words, the moving area of the tool loader 212 can be regulated under not only electronic control but also mechanical control as indicated in the present invention, whereby the safety of the tool change work in the tool storage portion 213 is made greatly improvable.

Although a description has been given of replacing the old tool with a new one in the tool storage portion 213 in the above-mentioned modified example in addition to the embodiments of the invention, a procedure similar to what is concerned with the replacement work is needless to say applicable to a case where a new tool is added to the tool storage portion 213 in an empty state.

According to the present invention, the operator makes the tool loader stopper ascend beforehand when tool replacement is carried out in the tool storage member and replaces the tool safely by preventing the tool loader from moving to the position corresponding to the tool storage member so that the continuous operation may be performed without interrupting the operation of the working machine.

According to the present invention, a tool change device capable of replacing an old tool with a new one by conveying the old tool to a tool storage portion while a continuous operation is carried out without interruption is provided, so that the interruption of the operation of a working machine is by far reduced effectively.

What is claimed is:

1. A tool change method in a tool change device comprising:

a main spindle (24) having a leading end on which a tool (25) is mounted;

a tool magazine (29) including a plurality of hold portions (30) capable of holding a plurality of tools (25);

a tool interchanging means (27) disposed on one side of said tool magazine for interchanging, at a tool interchanging position, said tool (25) mounted on said main spindle with a tool (25) taken out from one of the hold portions of said tool magazine;

a tool storage member (41) disposed on the other side of said tool magazine for storing at least one tool (25) to be substituted for one of one of said tools held in the tool magazine and said tool mounted on said main spindle; and a tool carrying means (L) for carrying said tool stored on said tool storage member (41) to the hold portions on said tool magazine and for carrying one of said tools held on the hold portions to said tool storage member, wherein said hold portions (30) are arranged on a straight line, and said tool (25) mounted on said main spindle is interchanged with a tool (25) taken out from one of one of the hold portions of said tool magazine and said tool storage member (41) at said tool interchanging position (P3); and wherein said tool carrying means (L) is movable among holding positions respectively corresponding to said hold portions, said tool interchanging position and a tool storage position corresponding to said tool storage member so as to deliver and receive said tool among said hold portions of said tool magazine, said tool interchanging means and said tool storage member, said tool change method comprising the step of:

carrying said at least one tool from the tool storage position to one of said holding position corresponding to said hold portions and said tool interchanging position directly without passing through said tool magazine.

2. The tool change method as set forth in claim 1, further comprising the steps of:

storing a new tool into said tool storage position of said tool storage member before said carrying step is performed; and discharging an old tool which is held in one of said hold portions of said tool magazine into said storage position after said carrying step has been operated.

3. The tool change method as set forth in claim 1, further comprising the step of:

discharging an old tool which is held in one of said hold portions of said tool magazine into said storage position before a new tool is stored into said tool storage position of said tool storage member.

4. The tool change method as set forth in claim 3, wherein an old tool once discharged out to the tool storage member is brought in again to the tool magazine or directly to the tool interchanging position without passing through the tool magazine by the tool carrying means.

5. The tool change method as set forth in claim 1, wherein one of said hold portions of the tool magazine that is nearest to the tool storage member is used as a provisional hold portion and, after a tool taken out from one of the tool storage member, the tool magazine and the tool interchanging position is once provisionally put into said provisional hold portion by the tool carrying means, the next operation is executed.

6. The tool change method as set forth in claim 1, further comprising the step of:

preventing said tool carrying means from moving to the tool storage position corresponding to said tool storage member when a tool is replaced in said tool storage member.

7. The tool change method as set forth in claim 6, wherein the preventing step is conducted in accordance with a sequence control of said tool carrying means when a tool is replaced in said tool storage member.

8. The tool change method as set forth in claim 6, wherein the preventing step is conducted by actuating a tool loader stopper when a tool is replaced in said tool storage member.

9. The tool change method as set forth in claim 6, further comprising the step of:

stopping a supply of power of said tool carrying means.

10. A tool change method in a tool change device comprising a main spindle, a tool magazine including a plurality of hold portions arranged on a straight line in such a state that the hold portions are opened in one direction, tool interchanging means provided on one side of said tool magazine, a tool storage member provided on the other side of said tool magazine, a tool loader which is moved to any one of a tool change position, a position corresponding to each hold portion of said tool magazine and a position corresponding to said tool storage member, whereby to receive and deliver a tool from and to a tool change arm installed in said tool interchanging means, the hold portions of said tool magazine and said tool storage member, and a sequence controller for controlling the movement of said tool loader, said tool change method comprising the steps of:

performing a tool replacement operation to replace a tool in said storage member, and preventing said tool loader from moving to said position corresponding to said tool storage member when performing said tool replacement operation.

11. The tool change method as set forth in claim 10, wherein the preventing step is conducted in accordance with a sequence control of said tool loader when a tool is replaced in said tool storage member.

12. The tool change method as set forth in claim 10, wherein the preventing step is conducted by actuating a too loader stopper when a tool is replaced in said tool storage member.

13. The tool change method as set forth in claim 10, wherein the preventing step is conducted by actuating a tool loader stopper when a tool is replaced in said tool storage member and by sequentially controlling the movement of said tool loader.

14. The tool change method as set forth in claim 10, further comprising the step of:

stopping a supply of power of said tool loader.

15. A tool change device comprising:

a main spindle;

a tool magazine including a plurality of hold portions arranged on a straight line in such a state that the hold portions are opened in one direction;

tool interchanging means provided on one side of said tool magazine;

a tool storage member provided on the other side of said tool magazine, said tool storage member adapted to allow replacement of a tool therein by an operator of said tool change device;

a tool loader which is moved among a tool change position, a position corresponding to each hold portion of said tool magazine and a position corresponding to said tool storage member, for receiving and delivering a tool from and to any one of a tool change arm installed in said tool interchanging means, the hold portions of said tool magazine and said tool storage member; and a tool loader stopping means for preventing said tool loader from entering to the position corresponding to said tool storage member when a tool is replaced in said tool storage member by the operator.

16. The tool change device as claimed in claim 15, wherein said tool loader stopping means comprises a sequence controller for controlling the movement of said tool loader.

17. The tool change device as claimed in claim 15, wherein said tool loader stopping means comprises a tool loader stopper.

18. The tool change device as claimed in claim 15, wherein said tool loader stopping means comprises a sequence controller for controlling the movement of said tool loader and a tool loader stopper.

19. The tool change device as claimed in claim 17, wherein said tool loader stopper is moved in a direction perpendicular to a direction in which said tool loader is movable.

20. The tool change device as claimed in claim 18, wherein said tool loader stopper is moved in a direction perpendicular to a direction in which said tool loader is movable.

21. A tool change method in a tool change device comprising:
    a main spindle (24) having a leading end on which a tool (25) is mounted;
    a tool magazine (29) including a plurality of hold portions (30) capable of holding a plurality of tools (25);
    a tool interchanger (27) disposed on one side of said tool magazine to interchange, at a tool interchanging position, said tool (25) mounted on said main spindle with a tool (25) taken out from one of the hold portions of said tool magazine;
    a tool storage member (41) disposed on the other side of said tool magazine for storing at least one tool (25) to be substituted for one of one of said tools held in the tool magazine and said tool mounted on said main spindle; and
    a tool carrier (L) to carry said tool stored on said tool storage member (41) to the hold portions on said tool magazine and to carry one of said tools held on the hold portions to said tool storage member,
    wherein said hold portions (30) are arranged on a straight line, and said tool (25) mounted on said main spindle is interchanged with a tool (25) taken out from one of one of the hold portions of said tool magazine and said tool storage member (41) at said tool interchanging position (P3); and wherein
    said tool carrier (L) is movable among holding positions respectively corresponding to said hold portions, said tool interchanging position and a tool storage position corresponding to said tool storage member so as to deliver and receive said tool among said hold portions of said tool magazine, said tool interchanger and said tool storage member,
    said tool change method comprising the step of:
    carrying said at least one tool from the tool storage position to one of said holding position corresponding to said hold portions and said tool interchanging position directly without passing through said tool magazine.

22. The tool change method as set forth in claim 21, further comprising the steps of:
    storing a new tool into said tool storage position of said tool storage member before said carrying step is performed; and
    discharging an old tool which is held in one of said hold portions of said tool magazine into said storage position after said carrying step has been operated.

23. The tool change method as set forth in claim 21, further comprising the step of:
    discharging an old tool which is held in said holding position of said tool magazine into said storage position before a new tool is stored into said tool storage position of said tool storage member.

24. The tool change method as set forth in claim 23, wherein an old tool once discharged out to the tool storage member is brought in again to the tool magazine or directly to the tool interchanging position without passing through the tool magazine by the tool carrier.

25. The tool change method as set forth in claim 21, wherein one of said hold portions of the tool magazine that is nearest to the tool storage member is used as a provisional hold portion and, after a tool taken out from one of the tool storage member, the tool magazine and the tool interchanging position is once provisionally put into said provisional hold portion by the tool carrier, the next operation is executed.

26. The tool change method as set forth in claim 21, further comprising the step of:
    preventing said tool carrier from moving to the tool storage position corresponding to said tool storage member when a tool is replaced in said tool storage member.

27. The tool change method asset forth in claim 26, wherein the preventing step is conducted in accordance with a sequence control of said tool carrier when a tool is replaced in said tool storage member.

28. The tool change method as set forth in claim 26, wherein the preventing step is conducted by actuating a tool loader stopper when a tool is replaced in said tool storage member.

29. The tool change method as set forth in claim 26, further comprising the step of:
    stopping a supply of power of said tool carrier.

30. A tool change method in a tool change device comprising a main spindle, a tool magazine including a plurality of hold portions arranged on a straight line in such a state that the hold portions are opened in one direction, tool interchanger provided on one side of said tool magazine, a tool storage member provided on the other side of said tool magazine, a tool loader which is moved to any one of a tool change position, a position corresponding to each hold portion of said tool magazine and a position corresponding to said tool storage member, whereby to receive and deliver a tool from and to a tool change arm installed in said tool interchanger, the hold portions of said tool magazine and said tool storage member, and a sequence controller for controlling the movement of said tool loader, said tool change method comprising the steps of:
    performing a tool replacement operation to replace a tool in said storage member, and
    preventing said tool loader from moving to said position corresponding to said tool storage member when performing said tool replacement operation.

31. The tool change method as set forth in claim 30, wherein the preventing step is conducted in accordance with a sequence control of said tool loader when a tool is replaced in said tool storage member.

32. The tool change method as set forth in claim 30, wherein the preventing step is conducted by actuating a tool loader stopper when a tool is replaced in said tool storage member.

33. The tool change method as set forth in claim 30, wherein the preventing step is conducted by actuating a tool loader stopper when a tool is replaced in said tool storage member and by sequentially controlling the movement of said tool loader.

34. The tool change method as set forth in claim 30, further comprising the step of:

stopping a supply of power of said tool loader.

35. A tool change device comprising:

a main spindle;

a tool magazine including a plurality of hold portions arranged on a straight line in such a state that the hold portions are opened in one direction;

tool interchanger provided on one side of said tool magazine;

a tool storage member provided on the other side of said tool magazine, said tool storage member adapted to allow replacement of a tool therein by an operator of said tool change device;

a tool loader which is moved among a tool change position, a position corresponding to each hold portion of said tool magazine and a position corresponding to said tool storage member, for receiving and delivering a tool from and to any one of a tool change arm installed in said tool interchanger, the hold portions of said tool magazine and said tool storage member; and a tool loader stopper to prevent said tool loader from entering to the position corresponding to said tool storage member when a tool is replaced in said tool storage member by the operator.

36. The tool change device as claimed in claim 35, wherein said tool loader stopper comprises a sequence controller for controlling the movement of said tool loader.

37. The tool change device as claimed in claim 35, wherein said tool loader stopper comprises a sequence controller for controlling the movement of said tool loader and the tool loader stopper.

38. The tool change device as claimed in claim 36, wherein said tool loader stopper is moved in a direction perpendicular to a direction in which said tool loader is movable.

39. The tool change device as claimed in claim 37, wherein said tool loader stopper is moved in a direction perpendicular to a direction in which said tool loader is movable.

* * * * *